US011996654B2

(12) United States Patent
Diaz et al.

(10) Patent No.: US 11,996,654 B2
(45) Date of Patent: May 28, 2024

(54) CONTROLLED-IMPEDANCE COMPLIANT CABLE TERMINATION

(71) Applicant: Ardent Concepts, Inc., Hampton, NH (US)

(72) Inventors: Sergio Diaz, Cambridge, MA (US); Gordon A. Vinther, Hampton, NH (US); Joseph F. DiDonna, Lee, NH (US)

(73) Assignee: Ardent Concepts, Inc., Hampton, NH (US)

( * ) Notice: Subject to any disclaimer, the term of this patent is extended or adjusted under 35 U.S.C. 154(b) by 0 days.

(21) Appl. No.: 18/321,754

(22) Filed: May 22, 2023

(65) Prior Publication Data

US 2024/0030655 A1 Jan. 25, 2024

Related U.S. Application Data

(63) Continuation of application No. 17/556,686, filed on Dec. 20, 2021, now Pat. No. 11,677,188, which is a (Continued)

(51) Int. Cl.
*H01R 13/00* (2006.01)
*H01R 13/6473* (2011.01)
*H01R 13/6591* (2011.01)

(52) U.S. Cl.
CPC ..... *H01R 13/6473* (2013.01); *H01R 13/6591* (2013.01)

(58) Field of Classification Search
CPC ............ H01R 13/65802; H01R 23/662; H01R 23/688; H01R 13/4532; H01R 13/6473; H01R 13/6593
See application file for complete search history.

(56) References Cited

U.S. PATENT DOCUMENTS 5,057,029 A 10/1991 Noorily
5,176,538 A 1/1993 Hansell, III et al.
(Continued)

FOREIGN PATENT DOCUMENTS

CN 101312275 A 11/2008
CN 101330172 A 12/2008
(Continued)

OTHER PUBLICATIONS

Chinese Office Action dated Nov. 3, 2021 in connection with Chinese Application No. 201980036855.0.
(Continued)

*Primary Examiner* — Phuong Chi Thi Nguyen
(74) *Attorney, Agent, or Firm* — Wolf, Greenfield & Sacks, P.C.

(57) ABSTRACT

A controlled-impedance cable assembly for removably attaching a controlled-impedance cable to a surface of a device. Signal contacts are attached to signal conductors of cables and ground members are coupled to shields of the cables. Ends of the signal conductors and of elongated appendages extending from the ground members are positioned to make a pressure contact to pads and ground lands on the surface. Pressure to make those contacts may come from deflection of the ends of the signal conductors and elongated ground appendages or from a spring. The signal contacts and elongated appendages may be positioned to provide an impedance matching an impedance with the cables.

20 Claims, 52 Drawing Sheets

Related U.S. Application Data continuation of application No. 17/061,230, filed on Oct. 1, 2020, now Pat. No. 11,205,877, which is a continuation of application No. PCT/US2019/025426, filed on Apr. 2, 2019.

(60) Provisional application No. 62/795,788, filed on Jan. 23, 2019, provisional application No. 62/651,467, filed on Apr. 2, 2018.

(56) References Cited

U.S. PATENT DOCUMENTS 5,203,079 A 4/1993 Brinkman et al.
6,217,372 B1 4/2001 Reed
6,951,487 B2 10/2005 Ozai
7,422,483 B2 9/2008 Avery et al.
7,431,608 B2 10/2008 Sakaguchi et al.
7,445,471 B1 11/2008 Scherer et al.
7,462,942 B2 12/2008 Tan et al.
7,485,012 B2 2/2009 Daugherty et al.
7,494,383 B2 2/2009 Cohen et al.
7,497,693 B1 3/2009 Wu
7,534,142 B2 5/2009 Avery et al.
7,540,747 B2 6/2009 Ice et al.
7,540,781 B2 6/2009 Kenny et al.
7,549,897 B2 6/2009 Fedder et al.
7,553,190 B2 6/2009 Laurx et al.
7,581,990 B2 9/2009 Kirk et al.
7,588,464 B2 9/2009 Kim
7,613,011 B2 11/2009 Grundy et al.
7,621,779 B2 11/2009 Laurx et al.
7,652,381 B2 1/2010 Grundy et al.
7,654,831 B1 2/2010 Wu
7,658,654 B2 2/2010 Ohyama et al.
7,686,659 B2 3/2010 Peng
7,690,930 B2 4/2010 Chen et al.
7,713,077 B1 5/2010 McGowan et al.
7,719,843 B2 5/2010 Dunham
7,722,401 B2 5/2010 Kirk et al.
7,722,404 B2 5/2010 Neumetzler
7,731,537 B2 6/2010 Amleshi et al.
7,744,414 B2 6/2010 Scherer et al.
7,753,731 B2 7/2010 Cohen et al.
7,771,233 B2 8/2010 Gailus
7,775,802 B2 8/2010 Defibaugh et al.
7,789,676 B2 9/2010 Morgan et al.
7,794,240 B2 9/2010 Cohen et al.
7,794,278 B2 9/2010 Cohen et al.
7,811,129 B2 10/2010 Glover et al.
7,819,675 B2 10/2010 Ko et al.
7,824,197 B1 11/2010 Westman et al.
7,828,560 B2 11/2010 Wu et al.
7,857,630 B2 12/2010 Hermant et al.
7,862,344 B2 1/2011 Morgan et al.
7,871,296 B2 1/2011 Fowler et al.
7,874,873 B2 1/2011 Do et al.
7,887,371 B2 2/2011 Kenny et al.
7,906,730 B2 3/2011 Atkinson et al.
7,914,302 B1 3/2011 Zhu
7,914,304 B2 3/2011 Cartier et al.
7,976,318 B2 7/2011 Fedder et al.
7,985,097 B2 7/2011 Gulla
7,993,147 B2 8/2011 Cole et al.
8,002,581 B1 8/2011 Whiteman, Jr. et al.
8,016,616 B2 9/2011 Glover et al.
8,018,733 B2 9/2011 Jia
8,036,500 B2 10/2011 McColloch
8,057,266 B1 11/2011 Roitberg
8,057,267 B2 11/2011 Johnescu
8,083,553 B2 12/2011 Manter et al.
8,092,235 B2 1/2012 Frantum, Jr. et al.
8,092,254 B2 1/2012 Miyazaki et al.
8,100,699 B1 1/2012 Costello
8,157,573 B2 4/2012 Tanaka
8,162,675 B2 4/2012 Regnier et al.
8,167,651 B2 5/2012 Glover et al.
8,182,289 B2 5/2012 Stokoe et al.
8,192,222 B2 6/2012 Kameyama
8,197,285 B2 6/2012 Farmer
8,210,877 B2 7/2012 Droesbeke
8,215,968 B2 7/2012 Cartier et al.
8,226,441 B2 7/2012 Regnier et al.
8,251,745 B2 8/2012 Johnescu et al.
8,272,877 B2 9/2012 Stokoe et al.
8,282,402 B2 10/2012 Ngo
8,308,491 B2 11/2012 Nichols et al.
8,308,512 B2 11/2012 Ritter et al.
8,337,243 B2 12/2012 Elkhatib et al.
8,338,713 B2 12/2012 Fjelstad et al.
8,371,875 B2 2/2013 Gailus
8,371,876 B2 2/2013 Davis
8,382,524 B2 2/2013 Khilchenko et al.
8,398,433 B1 3/2013 Yang
8,419,472 B1 4/2013 Swanger et al.
8,439,704 B2 5/2013 Reed
8,449,312 B2 5/2013 Lang et al.
8,449,330 B1 5/2013 Schroll et al.
8,465,302 B2 6/2013 Regnier et al.
8,469,745 B2 6/2013 Davis et al.
8,535,065 B2 9/2013 Costello et al.
8,540,525 B2 9/2013 Regnier et al.
8,550,861 B2 10/2013 Cohen et al.
8,553,102 B2 10/2013 Yamada
8,556,657 B1 10/2013 Nichols
8,588,561 B2 11/2013 Zbinden et al.
8,588,562 B2 11/2013 Zbinden et al.
8,597,055 B2 12/2013 Regnier et al.
8,632,365 B2 1/2014 Ngo
8,651,880 B2 2/2014 Wu et al.
8,657,627 B2 2/2014 McNamara et al.
8,662,923 B2 3/2014 Wu
8,672,707 B2 3/2014 Nichols et al.
8,678,860 B2 3/2014 Minich et al.
8,690,589 B2 4/2014 Ngo
8,690,604 B2 4/2014 Davis
8,715,003 B2 5/2014 Buck et al.
8,740,644 B2 6/2014 Long
8,753,145 B2 6/2014 Lang et al.
8,758,051 B2 6/2014 Nonen et al.
8,771,016 B2 7/2014 Atkinson et al.
8,787,711 B2 7/2014 Zbinden et al.
8,804,342 B2 8/2014 Behziz et al.
8,814,595 B2 8/2014 Cohen et al.
8,845,364 B2 9/2014 Wanha et al.
8,858,243 B2 10/2014 Luo et al.
8,864,521 B2 10/2014 Atkinson et al.
8,870,471 B2 10/2014 Ito et al.
8,888,531 B2 11/2014 Jeon
8,888,533 B2 11/2014 Westman et al.
8,911,255 B2 12/2014 Scherer et al.
8,926,377 B2 1/2015 Kirk et al.
8,944,831 B2 2/2015 Stoner et al.
8,992,236 B2 3/2015 Wittig et al.
8,992,237 B2 3/2015 Regnier et al.
8,998,642 B2 4/2015 Manter et al.
9,004,942 B2 4/2015 Paniagua
9,011,177 B2 4/2015 Lloyd et al.
9,022,806 B2 5/2015 Cartier, Jr. et al.
9,028,201 B2 5/2015 Kirk et al.
9,028,281 B2 5/2015 Kirk et al.
9,035,183 B2 5/2015 Kodama et al.
9,040,824 B2 5/2015 Guetig et al.
9,071,001 B2 6/2015 Scherer et al.
9,077,118 B2 7/2015 Szu et al.
9,118,151 B2 8/2015 Tran et al.
9,119,292 B2 8/2015 Gundel
9,124,009 B2 9/2015 Atkinson et al.
9,142,921 B2 9/2015 Wanha et al.
9,203,171 B2 12/2015 Yu et al.
9,214,768 B2 12/2015 Pao et al.
9,219,335 B2 12/2015 Atkinson et al.
9,225,085 B2 12/2015 Cartier, Jr. et al.
9,232,676 B2 1/2016 Sechrist et al.
9,246,251 B2 1/2016 Regnier et al.

(56) References Cited

U.S. PATENT DOCUMENTS

| | | | |
|---|---|---|---|
| 9,257,778 | B2 | 2/2016 | Buck et al. |
| 9,257,794 | B2 | 2/2016 | Wanha et al. |
| 9,281,636 | B1 | 3/2016 | Schmitt |
| 9,300,067 | B2 | 3/2016 | Yokoo |
| 9,312,618 | B2 | 4/2016 | Regnier et al. |
| 9,350,108 | B2 | 5/2016 | Long |
| 9,356,401 | B1 | 5/2016 | Horning et al. |
| 9,362,678 | B2 | 6/2016 | Wanha et al. |
| 9,368,916 | B2 | 6/2016 | Heyvaert et al. |
| 9,373,917 | B2 | 6/2016 | Sypolt et al. |
| 9,374,165 | B2 | 6/2016 | Zbinden et al. |
| 9,385,455 | B2 | 7/2016 | Regnier et al. |
| 9,391,407 | B1 | 7/2016 | Bucher et al. |
| 9,413,112 | B2 | 8/2016 | Helster et al. |
| 9,450,344 | B2 | 9/2016 | Cartier, Jr. et al. |
| 9,490,558 | B2 | 11/2016 | Wanha et al. |
| 9,509,101 | B2 | 11/2016 | Cartier, Jr. et al. |
| 9,520,680 | B2 | 12/2016 | Hsu et al. |
| 9,520,689 | B2 | 12/2016 | Cartier, Jr. et al. |
| 9,531,133 | B1 | 12/2016 | Horning et al. |
| 9,553,381 | B2 | 1/2017 | Regnier |
| 9,559,446 | B1 | 1/2017 | Wetzel et al. |
| 9,564,696 | B2 | 2/2017 | Gulla |
| 9,608,348 | B2 | 3/2017 | Wanha et al. |
| 9,651,752 | B2 | 5/2017 | Zbinden et al. |
| 9,660,364 | B2 | 5/2017 | Wig et al. |
| 9,666,961 | B2 | 5/2017 | Horning et al. |
| 9,685,724 | B2 | 6/2017 | Tojo |
| 9,685,736 | B2 | 6/2017 | Gailus et al. |
| 9,735,495 | B2 | 8/2017 | Gross |
| 9,774,144 | B2 | 9/2017 | Cartier, Jr. et al. |
| 9,801,301 | B1 | 10/2017 | Costello |
| 9,841,572 | B2 | 12/2017 | Zbinden et al. |
| 9,843,135 | B2 | 12/2017 | Guetig et al. |
| 9,929,512 | B1 | 3/2018 | Trout et al. |
| 9,985,367 | B2 | 5/2018 | Wanha et al. |
| 9,985,389 | B1 | 5/2018 | Morgan et al. |
| 10,056,706 | B2 | 8/2018 | Wanha et al. |
| 10,062,984 | B2 | 8/2018 | Regnier |
| 10,062,988 | B1 | 8/2018 | Vinther et al. |
| 10,069,225 | B2 | 9/2018 | Wanha et al. |
| 10,096,945 | B2 | 10/2018 | Cartier, Jr. et al. |
| 10,114,182 | B2 | 10/2018 | Zbinden et al. |
| 10,136,517 | B2 | 11/2018 | Shirasaki |
| 10,170,869 | B2 | 1/2019 | Gailus et al. |
| 10,181,663 | B2 | 1/2019 | Regnier |
| 10,205,286 | B2 | 2/2019 | Provencher et al. |
| 10,243,305 | B1 | 3/2019 | Pan et al. |
| 10,305,224 | B2 | 5/2019 | Girard, Jr. |
| RE47,459 | E | 6/2019 | Vinther et al. |
| 10,348,007 | B2 | 7/2019 | Kataoka et al. |
| 10,367,308 | B2 | 7/2019 | Little et al. |
| 10,462,904 | B2 | 10/2019 | Shirasaki |
| 10,651,606 | B2 | 5/2020 | Little |
| 10,680,364 | B2 | 6/2020 | Champion et al. |
| 10,840,622 | B2 | 11/2020 | Sasame et al. |
| 10,847,937 | B2 | 11/2020 | Cartier, Jr. et al. |
| 10,879,643 | B2 | 12/2020 | Astbury et al. |
| 10,944,215 | B2 | 3/2021 | Chua et al. |
| 10,958,005 | B1 | 3/2021 | Dube |
| 11,050,176 | B2 | 6/2021 | Yang et al. |
| 11,070,006 | B2 | 7/2021 | Gailus et al. |
| 11,189,943 | B2 | 11/2021 | Zerebilov et al. |
| 11,205,877 | B2 | 12/2021 | Diaz et al. |
| 11,437,762 | B2 | 9/2022 | Manter et al. |
| 11,637,390 | B2 | 4/2023 | Zerebilov et al. |
| 11,670,879 | B2 | 6/2023 | Zerebilov |
| 11,677,188 | B2 | 6/2023 | Diaz et al. |
| 11,715,922 | B2 * | 8/2023 | Winey .................. H01R 12/75 439/78 |
| 11,735,852 | B2 | 8/2023 | Cartier, Jr. et al. |
| 11,757,228 | B2 * | 9/2023 | Lai ...................... H01R 13/707 439/587 |
| 2008/0207023 | A1 | 8/2008 | Tuin et al. |
| 2008/0246555 | A1 | 10/2008 | Kirk et al. |
| 2008/0248658 | A1 | 10/2008 | Cohen et al. |
| 2008/0248659 | A1 | 10/2008 | Cohen et al. |
| 2008/0248660 | A1 | 10/2008 | Kirk et al. |
| 2008/0264673 | A1 | 10/2008 | Chi et al. |
| 2008/0267620 | A1 | 10/2008 | Cole et al. |
| 2008/0297988 | A1 | 12/2008 | Chau |
| 2008/0305689 | A1 | 12/2008 | Zhang et al. |
| 2009/0011641 | A1 | 1/2009 | Cohen et al. |
| 2009/0011645 | A1 | 1/2009 | Laurx et al. |
| 2009/0011664 | A1 | 1/2009 | Laurx et al. |
| 2009/0017682 | A1 | 1/2009 | Amleshi et al. |
| 2009/0023330 | A1 | 1/2009 | Stoner et al. |
| 2009/0051558 | A1 | 2/2009 | Dorval |
| 2009/0098767 | A1 | 4/2009 | Long |
| 2009/0117386 | A1 | 5/2009 | Vacanti et al. |
| 2009/0130913 | A1 | 5/2009 | Yi et al. |
| 2009/0130918 | A1 | 5/2009 | Nguyen et al. |
| 2009/0166082 | A1 | 7/2009 | Liu et al. |
| 2009/0176400 | A1 | 7/2009 | Davis et al. |
| 2009/0205194 | A1 | 8/2009 | Semba et al. |
| 2009/0215309 | A1 | 8/2009 | Mongold et al. |
| 2009/0227141 | A1 | 9/2009 | Pan |
| 2009/0239395 | A1 | 9/2009 | Cohen et al. |
| 2009/0247012 | A1 | 10/2009 | Pan |
| 2009/0269971 | A1 | 10/2009 | Tamura et al. |
| 2009/0291593 | A1 | 11/2009 | Atkinson et al. |
| 2009/0291596 | A1 | 11/2009 | Miyazoe |
| 2009/0305533 | A1 | 12/2009 | Feldman et al. |
| 2009/0311908 | A1 | 12/2009 | Fogg et al. |
| 2010/0009571 | A1 | 1/2010 | Scherer et al. |
| 2010/0081302 | A1 | 4/2010 | Atkinson et al. |
| 2010/0099299 | A1 | 4/2010 | Moriyama et al. |
| 2010/0112850 | A1 | 5/2010 | Rao et al. |
| 2010/0144167 | A1 | 6/2010 | Fedder et al. |
| 2010/0144168 | A1 | 6/2010 | Glover et al. |
| 2010/0144175 | A1 | 6/2010 | Helster et al. |
| 2010/0144201 | A1 | 6/2010 | Defibaugh et al. |
| 2010/0144203 | A1 | 6/2010 | Glover et al. |
| 2010/0177489 | A1 | 7/2010 | Yagisawa |
| 2010/0183141 | A1 | 7/2010 | Arai et al. |
| 2010/0203768 | A1 | 8/2010 | Kondo et al. |
| 2010/0221951 | A1 | 9/2010 | Pepe et al. |
| 2010/0248544 | A1 | 9/2010 | Xu et al. |
| 2010/0291806 | A1 | 11/2010 | Minich et al. |
| 2010/0294530 | A1 | 11/2010 | Atkinson et al. |
| 2011/0003509 | A1 | 1/2011 | Gailus |
| 2011/0034075 | A1 | 2/2011 | Feldman et al. |
| 2011/0067237 | A1 | 3/2011 | Cohen et al. |
| 2011/0074213 | A1 | 3/2011 | Schaffer et al. |
| 2011/0104948 | A1 | 5/2011 | Girard, Jr. et al. |
| 2011/0130038 | A1 | 6/2011 | Cohen et al. |
| 2011/0136387 | A1 | 6/2011 | Matsuura et al. |
| 2011/0177699 | A1 | 7/2011 | Crofoot et al. |
| 2011/0212632 | A1 | 9/2011 | Stokoe et al. |
| 2011/0212633 | A1 | 9/2011 | Regnier et al. |
| 2011/0212649 | A1 | 9/2011 | Stokoe et al. |
| 2011/0212650 | A1 | 9/2011 | Amleshi et al. |
| 2011/0223807 | A1 | 9/2011 | Jeon et al. |
| 2011/0230095 | A1 | 9/2011 | Atkinson et al. |
| 2011/0230096 | A1 | 9/2011 | Atkinson et al. |
| 2011/0230104 | A1 | 9/2011 | Lang et al. |
| 2011/0263156 | A1 | 10/2011 | Ko |
| 2011/0287663 | A1 | 11/2011 | Gailus et al. |
| 2011/0300757 | A1 | 12/2011 | Regnier et al. |
| 2011/0300760 | A1 | 12/2011 | Ngo |
| 2012/0003848 | A1 | 1/2012 | Casher et al. |
| 2012/0034798 | A1 | 2/2012 | Khemakhem et al. |
| 2012/0034820 | A1 | 2/2012 | Lang et al. |
| 2012/0077369 | A1 | 3/2012 | Andersen |
| 2012/0077380 | A1 | 3/2012 | Minich et al. |
| 2012/0094536 | A1 | 4/2012 | Khilchenko et al. |
| 2012/0135643 | A1 | 5/2012 | Lange et al. |
| 2012/0156929 | A1 | 6/2012 | Manter et al. |
| 2012/0184136 | A1 | 7/2012 | Ritter |
| 2012/0202363 | A1 | 8/2012 | McNamara et al. |
| 2012/0202386 | A1 | 8/2012 | McNamara et al. |
| 2012/0214344 | A1 | 8/2012 | Cohen et al. |
| 2012/0252232 | A1 | 10/2012 | Buck et al. |
| 2012/0329294 | A1 | 12/2012 | Raybold et al. |

(56) References Cited

U.S. PATENT DOCUMENTS

2013/0012038 A1 1/2013 Kirk et al.
2013/0017715 A1 1/2013 Laarhoven et al.
2013/0017733 A1 1/2013 Kirk et al.
2013/0034999 A1 2/2013 Szczesny et al.
2013/0040482 A1 2/2013 Ngo et al.
2013/0065454 A1 3/2013 Milbrand, Jr.
2013/0078870 A1 3/2013 Milbrand, Jr.
2013/0084744 A1 4/2013 Zerebilov et al.
2013/0092429 A1 4/2013 Ellison
2013/0109232 A1 5/2013 Paniaqua
2013/0143442 A1 6/2013 Cohen et al.
2013/0196553 A1 8/2013 Gailus
2013/0210246 A1 8/2013 Davis et al.
2013/0223036 A1 8/2013 Herring et al.
2013/0225006 A1 8/2013 Khilchenko et al.
2013/0273781 A1 10/2013 Buck et al.
2013/0288521 A1 10/2013 McClellan et al.
2013/0288525 A1 10/2013 McClellan et al.
2013/0288539 A1 10/2013 McClellan et al.
2013/0340251 A1 12/2013 Regnier et al.
2014/0004724 A1 1/2014 Cartier, Jr. et al.
2014/0004726 A1 1/2014 Cartier, Jr. et al.
2014/0004746 A1 1/2014 Cartier, Jr. et al.
2014/0041937 A1 2/2014 Lloyd et al.
2014/0057475 A1 2/2014 Tohjo
2014/0057493 A1 2/2014 De Geest et al.
2014/0057494 A1 2/2014 Cohen
2014/0057498 A1 2/2014 Cohen
2014/0065883 A1 3/2014 Cohen et al.
2014/0073174 A1 3/2014 Yang
2014/0073181 A1 3/2014 Yang
2014/0099844 A1 4/2014 Dunham
2014/0199885 A1 7/2014 Vinther et al.
2014/0242844 A1 8/2014 Wanha et al.
2014/0273551 A1 9/2014 Resendez et al.
2014/0273557 A1 9/2014 Cartier, Jr. et al.
2014/0273627 A1 9/2014 Cartier, Jr. et al.
2014/0286613 A1 9/2014 Ito et al.
2014/0287627 A1 9/2014 Cohen
2014/0295680 A1 10/2014 YuQiang et al.
2014/0302706 A1 10/2014 YuQiang et al.
2014/0308852 A1 10/2014 Gulla
2014/0335707 A1 11/2014 Johnescu et al.
2014/0335736 A1 11/2014 Regnier et al.
2015/0056856 A1 2/2015 Atkinson et al.
2015/0072561 A1 3/2015 Schmitt et al.
2015/0079829 A1 3/2015 Brodsgaard
2015/0079845 A1 3/2015 Wanha et al.
2015/0180578 A1 6/2015 Leigh et al.
2015/0194751 A1 7/2015 Herring
2015/0200483 A1 7/2015 Martin et al.
2015/0200496 A1 7/2015 Simpson et al.
2015/0207247 A1 7/2015 Regnier et al.
2015/0236450 A1 8/2015 Davis
2015/0236451 A1 8/2015 Cartier, Jr. et al.
2015/0236452 A1 8/2015 Cartier, Jr. et al.
2015/0255926 A1 9/2015 Paniagua
2015/0280351 A1 10/2015 Bertsch
2015/0288110 A1 10/2015 Tanguchi et al.
2015/0303608 A1 10/2015 Zerebilov et al.
2015/0357736 A1 12/2015 Tran et al.
2015/0357747 A1 12/2015 Filipon et al.
2015/0357761 A1 12/2015 Wanha et al.
2016/0013594 A1 1/2016 Costello et al.
2016/0013596 A1 1/2016 Regnier
2016/0028189 A1 1/2016 Resendez et al.
2016/0104956 A1 4/2016 Santos et al.
2016/0111825 A1 4/2016 Wanha et al.
2016/0141807 A1 5/2016 Gailus et al.
2016/0149343 A1 5/2016 Atkinson et al.
2016/0149362 A1 5/2016 Ritter et al.
2016/0150633 A1 5/2016 Cartier, Jr.
2016/0150639 A1 5/2016 Gailus et al.
2016/0150645 A1 5/2016 Gailus et al.
2016/0181713 A1 6/2016 Peloza et al.
2016/0181732 A1 6/2016 Laurx et al.
2016/0190747 A1 6/2016 Regnier et al.
2016/0197423 A1 7/2016 Regnier
2016/0218455 A1 7/2016 Sayre et al.
2016/0233598 A1 8/2016 Wittig
2016/0268714 A1 9/2016 Wanha et al.
2016/0268739 A1 9/2016 Zerebilov et al.
2016/0274316 A1 9/2016 Verdiell
2016/0308296 A1 10/2016 Pitten et al.
2016/0322770 A1 11/2016 Zerebilov
2016/0344141 A1 11/2016 Cartier, Jr. et al.
2017/0025783 A1 1/2017 Astbury et al.
2017/0033478 A1 2/2017 Wanha et al.
2017/0042070 A1 2/2017 Baumler et al.
2017/0047692 A1 2/2017 Cartier, Jr. et al.
2017/0054250 A1 2/2017 Kim et al.
2017/0077643 A1 3/2017 Zbinden et al.
2017/0093093 A1 3/2017 Cartier, Jr. et al.
2017/0098901 A1 4/2017 Regnier
2017/0162960 A1 6/2017 Wanha et al.
2017/0294743 A1 10/2017 Gailus et al.
2017/0302011 A1 10/2017 Wanha et al.
2017/0338595 A1 11/2017 Girard, Jr.
2017/0365942 A1 12/2017 Regnier
2017/0365943 A1 12/2017 Wanha et al.
2018/0006416 A1 1/2018 Lloyd et al.
2018/0034175 A1 2/2018 Lloyd et al.
2018/0034190 A1 2/2018 Ngo
2018/0040989 A1 2/2018 Chen
2018/0062323 A1 3/2018 Kirk et al.
2018/0109043 A1 4/2018 Provencher et al.
2018/0145438 A1 5/2018 Cohen
2018/0219331 A1 8/2018 Cartier, Jr. et al.
2018/0219332 A1 8/2018 Brungard et al.
2018/0269612 A1 9/2018 Pitten et al.
2018/0309214 A1 10/2018 Lloyd et al.
2018/0366880 A1 12/2018 Zerebilov et al.
2019/0013625 A1 1/2019 Gailus et al.
2019/0020155 A1 1/2019 Trout et al.
2019/0044284 A1 2/2019 Dunham
2019/0157812 A1 5/2019 Gailus et al.
2019/0173236 A1 6/2019 Provencher et al.
2019/0260147 A1 8/2019 Pitten et al.
2020/0244025 A1 7/2020 Winey et al.
2020/0274267 A1 8/2020 Zerebilov
2020/0274301 A1 8/2020 Manter et al.
2021/0021085 A1 1/2021 Diaz et al.
2021/0091496 A1 3/2021 Cartier, Jr. et al.
2021/0234291 A1 7/2021 Zerebilov
2021/0305731 A1 9/2021 Klein et al.
2021/0384691 A1 12/2021 Winey et al.
2021/0399455 A1 12/2021 Wang et al.
2022/0013962 A1 1/2022 Gailus et al.
2022/0158371 A1 5/2022 Zerebilov et al.
2022/0173550 A1 6/2022 Liu et al.
2022/0224057 A1 7/2022 Diaz et al.
2023/0253722 A1 8/2023 Zerebilov
2023/0352895 A1 * 11/2023 Winey .................. H01R 43/18

FOREIGN PATENT DOCUMENTS

CN 101752700 A 6/2010
CN 201562814 U 8/2010
CN 201956529 U 8/2011
CN 102598430 A 7/2012
CN 102823073 A 12/2012
CN 202678544 U 1/2013
CN 102986091 A 3/2013
CN 103140994 A 6/2013
CN 104025393 A 9/2014
CN 104518363 4/2015
CN 104779467 A 7/2015
CN 105051978 A 11/2015
CN 105612671 A 5/2016
CN 106030925 A 10/2016
CN 106104933 A 11/2016
CN 108713355 10/2018
CN 109273932 A 1/2019
CN 212571566 U 2/2021

(56) References Cited

FOREIGN PATENT DOCUMENTS

| | | | |
|---|---|---|---|
| CN | 113078510 | A | 7/2021 |
| CN | 214100162 | U | 8/2021 |
| CN | 115347395 | A | 11/2022 |
| EP | 2 169 770 | A2 | 3/2010 |
| JP | 2010-266729 | A | 11/2010 |
| JP | 2011-018651 | A | 1/2011 |
| JP | 2012-516021 | A | 7/2012 |
| JP | 2014-195061 | A | 10/2014 |
| JP | 2016-528688 | A | 9/2016 |
| JP | 6193595 | B2 | 9/2017 |
| JP | 6599548 | B2 | 10/2019 |
| KR | 10-2015-0067010 | A | 6/2015 |
| KR | 10-2015-0101020 | A | 9/2015 |
| KR | 10-2016-0038192 | A | 4/2016 |
| KR | 10-2016-0076334 | A | 6/2016 |
| TW | M357771 | U | 5/2009 |
| TW | I446657 | B | 7/2014 |
| WO | WO 2008/124057 | A1 | 10/2008 |
| WO | WO 2010/039188 | A1 | 4/2010 |
| WO | WO 2012/078434 | A2 | 6/2012 |
| WO | WO 2013/006592 | A2 | 1/2013 |
| WO | WO 2015/013430 | A1 | 1/2015 |
| WO | WO 2015/112717 | A1 | 7/2015 |
| WO | WO 2017/015470 | A1 | 1/2017 |
| WO | WO 2017/123574 | | 7/2017 |
| WO | WO 2017/164418 | A1 | 9/2017 |
| WO | WO 2018/226805 | A1 | 12/2018 |
| WO | WO 2019/195319 | | 10/2019 |

OTHER PUBLICATIONS

International Search Report and Written Opinion dated Jun. 28, 2019 in connection with International Application No. PCT/US2019/025426.

[No Author Listed], Amphenol TCS expands the Xcede Platform with 85 Ohm Connectors and High-Speed Cable Solutions. Press Release. Published Feb. 25, 2009. http://www.amphenol.com/about/news_archive/2009/58 [Retrieved on Mar. 26, 2019 from Wayback Machine]. 4 pages.

[No Author Listed], AGILENT. Designing Scalable 10G Backplane Interconnect Systems Utilizing Advanced Verification Methodologies. White Paper, Published May 5, 2012. 24 pages.

[No Author Listed], Difference Between Weld Metal and Heat Affected Zone (HAZ). Minaprem.com. 2021. 7 pages. URL:http://www.difference.minaprem.com/joining/difference-between-weld-metal-and-heat-affected-zone-haz [date retrieved Dec. 20, 2021].

[No Author Listed], Hitachi Cable America Inc. Direct Attach Cables. 8 pages. Retieved Aug. 10, 2017 from http://www.hca.hitachi-cable.com/products/hca/catalog/pdfs/direct-attach-cable-assemblies.pdf [last accessed Mar. 6, 2019].

[No Author Listed], What is the Heat Affected Zone (HAZ)? TWI Ltd. 2021. 8 pages. URL:https://www.twi-global.com/technical-knowledge/faqs/what-is-the-heat-affected-zone [date retieved Dec. 20, 2021].

Cartier et al., High Speed Electronic System With Midboard Cable Connector, U.S. Appl. No. 18/347,820, filed Jul. 6, 2023.

Lehto et al, Characterisation of local grain size variation of welded structural steel. Weld World. 2016;60:673-688. 16 pages. URL:https://link.springer.com/content/pdf/10.1007/s40194-016-0318-8.pdf.

Lloyd et al., High Speed Bypass Cable Assembly, U.S. Appl. No. 15/271,903, filed Sep. 21, 2016.

Lloyd et al., High Speed Bypass Cable Assembly, U.S. Appl. No. 15/715,939, filed Sep. 26, 2017.

Winey et al., I/O Connector Configured For Cabled Connection To The Midboard, U.S. Appl. No. 18/346,172, filed Jun. 30, 2023.

Zerebilov et al., I/O Connector Configured For Cable Connection To A Midboard, U.S. Appl. No. 18/136,827, filed Apr. 19, 2023.

* cited by examiner

CONTROLLED-IMPEDANCE COMPLIANT CABLE TERMINATION

CROSS-REFERENCE TO RELATED APPLICATIONS

This application is a continuation of U.S. patent application Ser. No. 17/556,686, filed on Dec. 20, 2021, entitled "CONTROLLED-IMPEDANCE COMPLIANT CABLE TERMINATION," which is a continuation of U.S. patent application Ser. No. 17/061,230 (now U.S. Pat. No. 11,205, 877), filed on Oct. 1, 2020, entitled "CONTROLLED-IMPEDANCE COMPLIANT CABLE TERMINATION," which is a continuation of International Application No. PCT/US2019/025426, filed on Apr. 2, 2019, entitled "CONTROLLED-IMPEDANCE COMPLIANT CABLE TERMINATION," which claims priority to and the benefit of U.S. Provisional Application Ser. No. 62/795,788, filed on Jan. 23, 2019. International Application No. PCT/US2019/025426 also claims priority to and the benefit of U.S. Provisional Application Ser. No. 62/651,467, filed on Apr. 2, 2018. The entire contents of these applications are incorporated herein by reference in their entirety.

BACKGROUND

The purpose of a cable termination is to provide an interconnect from a cable to an electrical device and to provide a separable electrical interconnection between the cable and its operating environment. The characteristic of separability means that the cables are not interconnected by permanent mechanical means, such as soldering or bonding, but by temporary mechanical means.

Currently, cables are terminated using a conventional-type connector which is also controlled-impedance, such as a male/female pair connectors that have one piece soldered to the operating environment, such as a printed circuit board (PCB), and one piece soldered, crimped, or otherwise permanently fastened to the wire end. In other cases, the connector or the cables are soldered to a different PCB which is then separably connected to the working environment such as another PCB. The two PCBs are then attached with a compression interconnect interposer. While being generally the same impedance environment as the cable, there are impedance mismatches which cause high-frequency attenuation at the point of interface between the cable and the PCB's, and the connector and its working environment, such as like a PCB. Additionally, these cable terminations often require through holes in PCBs for mounting and, consequently, it can be difficult to design the best possible controlled-impedance environment. These types of cable terminations have generally long transitions and thus introduce more signal reflections which can inhibit higher frequency signals.

Another form of prior art is a system which uses two independent parts to mate several cables to its electrical environment. This system uses one part that is generally soldered to a printed circuit board and another part that is generally mated to several cables. The two pieces can be plugged together to form the controlled-impedance interconnection. These systems are better-controlled impedance environments but are limited by the signal integrity of the electrical path since the two mated parts require a relatively long change in the transmission line which can cause reflections and limit bandwidth of the system.

Still another prior art is a connector which terminates controlled-impedance cables to connectors which use compliant "pins" to press into holes in a planar device such as a PCB. These holes are generally required to be large which can also limit bandwidth of the system.

BRIEF SUMMARY

The present invention is an apparatus and method for terminating a controlled-impedance cable with compliant contacts that can mate directly with conductive pads and lands on an electrical device. The terminator is for use with a controlled-impedance cable with one or more signal conductors, each surrounded by a dielectric. A ground shield with optional drain wires surrounds the dielectric(s) and a sheath covers the ground shield and drain wires.

Two exemplary embodiments of termination 10 are described.

The first embodiment employs an anchor block, compliant signal contacts for the signal conductors, compliant ground contacts for the ground shield, and a clip mounted to the anchor block and cable. The compliant contacts can have one or more of a number of different configurations. Each configuration has a spring finger that extends outwardly from the body of the contact.

The nonconductive anchor block holds the compliant contacts and clip. The anchor block has a cable surface where the cable comes into the anchor block and signal contact channels and ground contact channels in the surface that abuts the device. The contact is retained in the channel by a knob that extends into the channel from the channel front wall.

The clip holds the cable to the anchor block, provides strain relief to the cable, and provides compliant pressure for the contacts against the device. The clip has a flat body, a compression arm, a clamp, and a hook. The clamp extends from the rear of the clip body at about a 45° angle away from the anchor block. The clamp has wings that extend around and securely grasp the cable.

To assemble the termination to a cable, the cable is first prepared by trimming back the sheath, ground shield, and dielectric to expose the signal conductor and, if available, the drain wires. The compliant signal contacts are attached to the exposed signal conductors and compliant ground contacts are attached to the exposed drain wires. The contacts are inserted into the appropriate channels and pushed toward the nose surface until the contacts snap into the knobs. The clip is installed onto the anchor block by placing the hook over the anchor block lip and pivoting the clip body downwardly. The cable is bent until it touches the clamp and the wings are bent around and cinched to the cable sheath.

The termination assemblies are removably attached to the device by a frame that comprises a lattice and a cover. The body of the lattice has cutouts into which the termination assemblies are inserted. The cover has a body that spans the termination assemblies. One end is pivotally attached to the lattice. The other end snaps into a receptacle.

The terminations are placed in the cutouts. The cover is pivoted downwardly until the end snaps into the receptacle. The cover pushes down on the compression arms of the clips, compressing the terminations against the device.

The second embodiment comes in two configurations, both of which employ a housing that includes an anchor block, a cap for securing the cable to the anchor block, and a collar for securing the cap to the anchor block. Compliant signal contacts make the electrical connection between the signal conductors and the device and compliant ground contacts make the electrical connection between the ground shield and the ground plane of the device.

A number of different configurations for the contact are described for use with the present invention. The configurations are applicable to both the signal conductors and drain wires. In a first configuration, the contact is the exposed end of the conductor formed into a contact with a spring finger. In the second configuration, the contact is a cylindrical, formed wire contact with a body and a spring finger extending outwardly from the body. The contact is bonded directly to the end of the signal conductor. In the third configuration, the contact is a cylindrical, formed wire contact with a body and a spring finger extending outwardly from the body. The contact is attached to the signal conductor by a collar. In the fourth configuration, the contact has a rectangular contact body with a pair of tines bent 900 from the body to form a fork that holds onto the signal conductor by pushing the wire into the gap between the tines. A spring finger extends outwardly from the body. In the fifth configuration, the contact has a rectangular body with a spring finger extending outwardly from one edge of the body. The other end of the body is at an angle to the body and bonded directly to the end of the signal conductor.

When there are no drain wires, the ground contacts are elements of a clamp that is secured around the cable shield.

The housing of both configurations includes an anchor block, a cap, and a collar. The anchor block has a cable tray that extends rearwardly and upwardly at the desired angle of the cable to the device surface. The anchor block has a notch for each of the signal conductors and a notch for each drain wire. Each notch extends downwardly into a contact aperture, which are through openings to the device surface.

The cap clamps the cable/contacts assembly to the anchor block. The cap has a cable clamp that complements the cable tray. To assemble, the collar is slid over the end of the cable. The contacts are inserted into the notches and the cable is laid in the cable tray. The spring fingers extend along the aperture openings and from the device surface. The cap is installed on the anchor block and the collar is slid down around the cable tray and cap cable clamp until the collar snaps under a lip at the upper edge of the cable tray and a corresponding lip at the upper edge of the cap cable clamp.

In one configuration, the termination assemblies are removably attached to the device by a frame that is comprised of a lattice and a cover. The lattice attaches to the device via through-hole solder joints or an interference fit. The lattice body has a rectangular cutout for each termination assembly.

The cover spans the termination assemblies and has a spring set. The spring set has an elongated body and a cantilever spring extending from and curled under the body for each termination. When the cover is closed onto the termination assemblies, each spring pushes its corresponding termination assembly against the device surface in the direction of compression.

In another configuration, the termination assemblies are removably attached to the device by a frame that is comprised of a lattice and a cover. The lattice has a cutout for each termination assembly. The cover secures the termination assemblies in the lattice. The cover has posts extending from the bottom, each of which is aligned with a cutout. A coil spring sits on the post and, when the cover is installed on the lattice, pushes the termination assembly toward the device. The frame is secured to the device by clips attached to the device.

Objects of the present invention will become apparent in light of the following drawings and detailed description of the invention.

BRIEF DESCRIPTION OF DRAWINGS

For a fuller understanding of the nature and object of the present invention, reference is made to the accompanying drawings, wherein.

DETAILED DESCRIPTION

Figure 1:
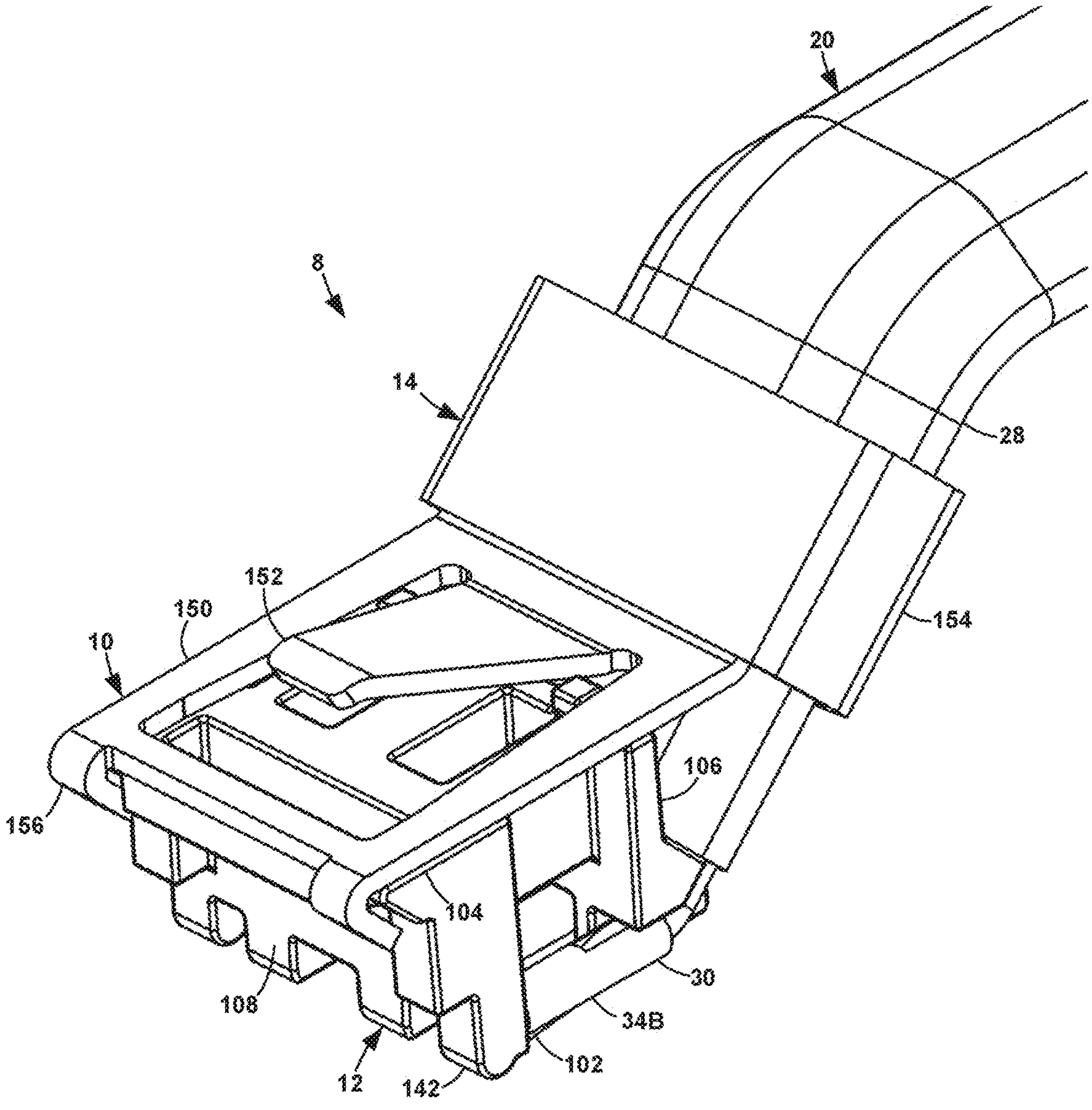
FIG. 1 is a top, isometric view of the first embodiment of the termination of the present invention.
Figure 2:
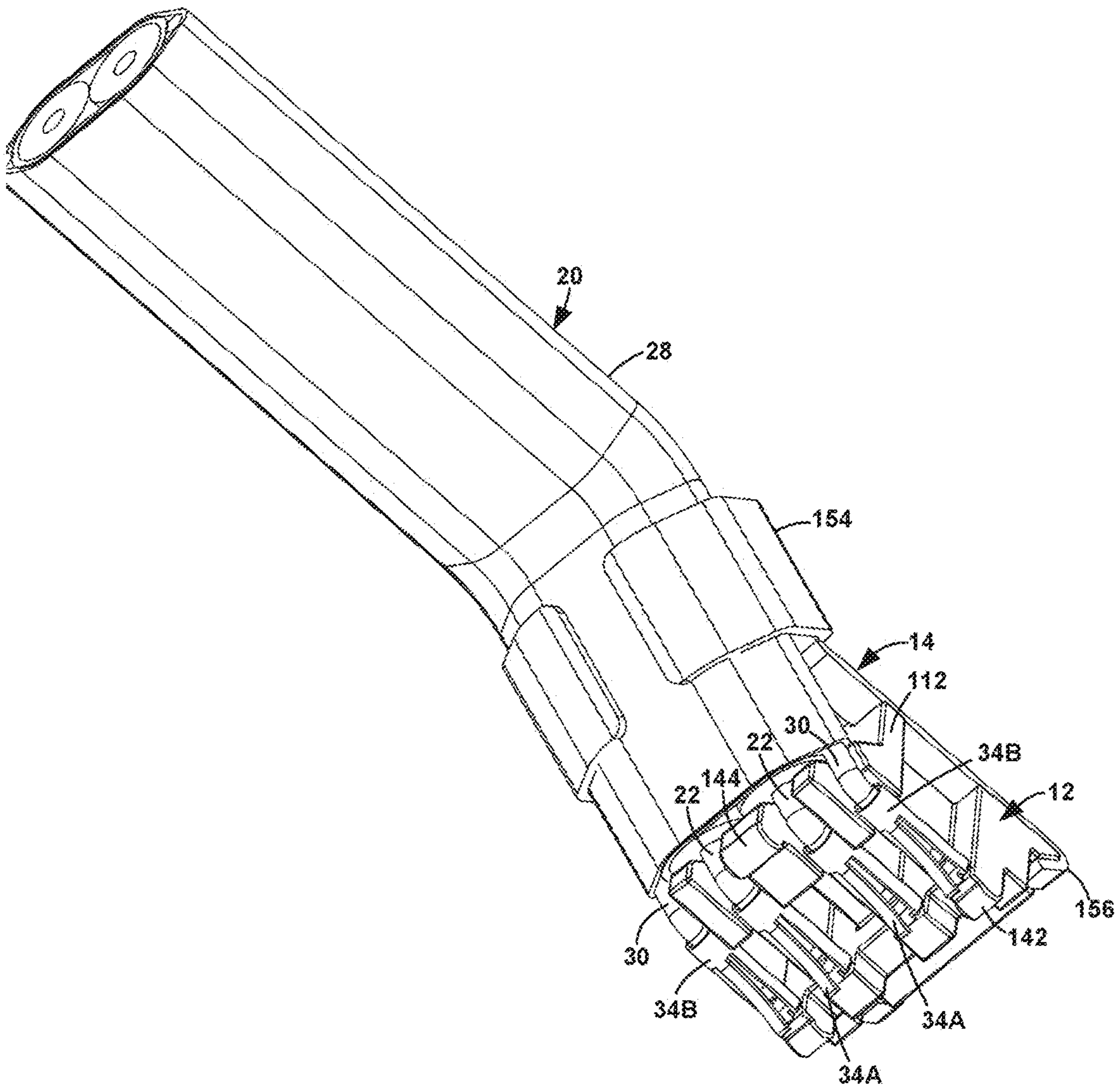
FIG. 2 is a bottom, isometric view of the termination of FIG. 1.
Figure 3:
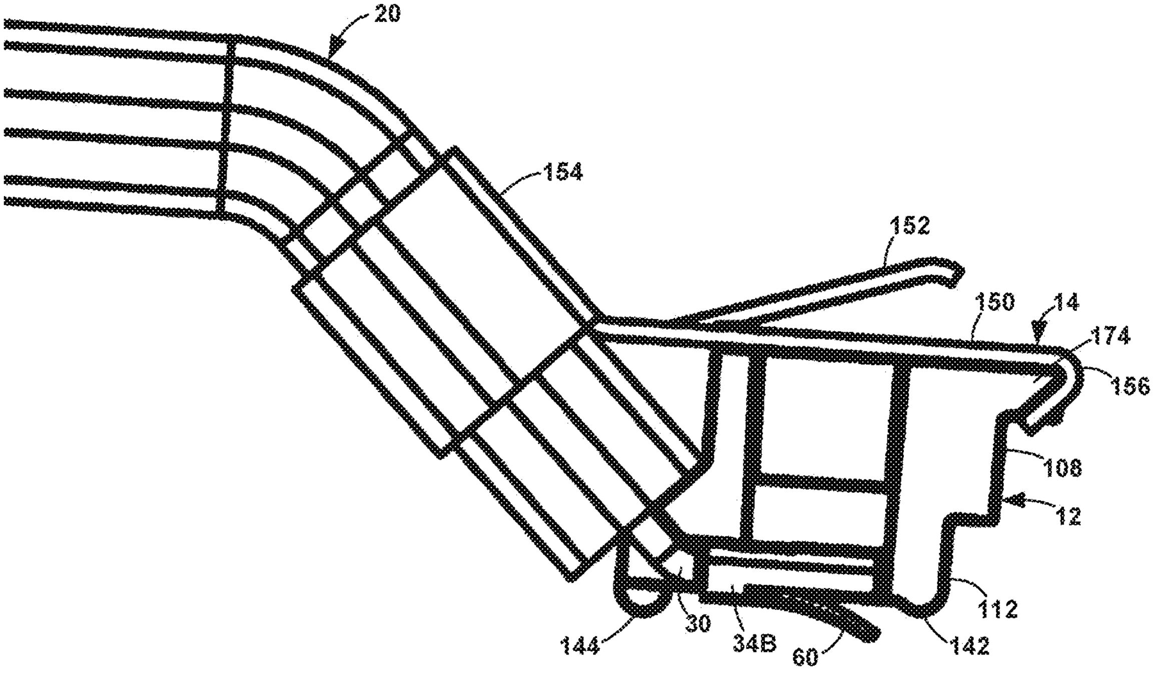
FIG. 3 is a side view of the termination of FIG. 1.
Figure 4:
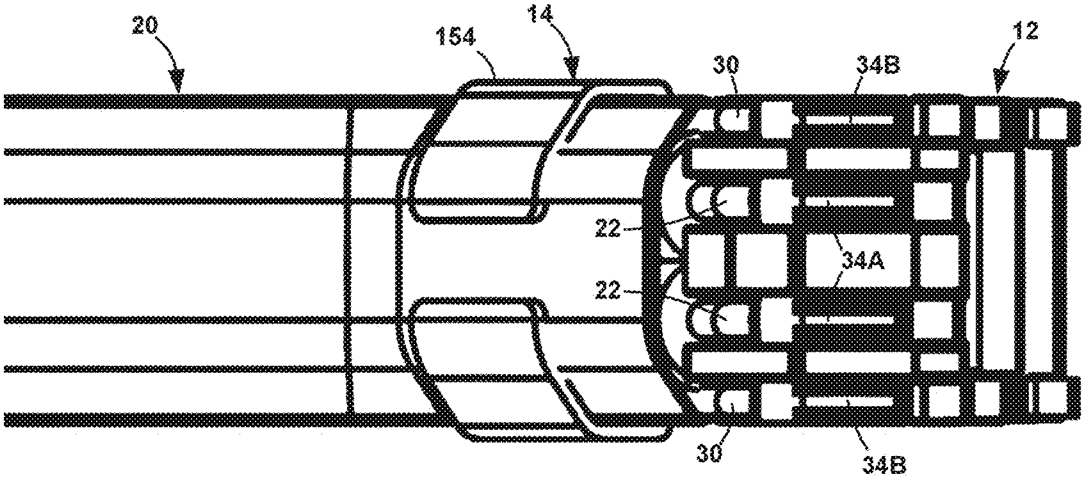
FIG. 4 is a bottom view of the termination of FIG. 1.
Figure 5:
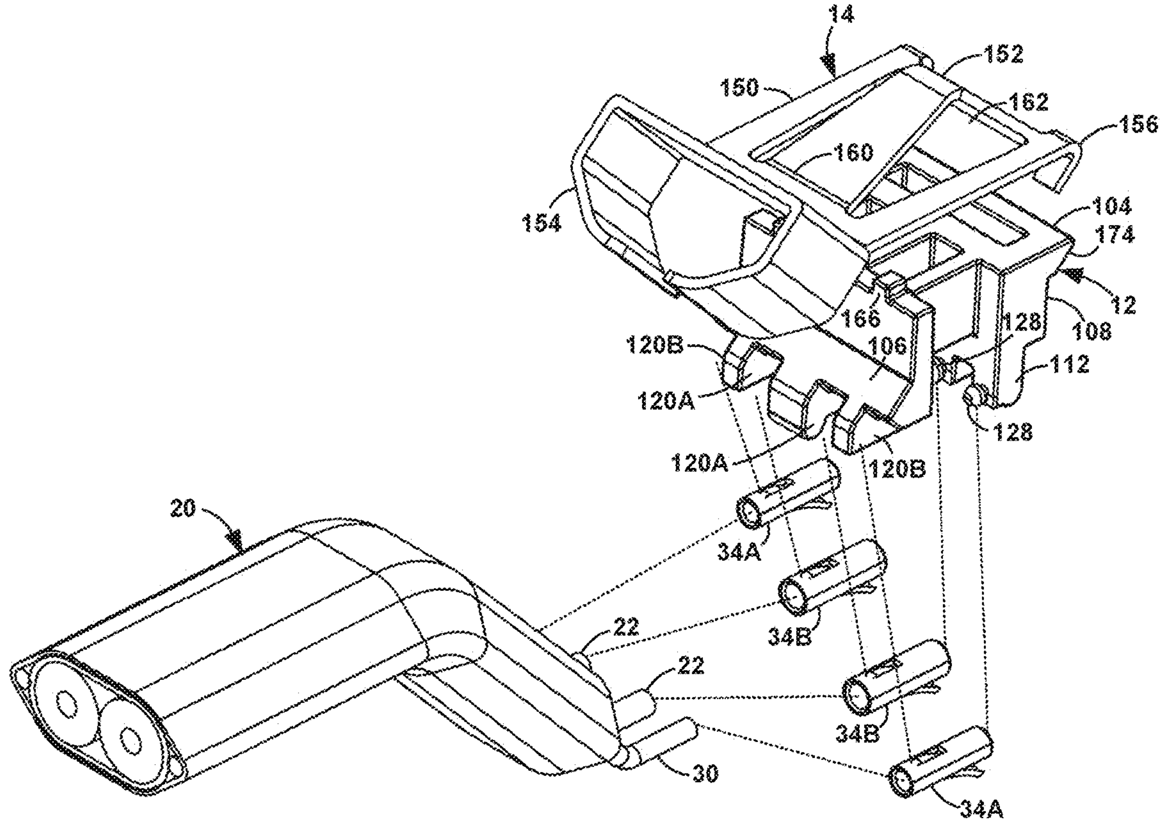
FIG. 5 is an exploded, isometric view of the termination of FIG. 1.
Figure 6:
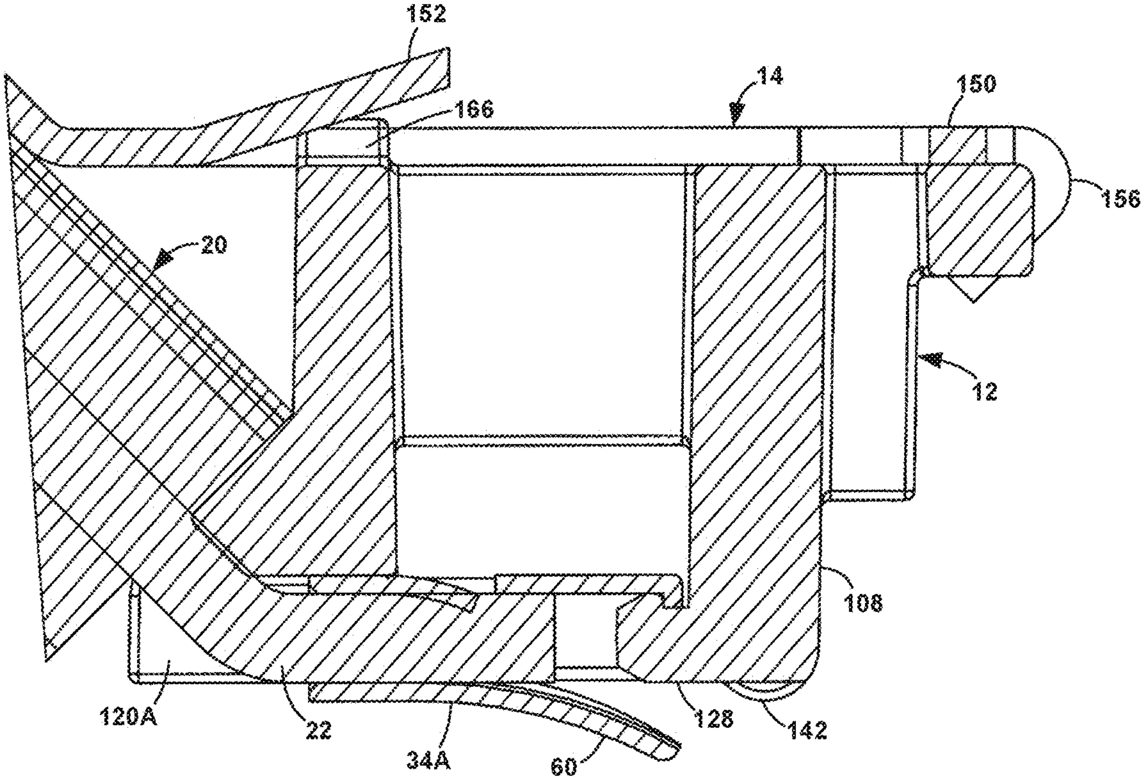
FIG. 6 is a side, cross-sectional view of the termination of FIG. 1.

Described herein is an apparatus and method for terminating a controlled-impedance cable 20 with compliant contacts that can mate directly with conductive pads and lands 4, 5, 6 on an electrical device 2.

The terminator 10 of the present invention is for use with a controlled-impedance cable 20. Such a cable 20 has one or more signal conductors 22, each surrounded by a dielectric 24. A ground shield 26 surrounds the dielectric(s) 24. Optionally, drain wires 30 extend along the ground shield 26. The term "ground shield" is used in a general way and can refer to any structure that operates as a ground shield, including but not limited to, conductive metalized wrap, foil, woven wire wraps, braids, drain wires, and/or combinations thereof. Optionally, a sheath 28 covers the ground shield 26 and drain wires 30. The term, "cable", in the present specification refers to a controlled-impedance cable.

The present specification describes the termination 10 of the present invention with a twinaxial (twinax) cable 20 with drain wires 30. It is understood, however, that the termination 10 can be adapted by persons of average skill in the art to controlled-impedance cables with different numbers of the conductors and different ground structures.

Figure 27:
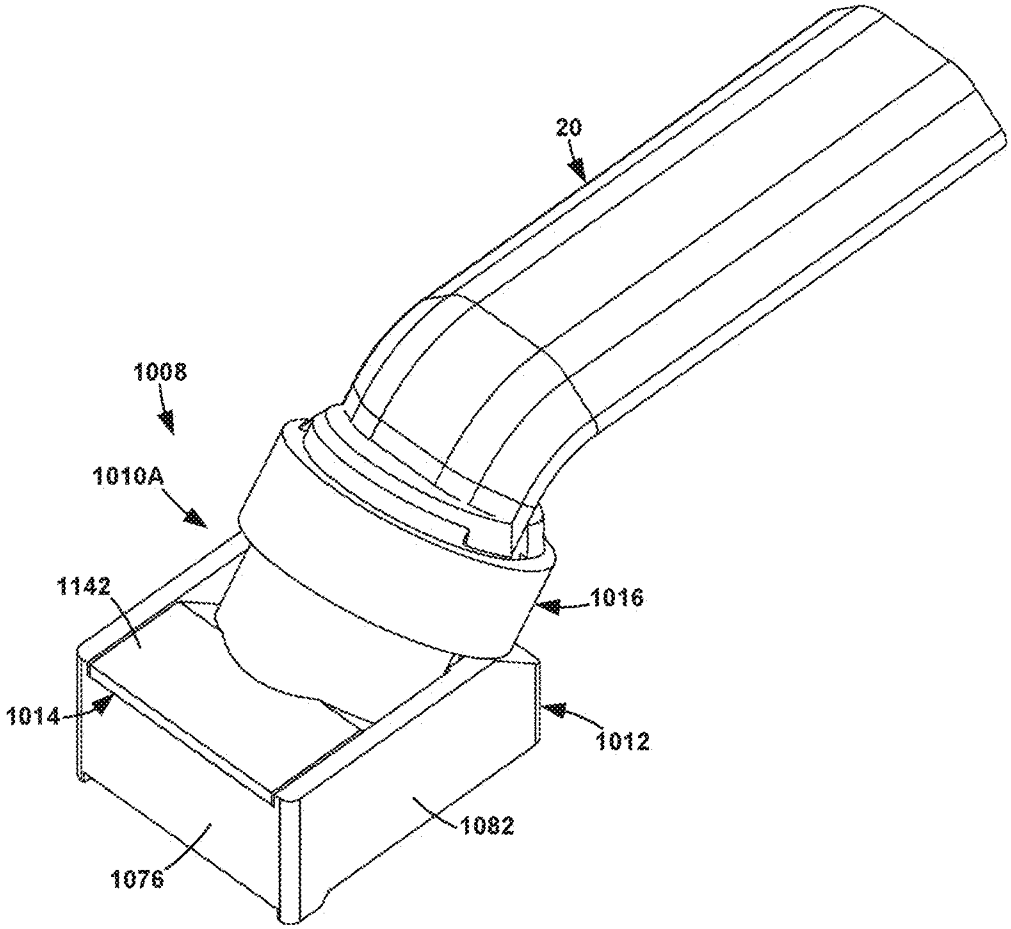
FIG. 27 is a top, isometric view of a first configuration of the second embodiment of the termination of the present invention.
Figure 28:
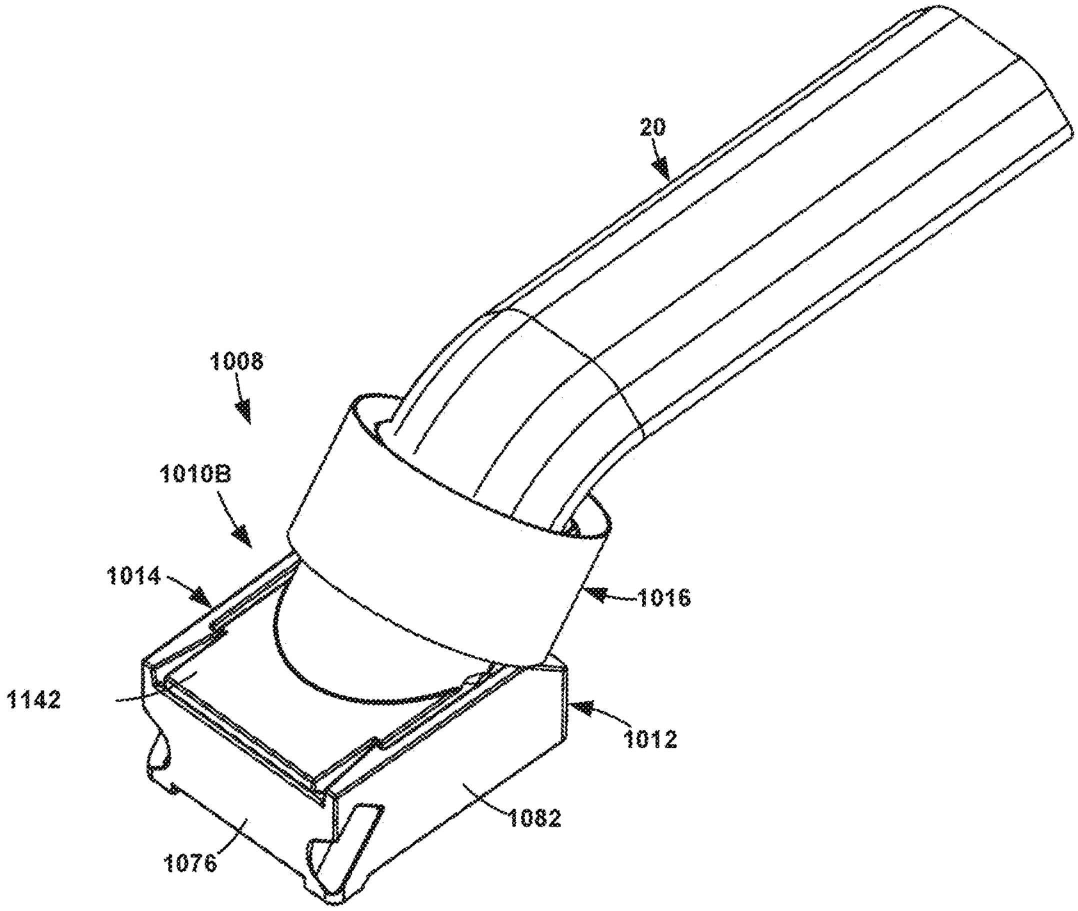
FIG. 28 is a top, isometric view of a second configuration of the second embodiment of the termination of the present invention.
Figure 97:
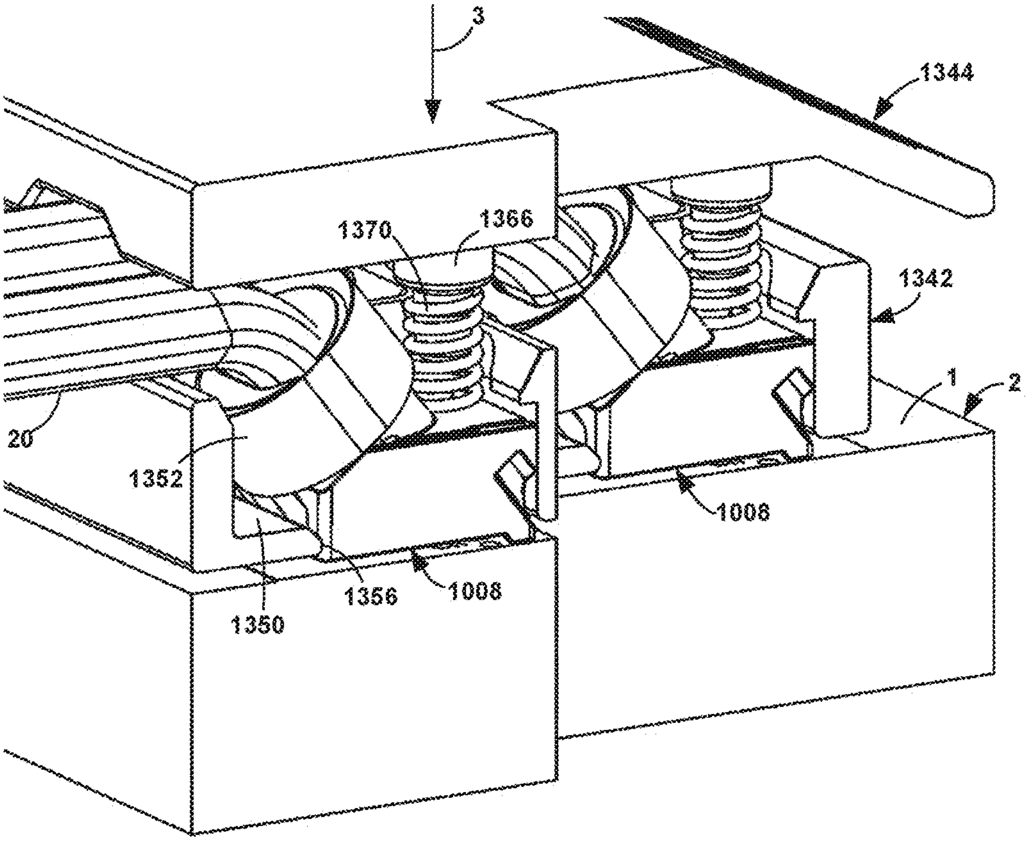
FIG. 97 is a side, cutaway view of the frame of FIG. 87 fully attached to the device.

Two exemplary embodiments of termination 10 are described. The first embodiment shown in FIGS. 1-26 and the second embodiment is shown in FIGS. 27-97.

Embodiment of FIGS. 1-26

The first embodiment of the present invention is a cable terminator 10 that employs compliant electrical contacts 34A, 34B (collectively, 34) to provide an interface between the controlled-impedance cable 20 and another electrical device 2. The assembly 10 is removably attached to the electrical device 2 by a compression force in a direction of compression 3, as described below.

The cable termination 10 of the present invention employs an anchor block 12, compliant signal contacts 34A for making the electrical connection between the signal conductors 22 and the electrical device 2, compliant ground contacts 34B for making the electrical connection between the ground shield 26 and the ground plane of the electrical device 2, and a clip 14 mounted to the anchor block 12 and cable 20.

Figure 8:
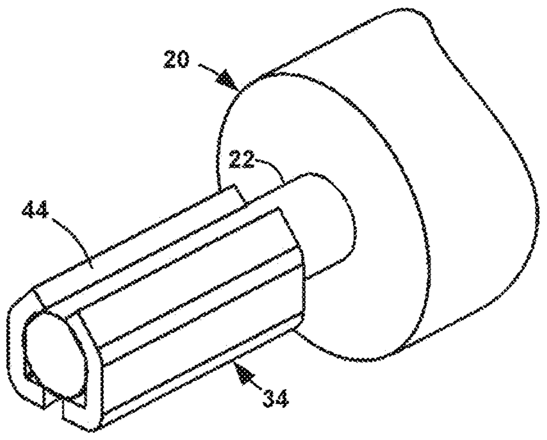
FIG. 8 is an isometric view of an installed crimped contact for the termination of FIG. 1.

FIGS. 8-16 show several configurations of a compliant contact 34 for use by the present invention. FIG. 8 shows a simple stamped contact 34 crimped around the signal conductor 22. Optionally, solder or adhesive can be used at the crimp opening 44 to facilitate bonding between the contact 34 and the signal conductor 22.

Figure 9:
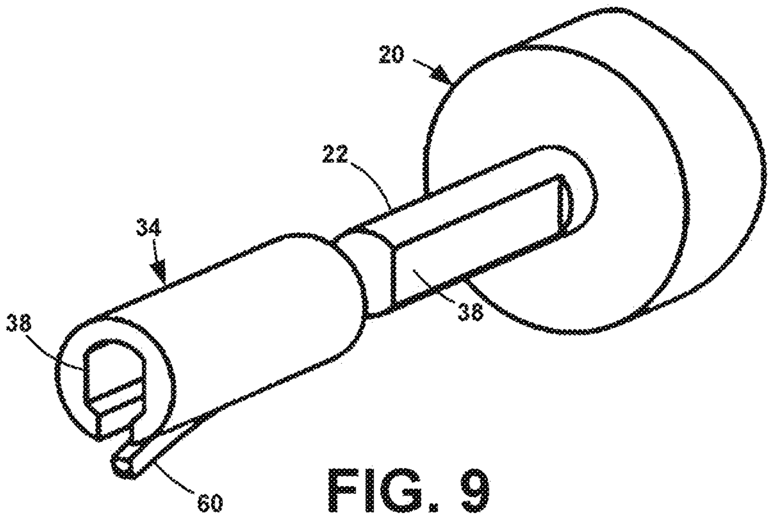
FIG. 9 is an isometric view of a cylindrical contact prior to installation for the termination of FIG. 1.
Figure 10:
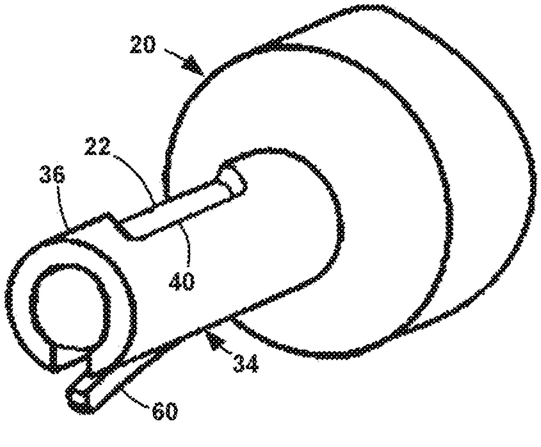
FIG. 10 is an isometric view of an installed cylindrical contact with solder opening for the termination of FIG. 1.

FIGS. 9 and 10 show a cylindrical contact 34 that is slid onto the signal conductor 22. Optionally, the conductor 22 and contact 34 are shaped to prevent rotation of the contact 34 on the conductor 22. FIG. 9 shows the contact 34 and conductor 22 with flat sides 38 to prevent rotation.

Optionally, as shown in FIG. 10, the contact 34 has a hole 40 in the body 36 for soldering or adhesive. After the contact 34 is slid onto the signal conductor 22, solder or adhesive is added through the hole 40 to facilitate bonding between the contact 34 and the signal conductor 22.

Figure 11:
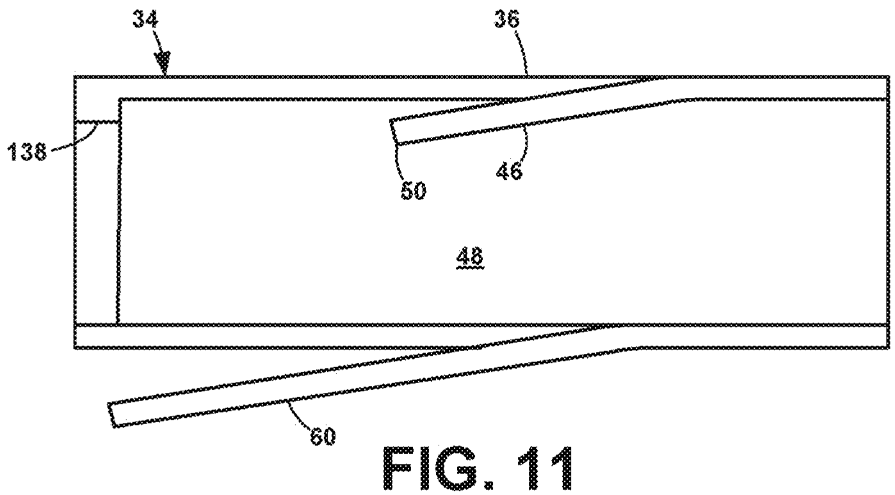
FIG. 11 is a cross-sectional view of a contact with a locking barb for the termination of FIG. 1.

Optionally, as shown in the cross-section of FIG. 11, the contact 34 has a locking barb 46. The locking barb 46 is bent slightly, at least 5°, from the contact body 36 into the contact bore 48 and has a sharp edge 50 at the end. When the contact 34 is slid onto the conductor 22 from the right in FIG. 11, the barb 46 is pushed outwardly. When trying to remove the contact 34 from the conductor 22, the sharp edge 50 digs into the conductor 22, preventing easy removal.

Figure 12:
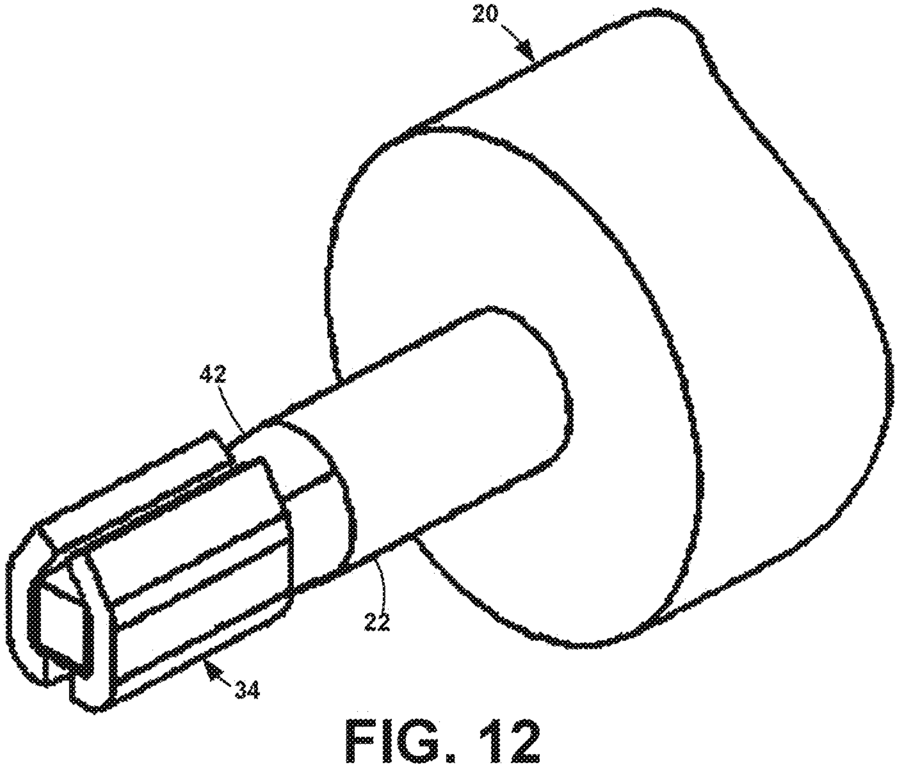
FIG. 12 is an isometric view of a crimped contact on a shaped conductor for the termination of FIG. 1.

Optionally, the signal conductor 22 is shaped, as at 42 in FIG. 12, prior to installing the contact 34. The shaping helps to maintain the general size of the cross-section of the signal conductor 22 after the contact 34 is attached. Another benefit of shaping is to remove any coatings or platings to facilitate a more effective soldering or bonding. The shaping can be done by, for example, forging, stamping, coining, drawing, or shaving. The shaping can be performed with external tooling, or by the contact 34 itself as it collapses around the signal conductor 22.

Figure 13:
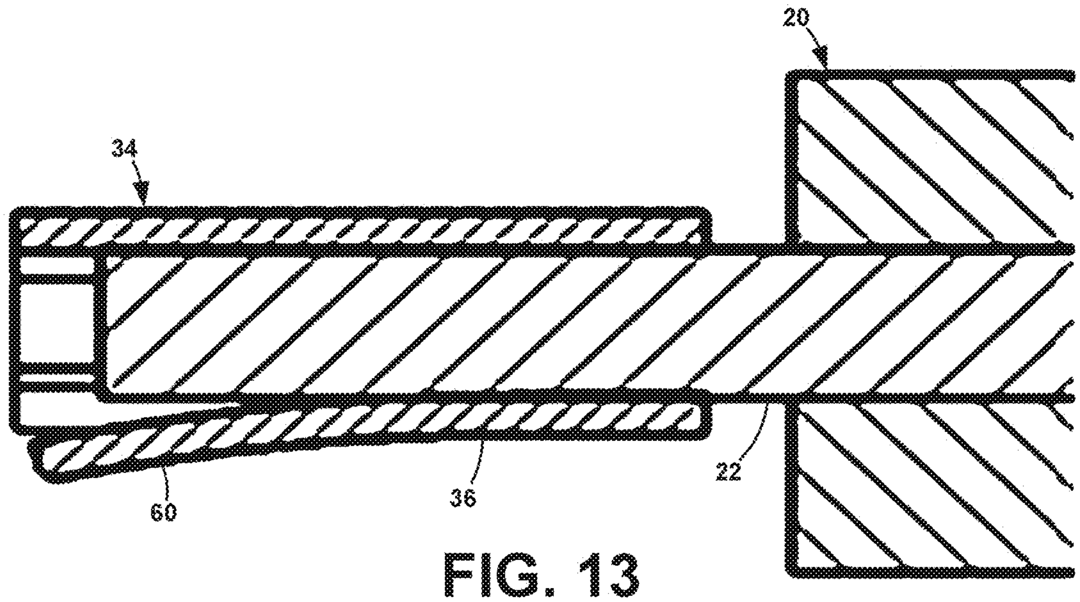
FIG. 13 is a cross-sectional view of a contact with a straight finger for the termination of FIG. 1.
Figure 14:
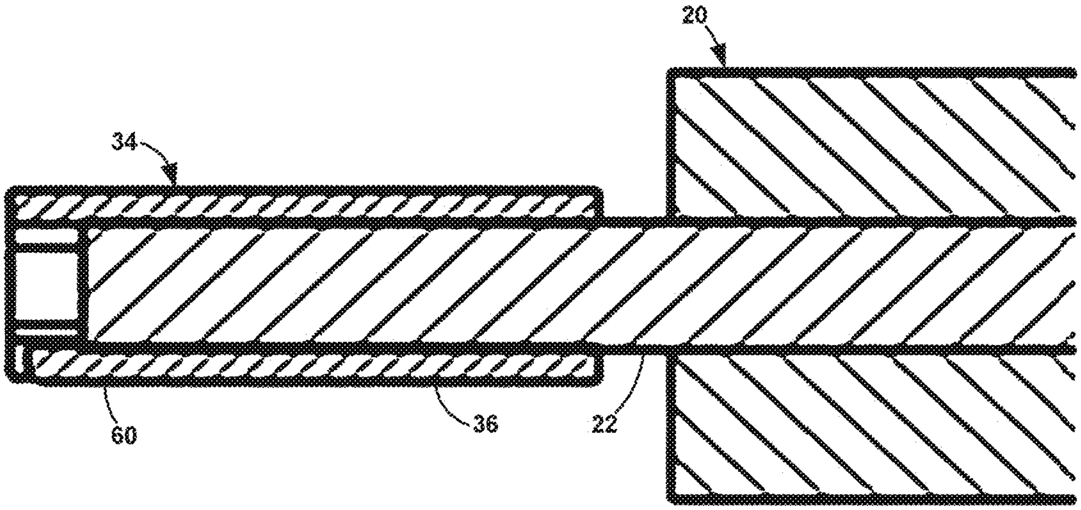
FIG. 14 is a cross-sectional view of the contact of FIG. 13 showing the finger as it looks engaged with a device pad.

The contact 34 is formed with a spring finger 60 extending outwardly from the contact body 36. When the contact 34 is produced, additional cuts are made so that a strip can be bent away from the contact body 36 to bias outwardly to form the finger 60. The bend angle is whatever angle results in the optimum balance between contact force and bending stresses in the contact material. In FIG. 13, the finger 60 is bent away from the contact body 36 but remains generally straight. When the finger 60 is compressed against the electrical device 2, the finger 60 deflects until the contact 34 forms a non-interrupted cylinder, as in FIG. 14. The property of non-interruption brings the contact 34 into an optimal shape for impedance control.

Figure 15:
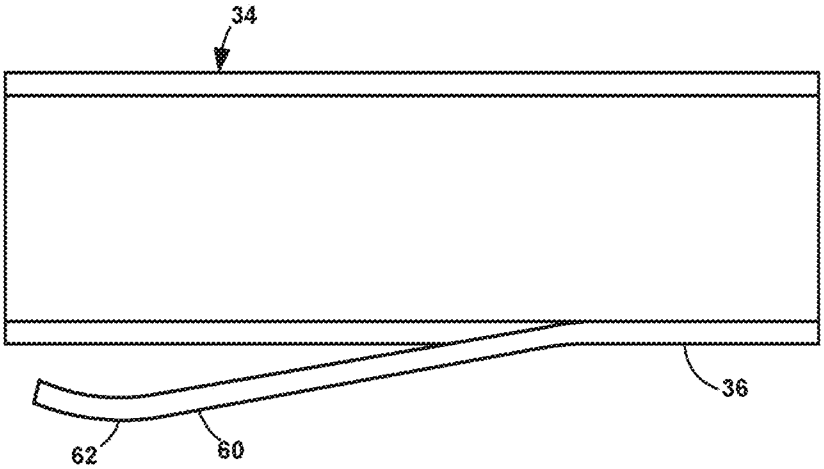
FIG. 15 is a cross-sectional view of a contact with a hooked finger for the termination of FIG. 1.
Figure 16:
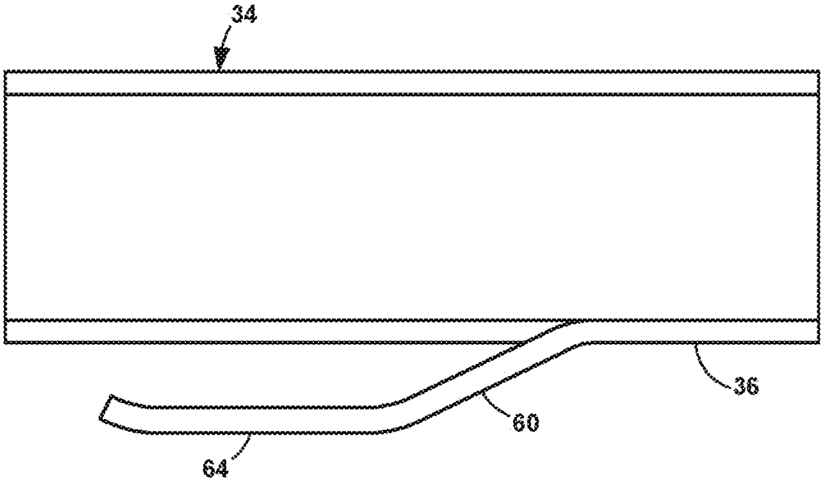
FIG. 16 is a cross-sectional view of a contact with a C-shaped finger for the termination of FIG. 1.

Alternatively, the finger 60 is shaped to help reduce wear on the pads 4, 5 on the device 2 as the finger 60 scrapes across the pad 4, 5 when attaching and detaching. In FIG. 15, the finger 60 has a slight hook 62 at the end. In FIG. 16, the finger 60 has a C shape, as at 64.

Figure 17:
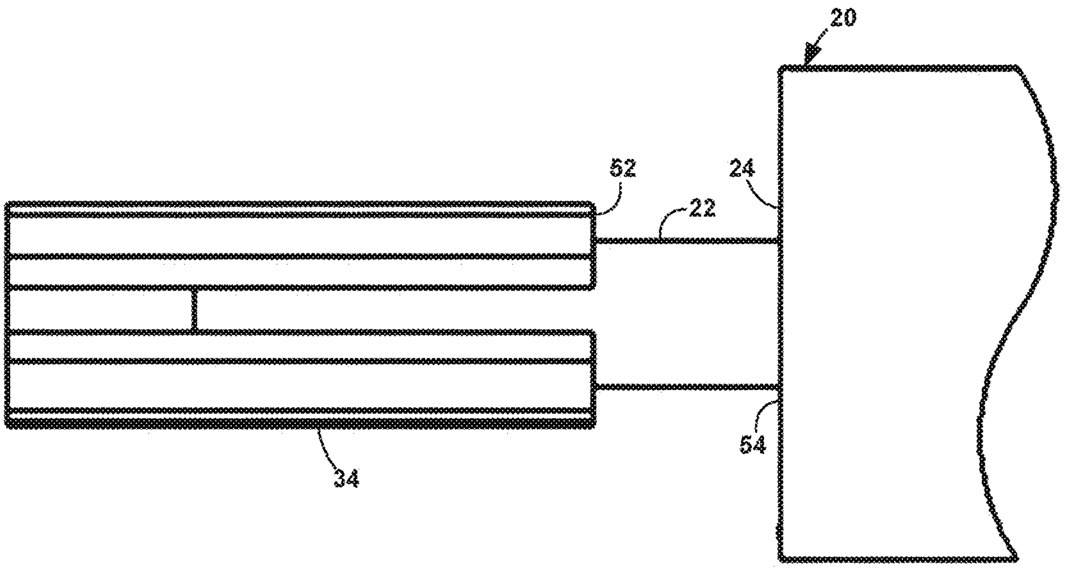
FIG. 17 is a top view of a contact showing important surfaces for the termination of FIG. 1.
Figure 18:
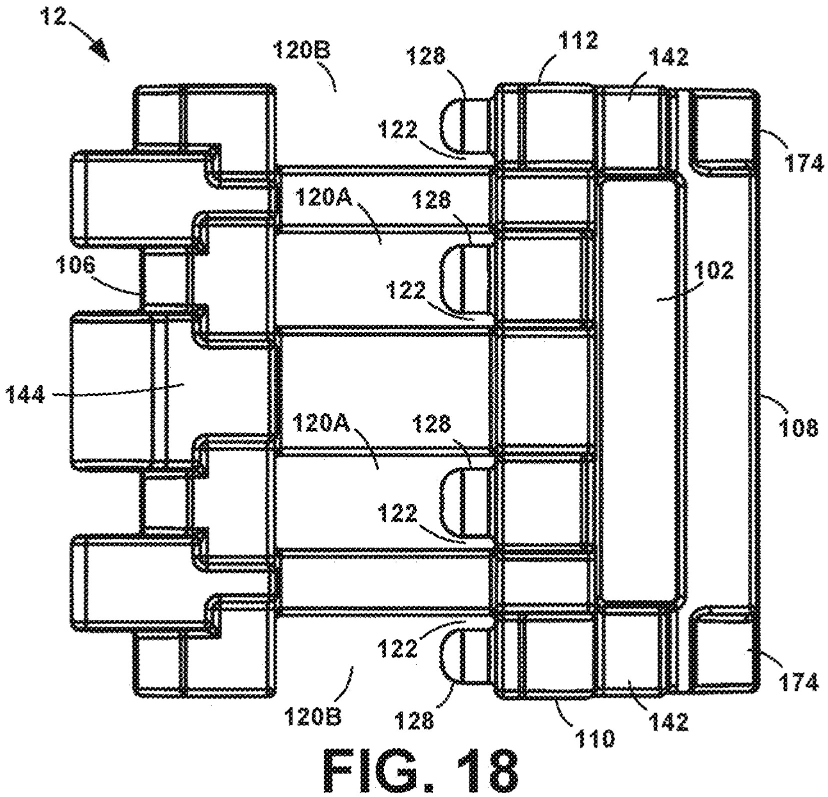
FIG. 18 is a bottom view of the anchor block for the termination of FIG. 1.

FIG. 17 indicates the face 52 of the contact 34 closest to the cable dielectric 24 and the face of the trimmed back dielectric 24. The relative positions of these surfaces 52, 54 and the length of the contact 34, among other things, control the phase length of the assembly as well as how much of the contact 34 extends past the end of the conductor 22. The present invention recognizes the need to precisely control cable length, trim, and contact position on the signal conductors 22 for optimal phase length and impedance control.

The anchor block 12 is composed of a nonconductive material and holds the compliant contacts 34 and clip 14. The anchor block 12 has a device surface 102 that abuts the electrical device 2 and a clip surface 104 opposite the device surface 102 to which the clip 14 is attached. The anchor block 12 has a cable surface 106 where the cable 20 comes into the anchor block 12 and a nose surface 108 opposite the cable surface 106. The anchor block 12 has two sides 110, 112 that are typically mirror images of each other. The sides 110, 112 of the anchor block 12 are designed so that anchor blocks 12 can be placed next to each other without the need for extra spacing.

The anchor block 12 has signal contact channels 120A and ground contact channels 120B (collectively, 120) in the device surface 102. The channels 120 are open depressions in the device surface 102 that extend parallel to the device surface 102. The channels 120 are open at the cable surface 106 and extend toward the nose surface 108 to a wall 122. The spacing between channels 120 depends on the spacing between the corresponding signal conductors 22 and drain wires 30 of the cable 20.

The depth of each channel 120 depends on the size of the contact 34 installed in the channel. The depth must be such that the contact spring finger 60 extends below the device surface 102 when the contact 34 is installed so that the spring finger 60 can make contact with the device pad 3, 4 without interference from the anchor block 12.

The contact 34 is retained in the channel 120 by a knob 128 that extends into the channel 120 from the channel front wall 122. The knob 128 has an enlarged head 132 at the end of a neck 134 that forms a shoulder 136 perpendicular to the channel 120. The contact 34 has a 900 radial lip 134 extending inwardly, as shown in FIG. 10. When the contact 34 is pressed onto the knob 128, the lip 134 snaps onto the knob 128. The lip 138 abuts the shoulder 136 to retain the contact 34 on the knob 128 and in the channel 120.

The device surface 102 of the anchor block 12 has spacing feet 142, 144 that maintain a minimum spacing between the contact body 36 and the device 2. The optimium spacing is whatever results in the minimum impedance change. In the present design, there are two front feet 142 adjacent to the nose surface 108 and a back foot 144 adjacent to the cable surface 106.

Figure 19:
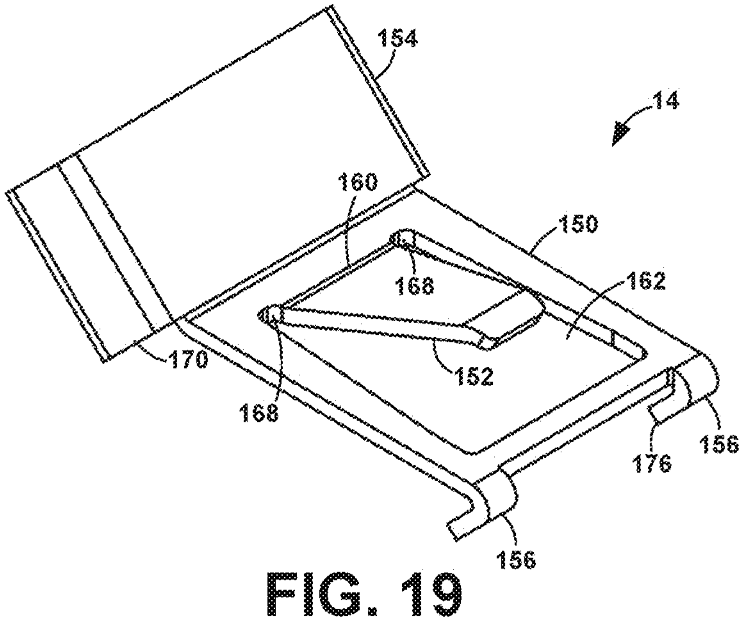
FIG. 19 is a top, isometric view of the clip for the termination of FIG. 1.
Figure 20:
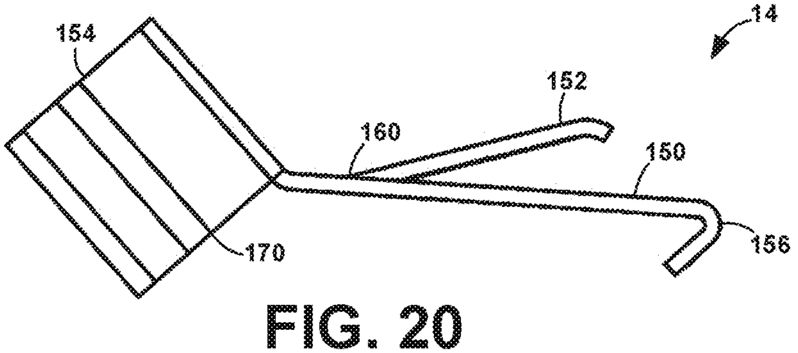
FIG. 20 is a side view of the clip of FIG. 19.

The clip 14, shown in FIGS. 19 and 20, holds the cable 20 to the anchor block 12, provides strain relief to the cable 20, and provides compliant pressure for the contacts 34 against the device pads 4, 5. The clip 14 has a flat body 150, a compression arm 152, a clamp 154, and a hook 156. The body 150 lays flat against the clip surface 104 of the anchor block 12.

The compression arm 152 is stamped out of the body 150 and bent outwardly at an angle, as at 160. The bend angle is whatever angle results in a balance of an optimum downward force and stresses in the clip material. The downward force value is defined as a value that overcomes the contact forces, with margin to account for pull forces, shock, and vibration encountered in the operating environment. The stamping leaves an opening 162 in the body 150.

Optionally, studs 166 extend outwardly from the anchor block clip surface 104 into corners 168 of the opening 162 to provide alignment and stability.

The clamp 154 extends from the rear of the clip body 150 at about a 45° angle away from the anchor block 12. The clamp 154 has wings 170 that extend around and securely grasp the cable 20.

At the front of the clip body 150 is a hook 156 formed by bending the body 150 downwardly greater than 90°. The hook 156 fits around a lip 174 protruding from the nose surface 108 adjacent to the clip surface 104. The hook 156 may extend across the entire width of the clip 14 or may be composed of several smaller hook elements 176, as in FIG. 18.

Figure 21:
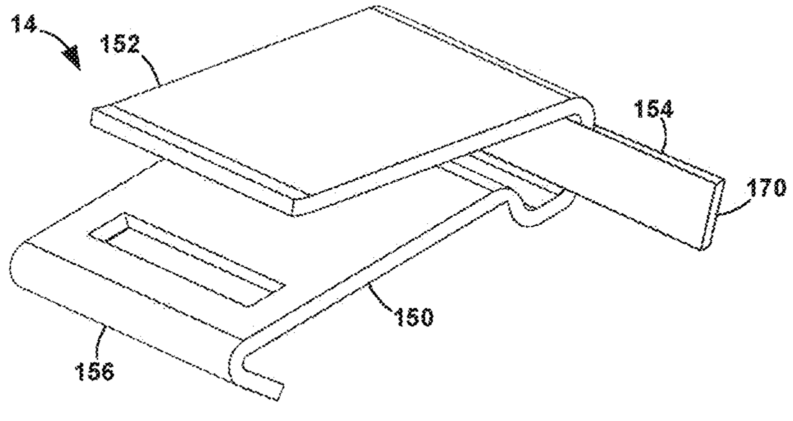
FIG. 21 is a top, isometric view of another clip for the termination of FIG. 1.
Figure 22:
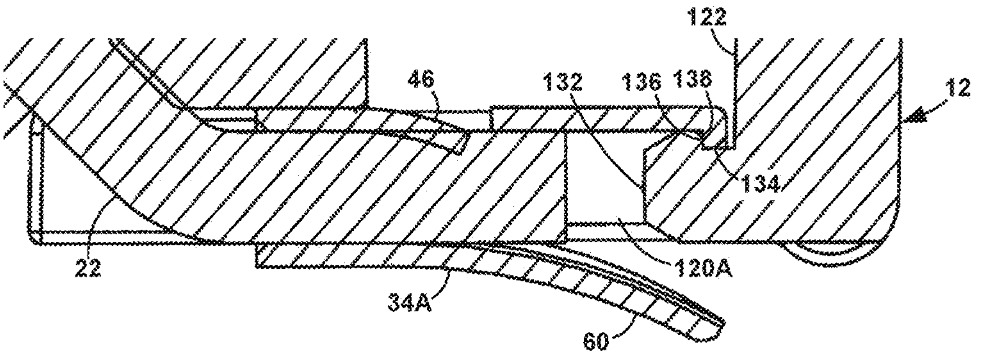
FIG. 22 is a cross-sectional view of a contact installed in the anchor block for the termination of FIG. 1.

An alternate clip 14 is shown in FIG. 21.

Figure 7:
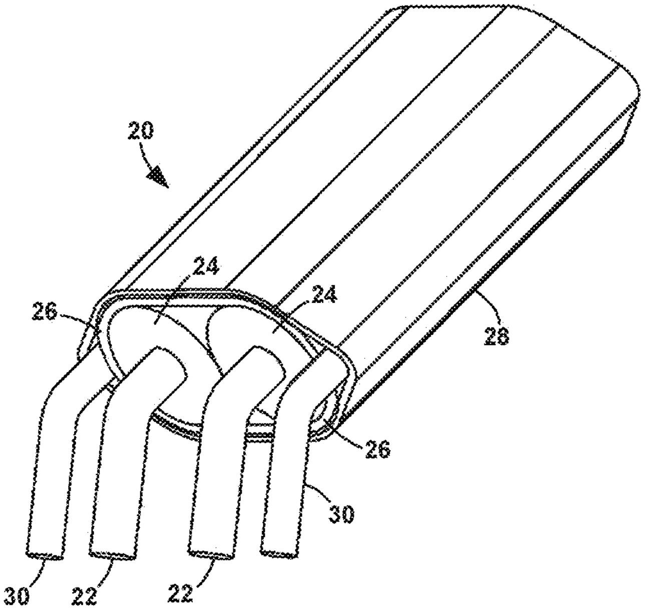
FIG. 7 is an isometric view of the end of a twinaxial cable for use with the termination of FIG. 1.

To assemble the termination 10 to a cable 20 to form the termination assembly 8, the cable 20 is first prepared by trimming back the sheath 28, ground shield 26, and dielectric 24 to expose the signal conductor 22 and, if available, the drain wires 30, as in FIG. 7. The compliant signal contacts 34A are attached to the exposed signal conductors 22 and compliant ground contacts 34B are attached to the exposed drain wires 30. In the present specification, "permanently attached" means non-separable, for example, crimping, soldering, gluing, welding, and coining. Optionally, the cable trimming and contact positioning is controlled to provide more precise phase and impedance matching.

The contacts 34 are inserted into the appropriate channels 120 and pushed toward the nose surface 104 until the contacts 34 snap into the knobs 128.

The clip 14 is installed onto the anchor block 12 by placing the hook 156 over the anchor block lip 174 and pivoting the clip body 150 downwardly until the studs 166 are within the opening corners 168. The cable 20 is bent until it touches the clamp 154 and the wings 170 are bent around and cinched to the cable sheath 28.

The contacts 34 snapped onto the knobs 128 and the clamp 154 pulling the cable 20 upwardly secure the cable 20 and contacts 34 in the anchor block 12 to hold the termination assembly 8 together.

Figure 23:
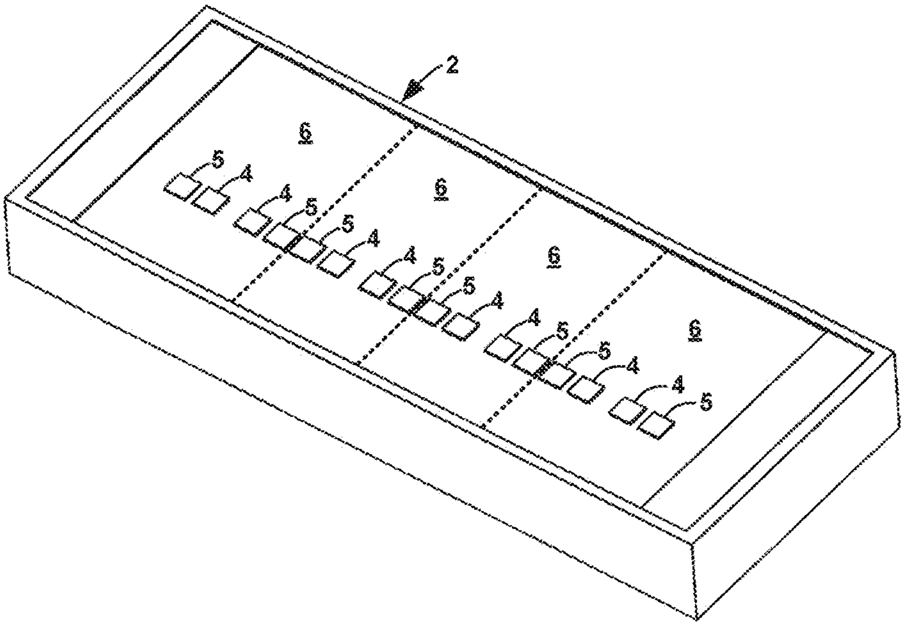
FIG. 23 is an isometric view of a device adapted to receive four terminations for the termination of FIG. 1.
Figure 24:
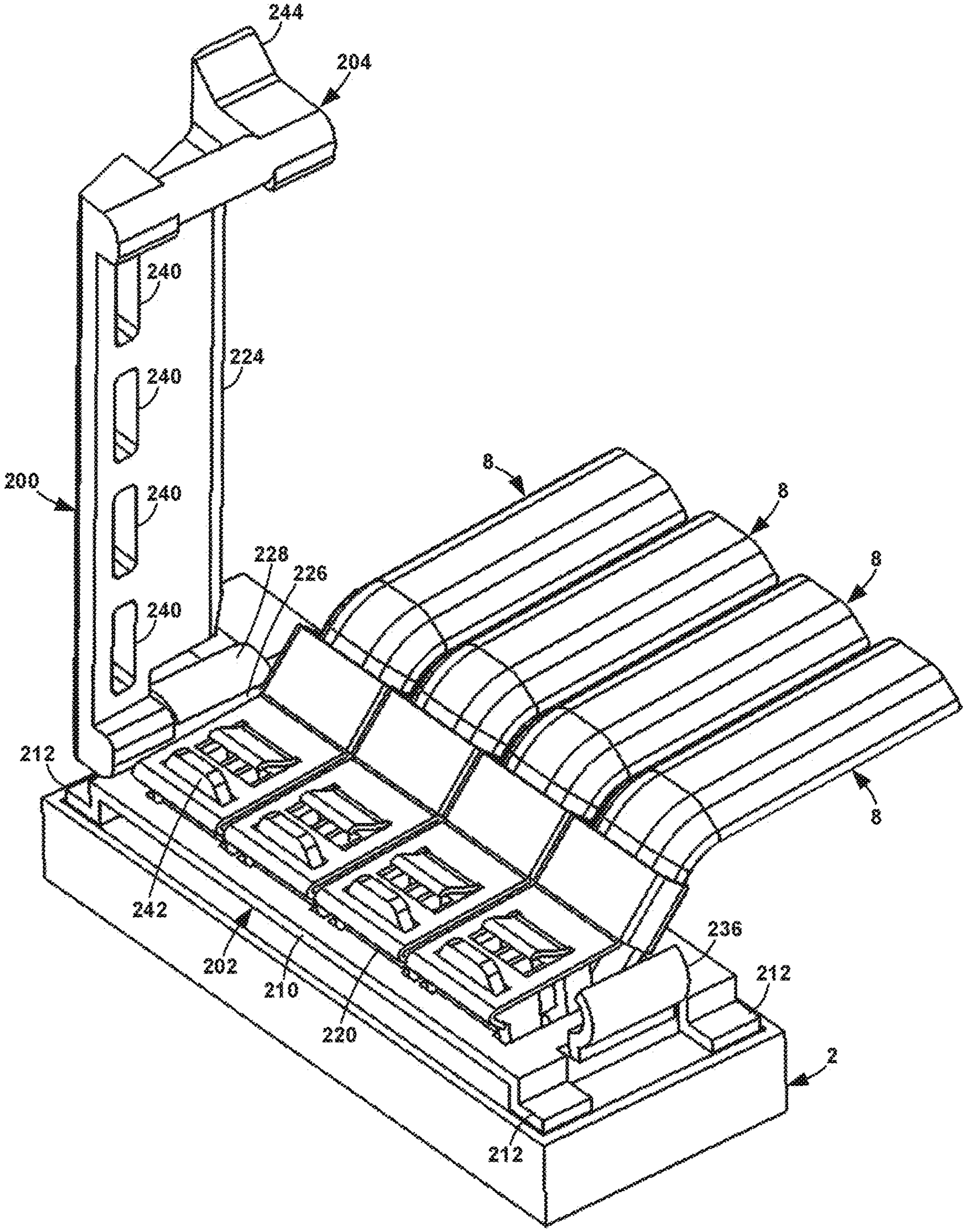
FIG. 24 is a top, isometric view of four terminations of FIG. 1 partially attached to the device.
Figure 25:
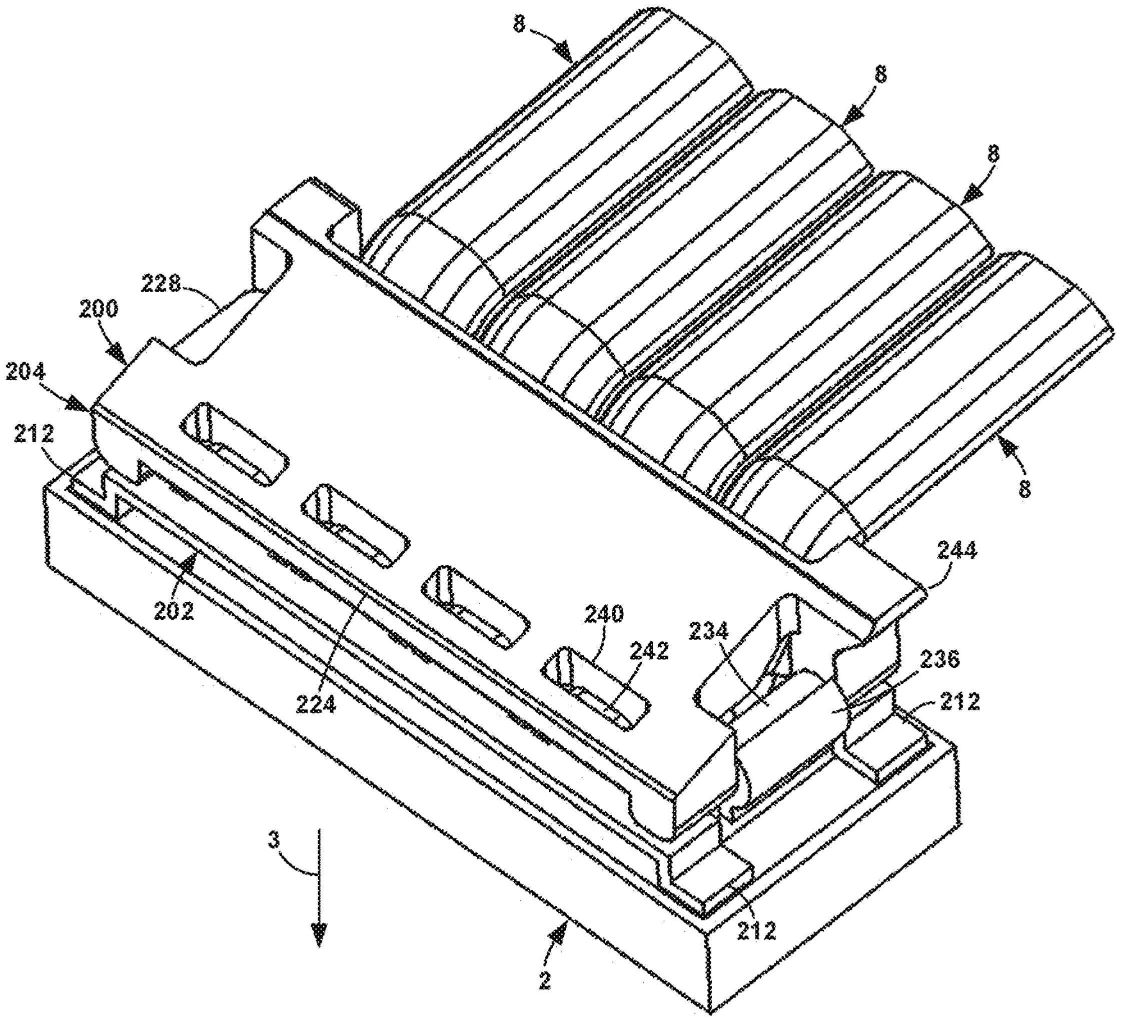
FIG. 25 is a top, isometric view of four terminations of FIG. 1 attached to the device.
Figure 26:
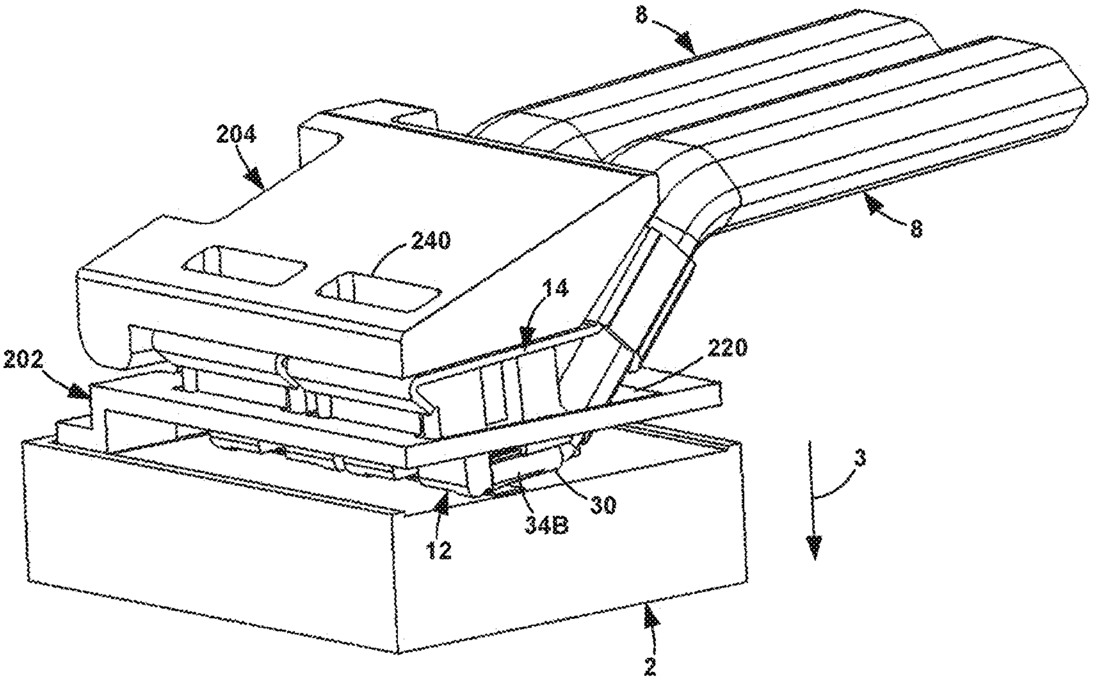
FIG. 26 is a side, cutaway view of terminations of FIG. 1 attached to the device.

FIGS. 23-26 show how four of the termination assemblies 8 of FIG. 1 are attached to a device 2. FIG. 23 shows a section of device 2 with pads 4, 5 for attachment by four adjacent twinax termination assemblies 8. Note the spacing between adjacent termination sections 6, that is, between two adjacent ground pads 5, is no larger than the spacing between a signal pad 4 and its adjacent ground pad 5. This is possible because the anchor blocks 12 are designed to be placed adjacent to one another without needing extra space therebetween.

The termination assemblies 8 are removably attached to the device 2 by a frame 200 that comprises a lattice 202 and a cover 204. The lattice 202 has a body 210 and feet 212 that attach to the device 2 with the body 210 spaced from the device 2. The feet 212 attach to the device 2 by surface-mount soldering but the present invention contemplates that the feet 212 can be attached using any practical method.

The body 210 of the lattice 202 has a cutout 220 into which the termination assemblies 8 are inserted. The cutout 220 is positioned such that the termination assemblies 8 are in the correct position over the pads 4, 5.

The cover 204 attaches to the ends of the lattice 202 as described below to hold the termination assemblies 8 against the device 2 in the direction of compression 3. The cover 204 has a body 224 that spans the termination assemblies 8.

One end of the cover 204 is pivotally attached to one end of the lattice 202. A cylindrical pin 226 on the cover 204 snaps into a corresponding tubular socket 228 on the lattice 202 so that the pin 226 rotates in the socket 228.

The other end of the cover 204 has a cylindrical bar 234 that snaps into a concave, semicylindrical receptacle 236.

The cover body 204 has key holes 240 into which tabs 242 on the clip surface 104 of the terminations 10 fit. Alternatively, tabs on the bottom of the cover body fit into holes in the clip surface 104 of the terminations 10. The tabs 242/holes 240 help to maintain the correct positioning of the terminations 10.

To install the terminations 10, they are placed in the appropriate manner in the cutout 220. The cover 204 is pivoted downwardly until the bar 234 snaps into the receptacle 236. At this point, the cover 204 is pushing down on the compression arm 152 of the clip 14, compressing the terminations 10 against the device 2. To remove the terminations 10, an opening tab 244 on the bar end of the cover 204 is pulled up to release the bar 234 from the receptacle 236.

The termination 10 of the present invention provides compliance in two independent ways. In the first, the contact springs 60 provide compliance at the device pads 4, 5, in part, to adjust for any non-planarities on the surface of the device 2. In the second, the clip compression arm 152 provides compliance for each of the termination assemblies 8 when compressed to the device 2 by the frame cover 204.

Embodiment of FIGS. 27-97

Figure 85:
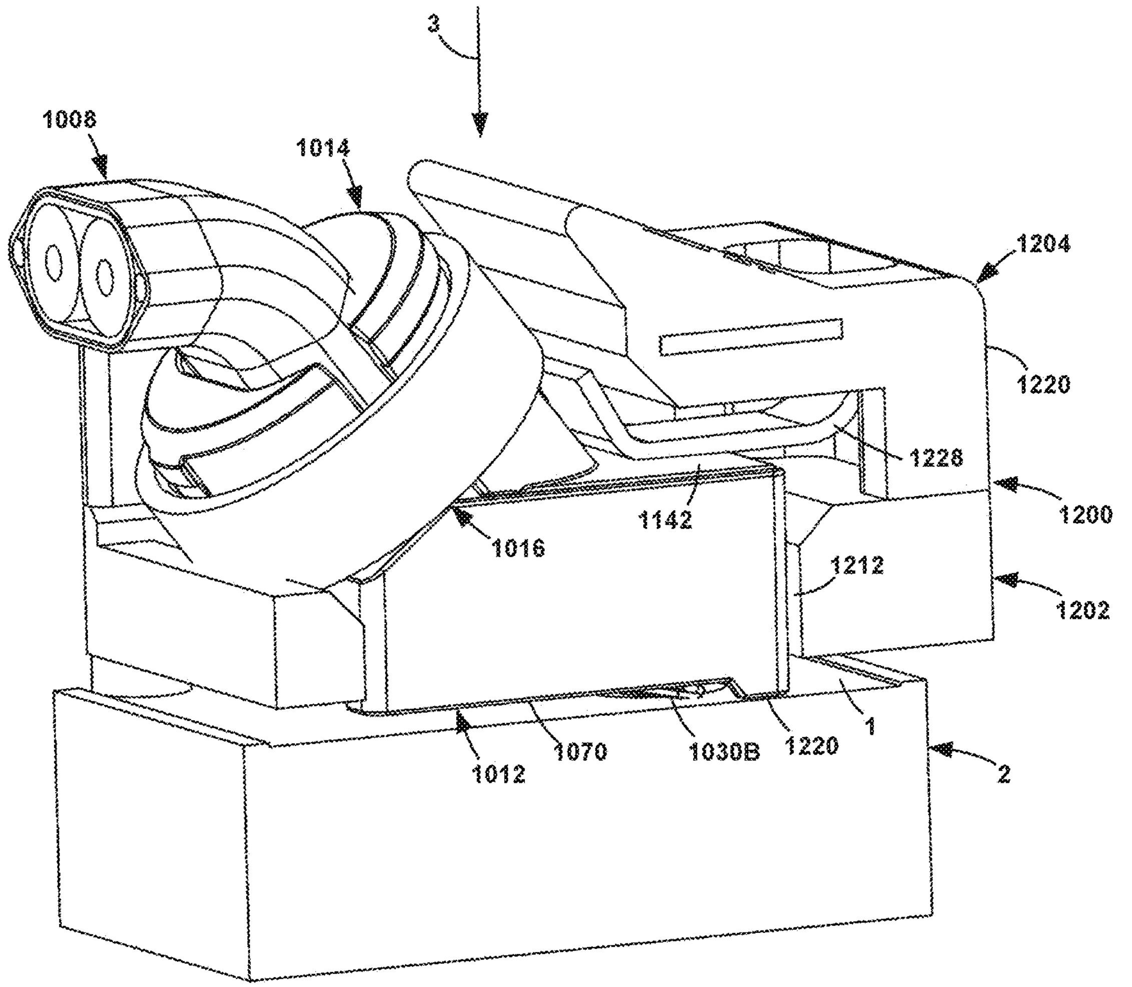
FIG. 85 is a side, cutaway view of terminations of FIGS. 27 and 28 attached to the device.
Figure 96:
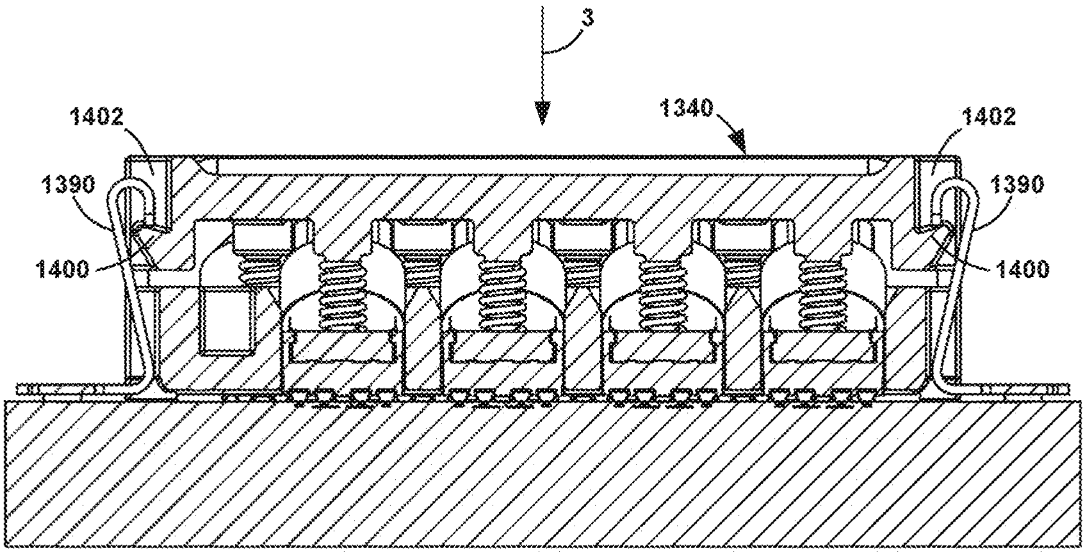
FIG. 96 is a side, cross-sectional view of the frame of FIG. 87 fully attached to the device.

The second embodiment of present invention is a cable terminator 1010 that employs compliant electrical contacts 1030A, 1030B (collectively, 1030) to provide an interface between the controlled-impedance cable 20 and another electrical device 2. The terminator 1010 is removably attached to the electrical device 2 by a compression force in a direction of compression 3 as described below. The direction of compression 3 is the direction that is perpendicular to the surface 1 of the device 2, as shown in FIGS. 85 and 96.

The second embodiment comes in a first configuration 1010A shown in FIGS. 27 and 53-66 and a second configuration 1010B shown in FIGS. 28 and 67-80. Both configurations employ a housing 1018 that includes an anchor block 1012, a cap 1014 for securing the cable 20 to the anchor block 1012, and a collar 1016 for securing the cap 1014 to the anchor block 1012. Prior to installation in the housing

1018, compliant signal contacts 1030A for making the electrical connection between the signal conductors 22 and the electrical device 2 and compliant ground contacts 1030B for making the electrical connection between the ground shield 26 and the ground plane 9 of the electrical device 2 are attached to the cable 20.

A number of different configurations for the contact 1030 are described below. The configurations described are merely illustrative, not exhaustive, of configurations that can be employed. The configurations are discussed below relative to the signal conductor 22, but are also applicable to the drain wire 30.

Figure 29:
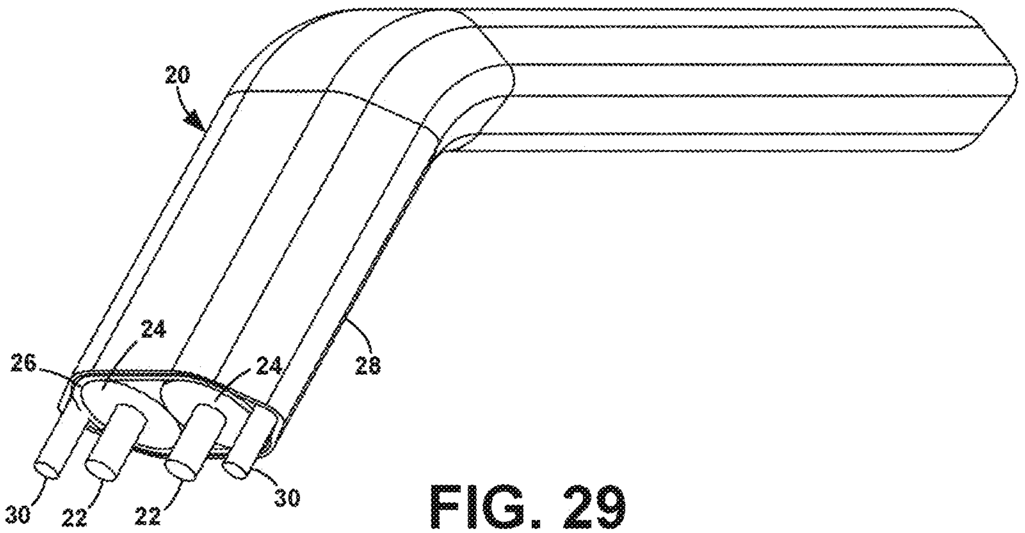
FIG. 29 is an isometric view of the end of a twinaxial cable for use with the terminations of FIGS. 27 and 28.

The contacts are installed on a cable 20 like that shown in FIG. 29. Although the cable 20 is shown in the figures as a twinax cable, the present invention is not limited to a twinax cable and may be employed with cables having one or more signal conductors. The cable 20 is prepared by trimming back the sheath 28, ground shield 26, and dielectric 24 to expose the ends of the signal conductors 22 and, if available, the drain wires 30. The length of the exposed signal conductors is determined by the compliant contact 30 that is used.

Figure 30:
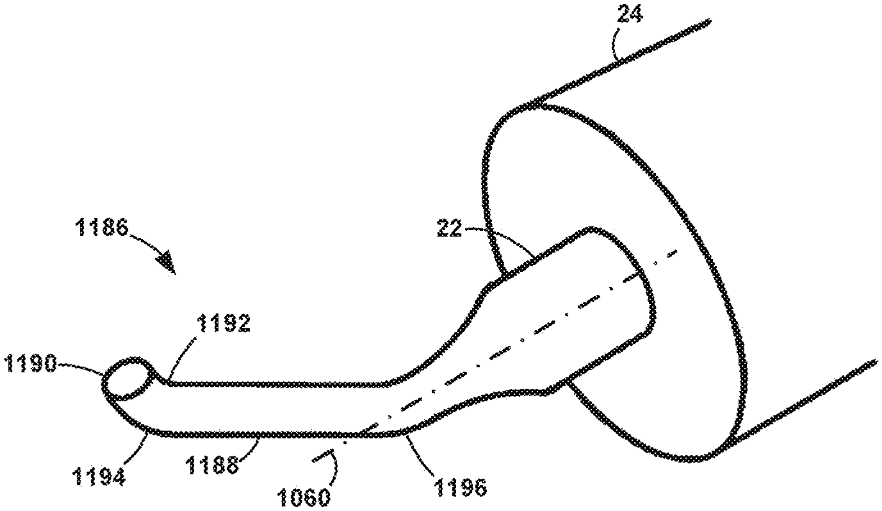
FIG. 30 is an isometric view of a first configuration of a contact for the terminations of FIGS. 27 and 28.
Figure 31:
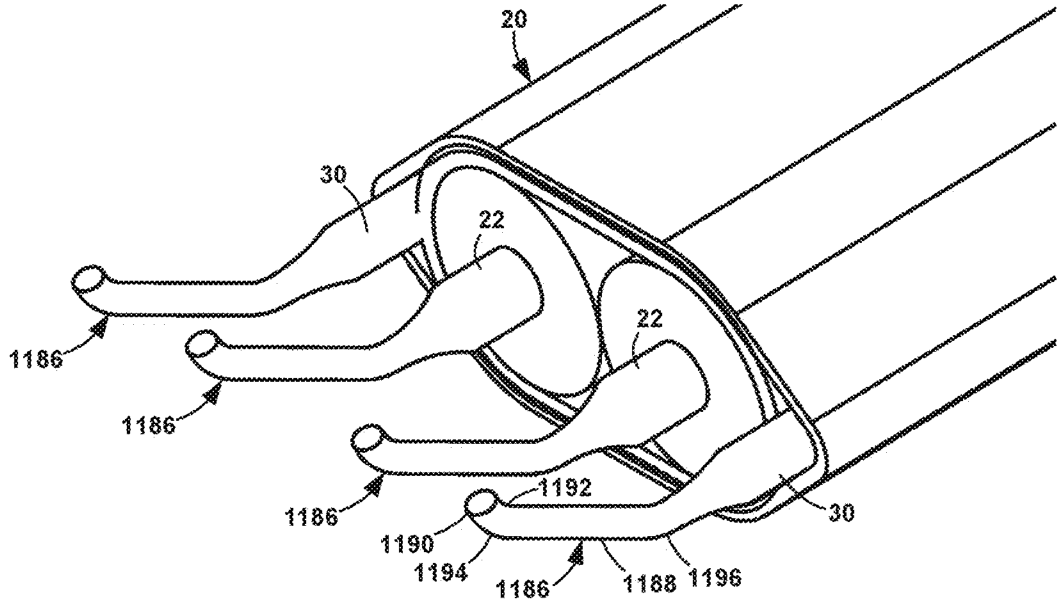
FIG. 31 is an isometric view of a first configuration of FIG. 30 with a cable.

The first configuration 1186 of a compliant contact 1030 for use by the present invention is shown in FIGS. 30-31. The contact configuration 1186 is the exposed end of the conductor 22 formed into a contact. The end of the signal conductor 22 is bent toward the conductor axis 1060, as at 1196, to form a spring finger 1188 extending outwardly at an angle to a tip 1190. The parameters of the spring finger 1188 and the bend angle 1196 are discussed below. The tip 1190 of the spring finger 1188 is bent, as at 1192, to form a curved contact point 1194, in part to reduce wear on the device 2.

Many methods for forming the contact 1186 are well-known in the art and the any method that is appropriate for the material and the desired shape may be used. Methods can include bending, punching, coining, swaging, spanking, chamfering, and shearing.

The main advantage to this contact 1186 is that, since it is formed from the conductor 22 itself, there is no additional attachment that will affect the impedance. Also, the cylindrical shape of the conductor 22 is continued throughout the length of the contact 1186, making it easier to maintain impedance.

The remainder of the contact configurations are separate components that are attached to the end of the conductor 22. A separate component may be necessary when the material from which the conductor 22 is composed does not have the mechanical characteristics needed for the particular application. A separate component can be made of a more appropriate material or combination of materials.

Figure 32:
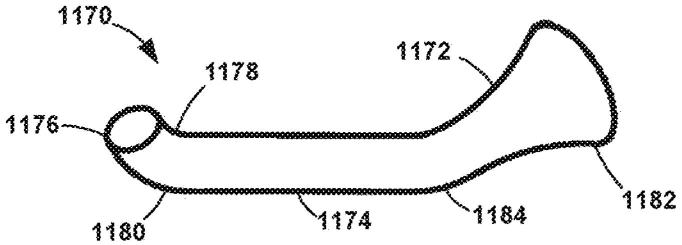
FIG. 32 is an isometric view of a second configuration of a contact for the terminations of FIGS. 27 and 28.

A second configuration 1170 of a compliant contact 1030 is shown in FIG. 32. The contact configuration 1170 is a cylindrical, formed wire contact with a body 1172. A spring finger 1174 extends outwardly from the body 1172 at a bend 1184 to a tip 1176. The parameters of the spring finger 1174 and the bend angle 1184 are discussed below. The tip 1176 of the spring finger 1174 is bent, as at 1178, to form a curved contact point 1180, in part to reduce wear on the device 2.

Figure 33:
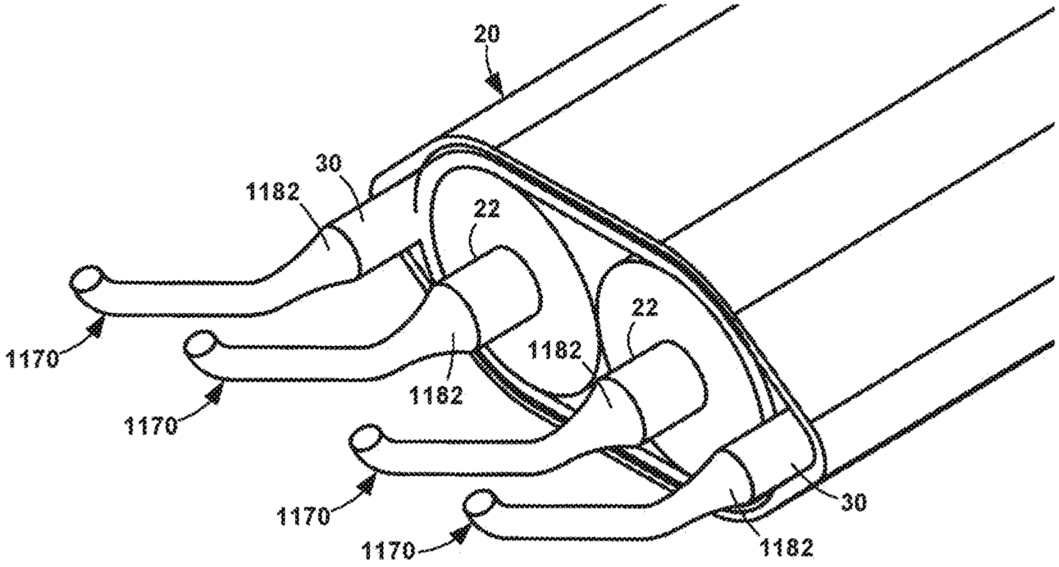
FIG. 33 is an isometric view of a cable with installed contacts of FIG. 32.

The opposite end of the contact body 1172 is a conical attachment 1182 that is at an angle to the contact body 1172. The end of the attachment 1182 is shaped to bond directly to the conductor 22 after the cable 20 is trimmed back, as in FIG. 33, by weld, solder, adhesive, or any other adequate attachment means. Alternatively, the attachment 1182 is shaped to extend into a bore in the conductor 22. The only stipulation is that the bending stress should only be transmitted to the contact 1170 and not to the softer cable conductor 22.

The advantage to this contact 1170 is that the cylindrical shape of the conductor 22 is continued throughout the length of the contact 1170, making it easier to maintain impedance.

Cable wire materials are selected mainly for their electrical properties, such as conductivity. Contact materials need to have good mechanical and electrical properties. By this approach, the wire material of the contact 1170 can be any material with spring properties but also good electrical properties. If it is an expensive material, only the last millimeter of the electrical path, the finger tip 1176, needs to be made from of it. The rest of the contact 1170 can be made of the standard cable wire material.

Figure 34:
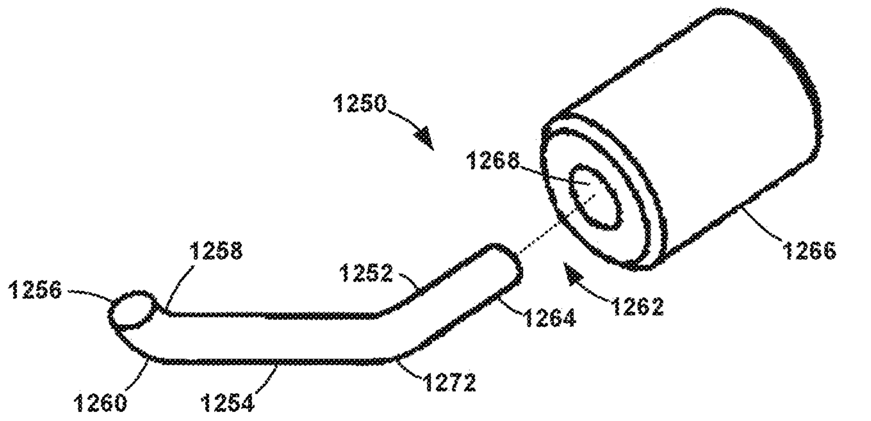
FIG. 34 is an isometric view of a third configuration of a contact for the terminations of FIGS. 27 and 28.

A third configuration 1250 of a compliant contact 1030 is shown in FIG. 34. As with the contact of FIG. 32, the contact configuration 1250 is a cylindrical, formed wire contact with a body 1252. A spring finger 1254 extends outwardly from the body 1252 from a bend 1272 to a tip 1256. The parameters of the spring finger 1254 and the angle of the bend 1272 are discussed below. The tip 1256 of the spring finger 1254 is bent, as at 1258, to form a curved contact point 1260, in part to reduce wear on the device 2.

Figure 35:
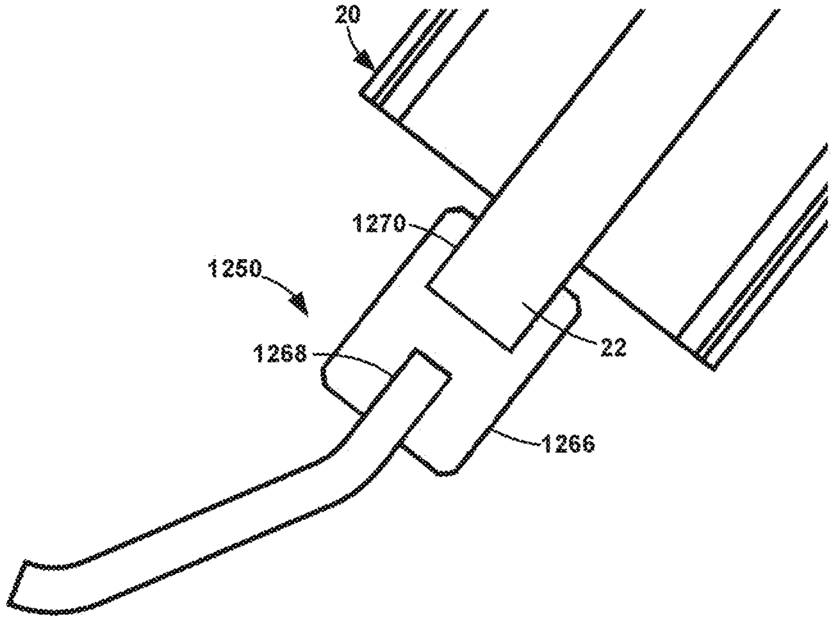
FIG. 35 is a cross-sectional view of a wire with an installed contact of FIG. 34.

At the opposite end of the contact body 1252 is an attachment 1262. The attachment 1262 has a tail 1264 that is at an angle to the contact body 1252. A collar 1266 attaches the tail 1264 to the conductor 22. The collar 1266 is cylindrical with an axial bore 1268 at one end for the tail 1264 and an axial bore 1270 at the other end for the conductor 22, as shown in FIG. 35. The tail 1264 is inserted into the tail bore 1268 and the conductor 22 is inserted into the wire bore 1270 after the cable 20 is trimmed back. The tail 1264 and conductor 22 are bonded to the collar 1266 using any adequate method, including by weld, solder, or adhesive.

A fourth configuration 1034 of a compliant contact 1030 is shown in FIGS. 36-39. The contact configuration 1034 has a rectangular contact body 1036 with a pair of tines 1050. During production, the tines 1050 are initially planar with the body 1036 and are bent approximately 90° from the body 1036, as at 1052, to form a fork 1054 perpendicular to the body 1036.

The contact 1034 is attached to the exposed signal conductor 22. The fork 1054 holds onto the conductor 22 by pushing the wire into the gap 1056 between the tines 1050 to the body 1036, as in FIG. 38. The gap 1056 is slightly smaller than the diameter of the conductor 22, so the conductor 22 fits tightly in the gap 1056. The size of the fork gap 1056 is designed for the diameter of the conductor 22 with which the contact 1034 is to be used.

Figure 39:
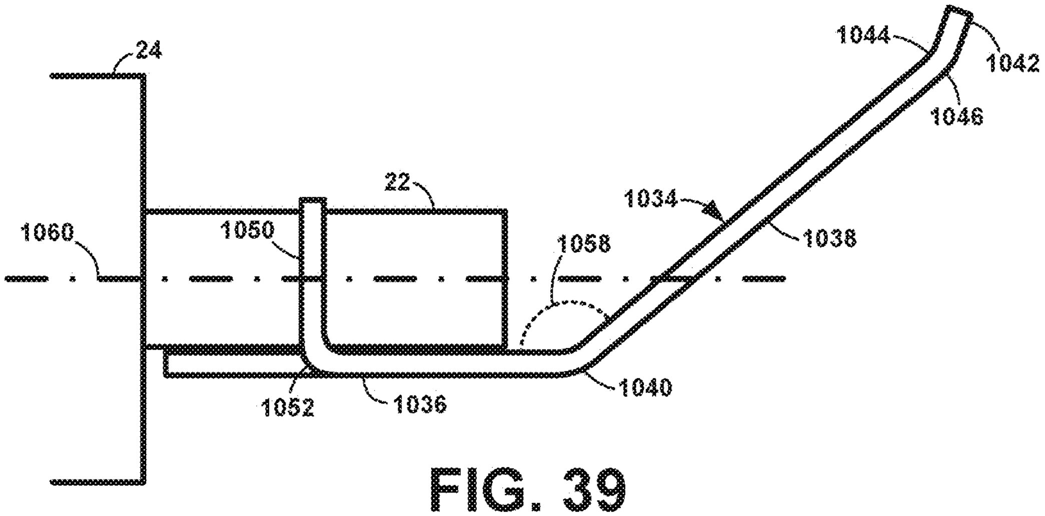
FIG. 39 is an side view of a signal conductor with an installed contact of FIG. 36.

When the contact 2014 is installed on the conductor 22, the body 1036 is generally paraxially aligned with the conductor 22, as in FIG. 39.

A spring finger 1038 extends from the body 1036 and signal conductor 22 at a bend 1040 to a tip 1042. The parameters of the spring finger 1038 and the bend angle 1058 are discussed below. The spring finger 1038 can be shaped like a truncated cone. The tip 1042 of the spring finger 1038 is bent, as at 1044, to form a curved contact point 1046, in part to reduce wear on the device 2.

The spring finger 1038 provides compliance by its ability to bend toward the signal conductor axis 1060.

Figure 40:
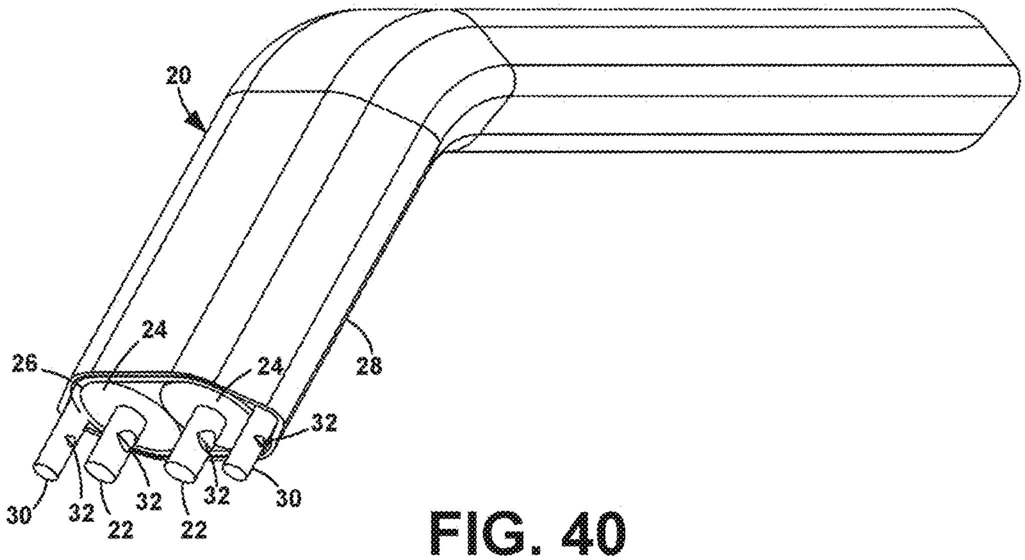
FIG. 40 is an isometric view of the end of a twinaxial cable with notched wires for the contact of FIG. 36.

Optionally, the signal conductor 22 is notched, as at 32 in FIG. 40, to facilitate easier installation of the contact 1034. Optionally, solder or adhesive can be used in the gap 1056 to facilitate bonding between the contact 1034 and the conductor 22. Optionally, the cable trimming and positioning of the contacts 1034 on the signal conductors 22 is controlled to provide more precise phase and impedance matching.

Figure 41:
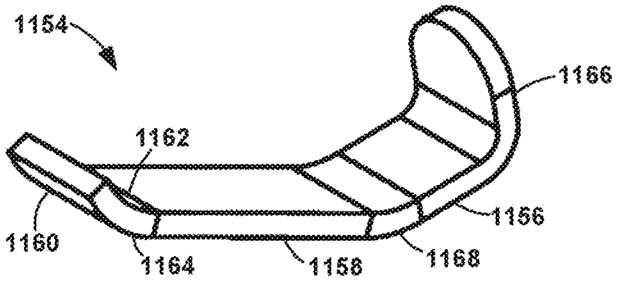
FIG. 41 is an isometric view of a fifth configuration of a contact for the terminations of FIGS. 27 and 28.

FIG. 41 shows a fifth configuration 1154 of a compliant contact 1030. The contact configuration 1154 has a rectangular contact body 1156. A spring finger 1158 extends outwardly from one edge of the body 1156 at a bend 1168 to a tip 1160. The parameters of the spring finger 1158 and the angle of the bend 1168 are discussed below. The tip 1160 of the spring finger 1158 is bent, as at 1162, to form a curved contact point 1164, in part to reduce wear on the device 2.

Figure 42:
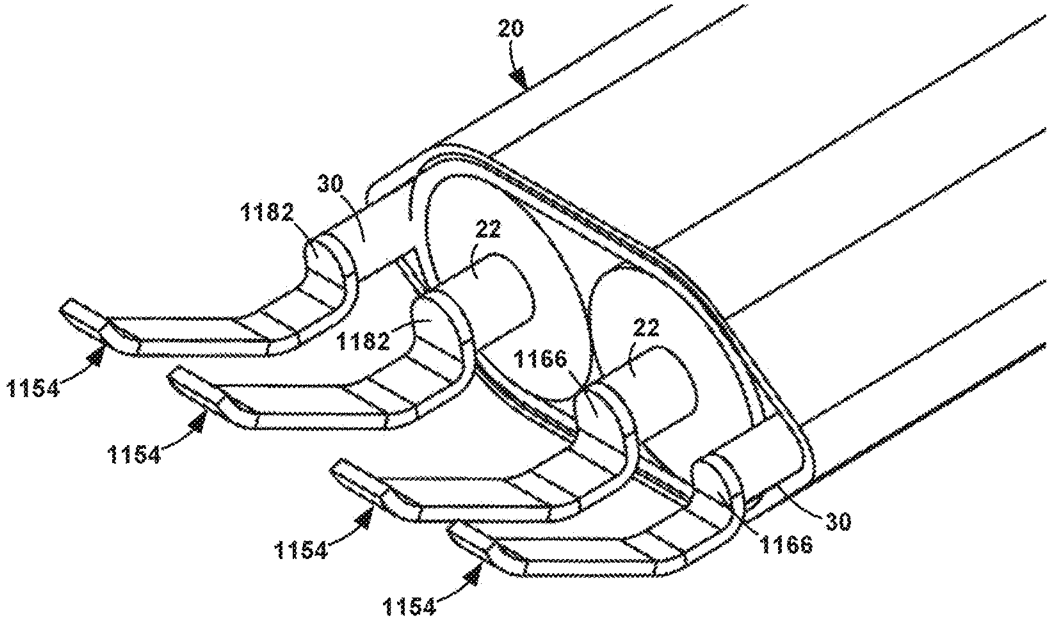
FIG. 42 is an isometric view of a cable with installed contacts of FIG. 41.

The opposite end of the contact body 1156 is at an angle to the contact body 1156. The end has an attachment 1166 that is perpendicular to the end of the conductor 22 so as to bond directly to the conductor 22 after the cable 20 is trimmed back, as in FIG. 42, by weld, solder, adhesive, or any other adequate attachment means.

Figure 36:
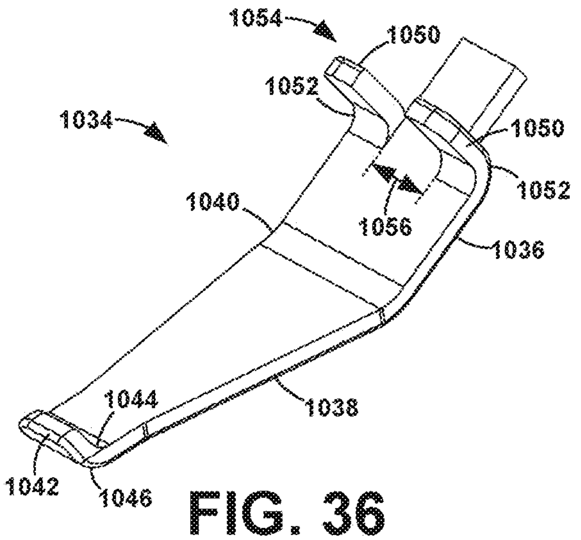
FIG. 36 is an isometric view of a fourth configuration of a contact for the terminations of FIGS. 27 and 28.
Figure 37:
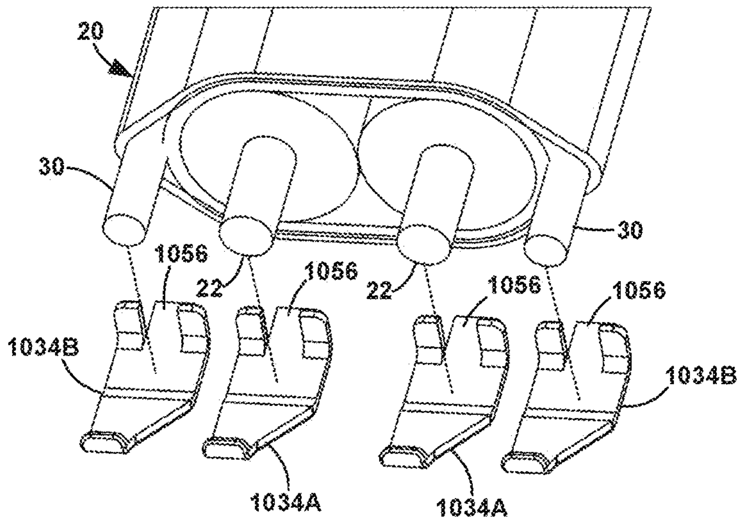
FIG. 37 is an isometric view of a cable and contacts of FIG. 36 prior to installation.
Figure 38:
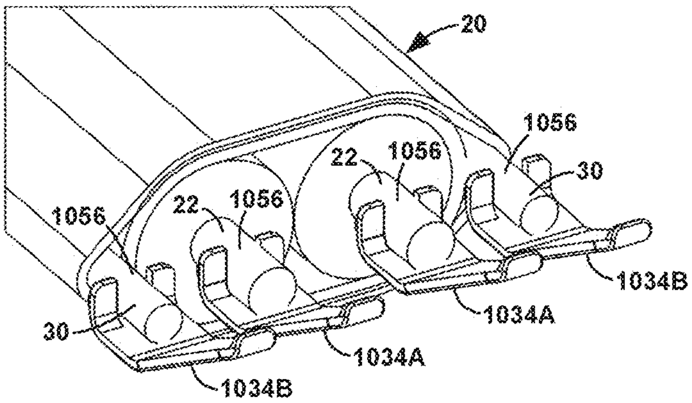
FIG. 38 is an isometric view of a cable with installed contacts of FIG. 36.
Figure 43:
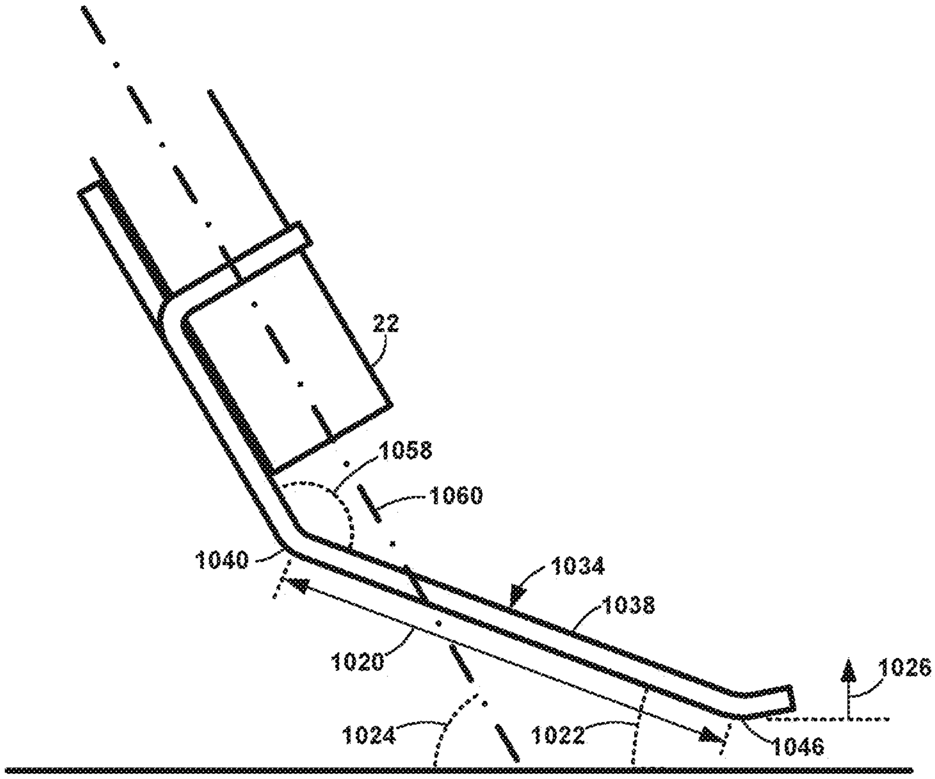
FIG. 43 is a side view of the spring finger parameters.

The parameters of the spring finger are shown in FIG. 43, using the reference numerals of the configuration of FIG. 36.

The angle 1058 of the spring finger 1038 from the axis 1060 of the signal conductor 22 depends on the angle 1024 of the signal conductor 22 to the device 2 and the amount of compliance that is desired in the spring finger 1038. Typically, the bend angle 1058 can be in the range of from 90° to 270°. In FIG. 43, the bend angle 1058 is approximately 140°.

The length 1020 of the spring finger 1038 is determined by several factors. The longer the spring finger 1038, the greater the compliance, all other parameters being equal. However, it also means a greater loss of signal integrity. The greater the angle 1022 of the spring finger 1038 relative to the device 2 prior to installation, the greater the compliance because the spring finger 1038 can displace more before the termination is secured against the device surface 1.

The spring finger displacement 1026, that is, the distance that the contact point 1046 can move is in the range of from 0.002 inches to 0.020 inches, with a preferred range of from 0.003 to 0.010 inches, and an optimal displacement of about 0.006 inches.

Figure 44:
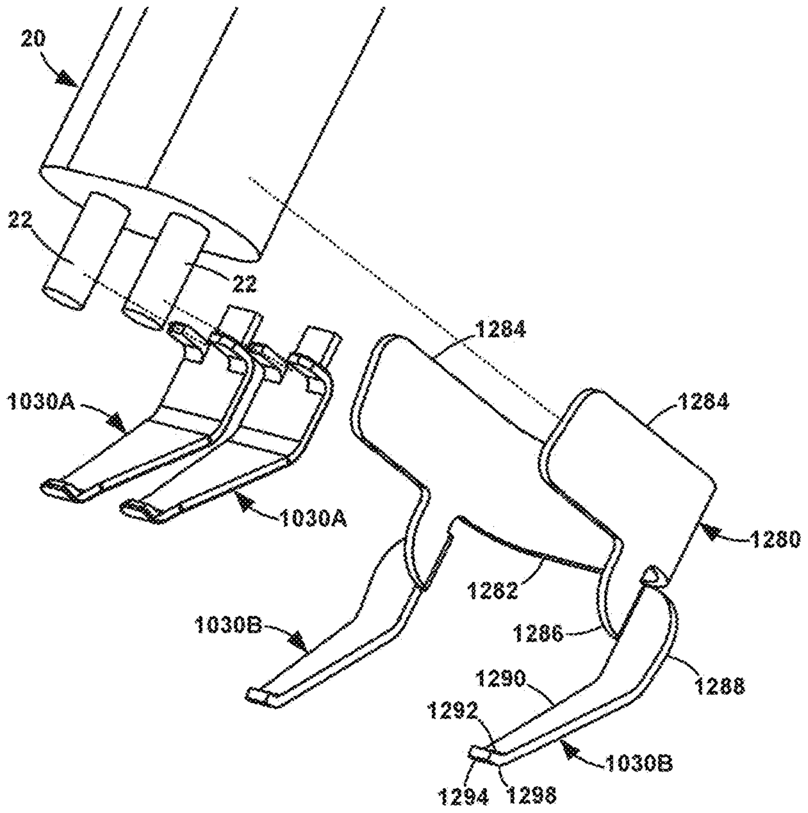
FIG. 44 is an isometric, exploded view of a method of electrically assembling to the cable shield without drain wires for the terminations of FIGS. 27 and 28.
Figure 45:
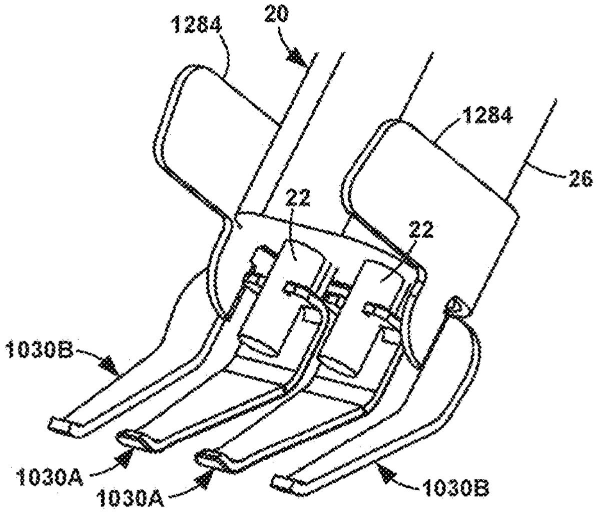
FIG. 45 is an isometric view of the contacts and clamp of FIG. 44 partially assembled to the cable.
Figure 46:
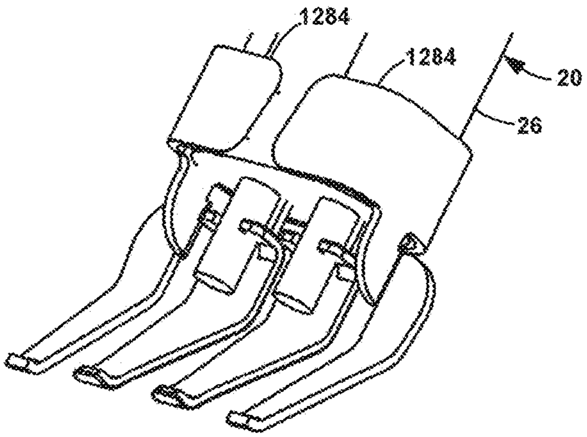
FIG. 46 is an isometric view of the contacts and clamp of FIG. 44 fully assembled to the cable.

As indicated above, all of the contact configurations described above can be used with drain wires 30. When there are no drain wires 30, another method is needed to provide electrical contact with the cable shield 26. One such method is illustrated in FIGS. 44-46. The signal conductors 22 use a compliant contact 1030A as described above. The ground contacts 1030B are elements of a clamp 1280 that is secured around the cable shield 26. The clamp 1280 is stamped from a sheet of conductive material, typically metal. The elongated body 1282 has wings 1284 that bend around the cable shield 26.

Contact appendages 1286 extend from the wings 1284 at the outer sides of the shield 26. The ground contacts 1030B are formed from the appendages 1286. The contact body 1288 extends from the appendage 1286. A spring finger 1290 extends outwardly at an angle from the body 1288. The angle is within a range that results in a differential impedance of 100±5 ohms, with a preferred angle of approximately 140°. The spring finger 1290 is shaped like a truncated cone. The tip 1294 of the spring finger 1290 is bent, as at 1296, to form a curved contact point 1298 in order to reduce wear on the device 2.

The signal contacts 1030A are attached to the exposed signal conductors 22 as described above and the clamp 1280 is secured around the exposed shield 26. The cable 20 is placed on the clamp body 1282 between the wings 1284, as in FIG. 45, and the wings 1284 are bent around the shield 26 to secure the clamp 1280 to the shield 26, as in FIG. 46. It is necessary to make sure that the ground contacts 1030B are aligned properly with the signal contacts 1030A.

As with most stampings, the clamp 1280 has a burr on one side. The present invention contemplates using the burr to more securely attach the clamp 1280 to the cable 20. The wings 1284 are bent such that the cable 20 is placed on the burr side of the clamp body 1282. When the wings 1284 are bent around and secured to the shield 26, the burr digs into the shield 26 slightly to provide additional grip to the attachment.

Optionally, the clamp 1280 can be more securely attached by the use of adhesives, welding, soldering, or the like.

Figure 47:
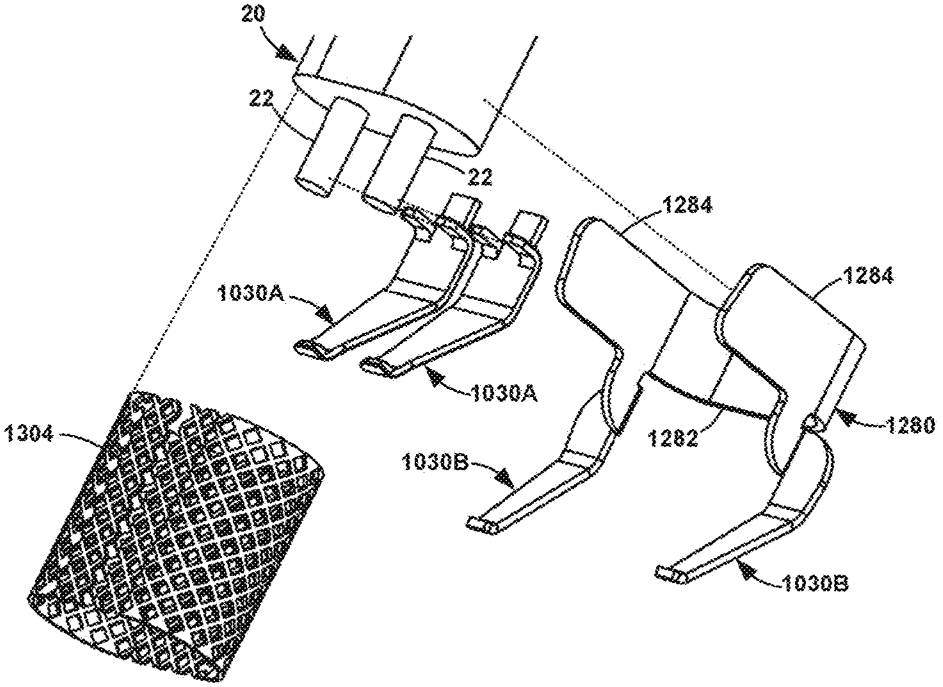
FIG. 47 is an isometric, exploded view of a shield assembly method of FIG. 44 with a membrane.
Figure 48:
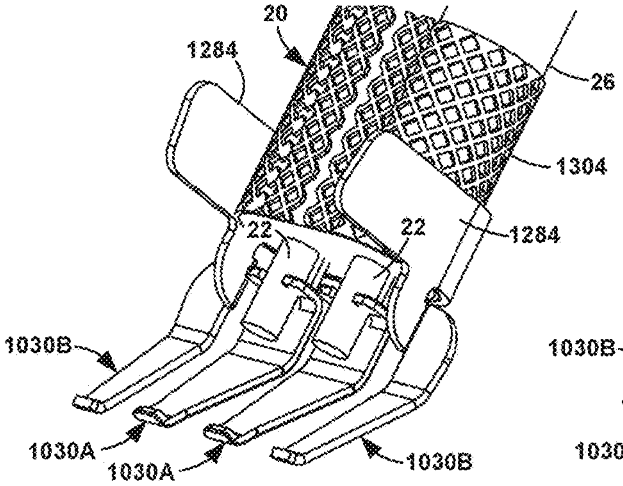
FIG. 48 is an isometric view of the contacts, membrane, and clamp of FIG. 47 partially assembled to the cable.
Figure 49:
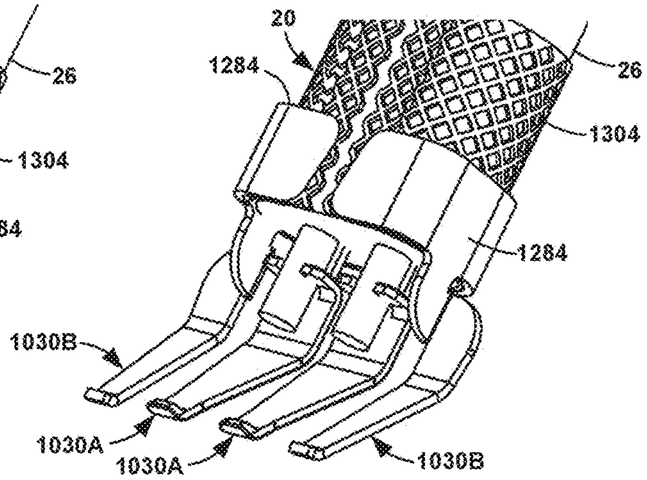
FIG. 49 is an isometric view of the contacts, membrane, and clamp of FIG. 47 fully assembled to the cable.

The present invention contemplates several refinements to the clamp design of FIGS. 44-46. In the design of FIGS. 47-49, a membrane 1304 is installed on the cable shield 26 prior to installing the signal contacts 1030A and the clamp 1280. The membrane 1304 is a flexible sheet with or without a plurality of through holes 1306. The membrane 1304 is composed of an electrically conductive material, for example, conductive metal or metal mesh, conductive rubber, EMI foam, and conductive tape. The membrane 1304 can be used to distribute the clamping forces and to increase the contact surface area.

Before installing the membrane 1304, the cable 20 sheath 28 is trimmed back such that the length of exposed shield 26 is at least that of the length of the membrane 1304. This is to prevent the membrane 1304 from overlapping the sheath 28 when installed. The membrane 1304 is wrapped around the exposed shield 26. The signal contacts 1030A are attached to the exposed signal conductors 22 as described above and the clamp 1280 is secured around the membrane 1304. The cable 20 with the membrane 1304 is placed on the clamp body 1282 between the wings 1284 and the wings 1284 are bent around the membrane 1304 to both secure the clamp 1280 to the membrane 1304 and to secure the membrane 1304 to the shield 26. It is necessary to make sure that the ground contacts 1030B are aligned properly with the signal contacts 1030A.

Figure 50:
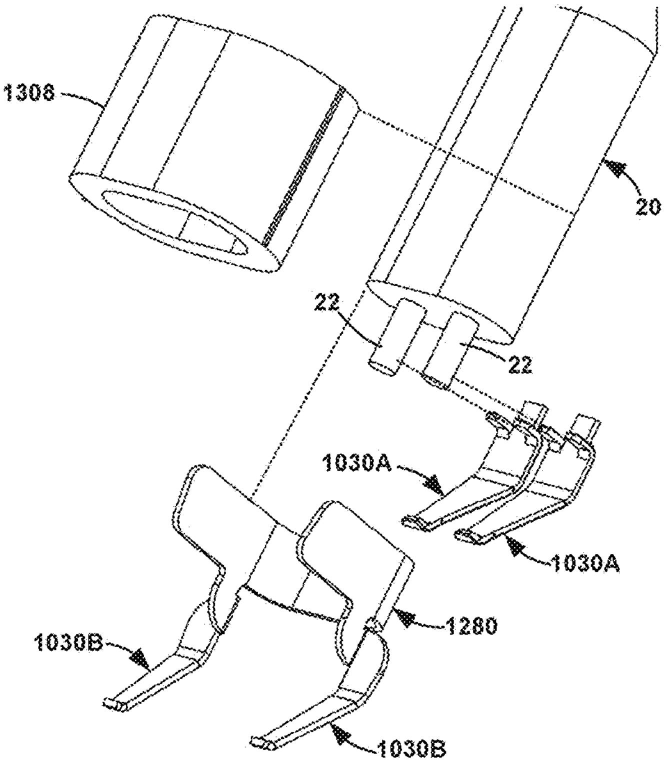
FIG. 50 is an isometric, exploded view of an overmolded attachment.
Figure 51:
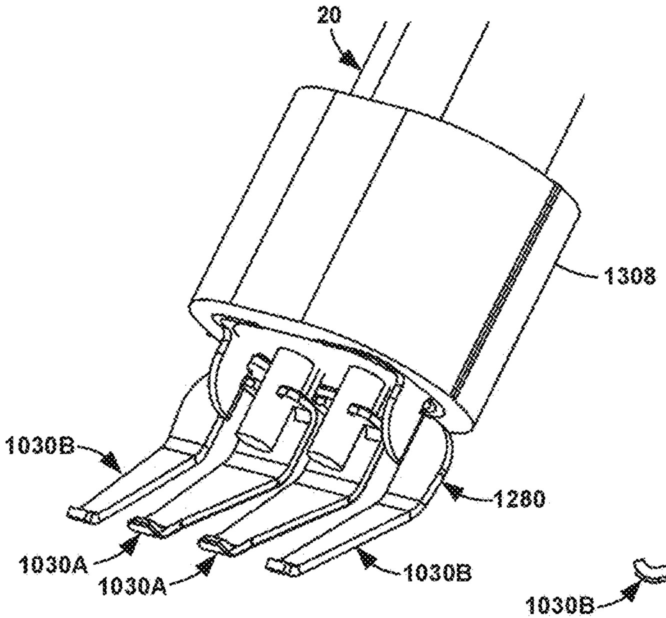
FIG. 51 is an isometric view of the contacts, clamp, and molding of FIG. 50 assembled to the cable.
Figure 52:
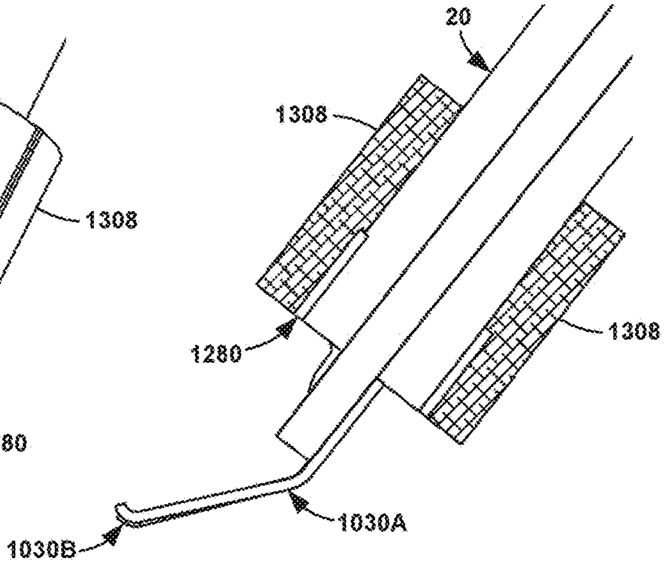
FIG. 52 is a cross-sectional view of the contacts, clamp, and molding of FIG. 50 attached to the cable.
Figure 53:
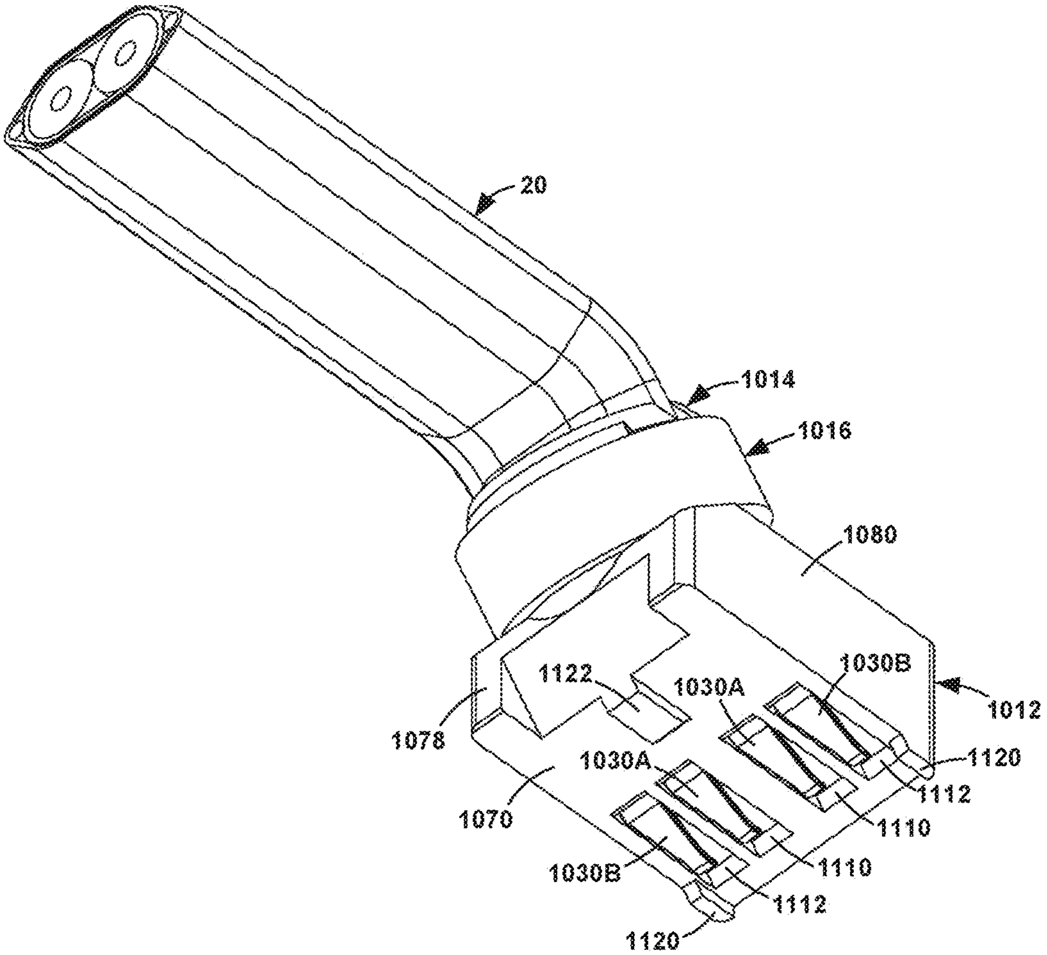
FIG. 53 is a bottom, isometric view of the termination of FIG. 27.
Figure 54:
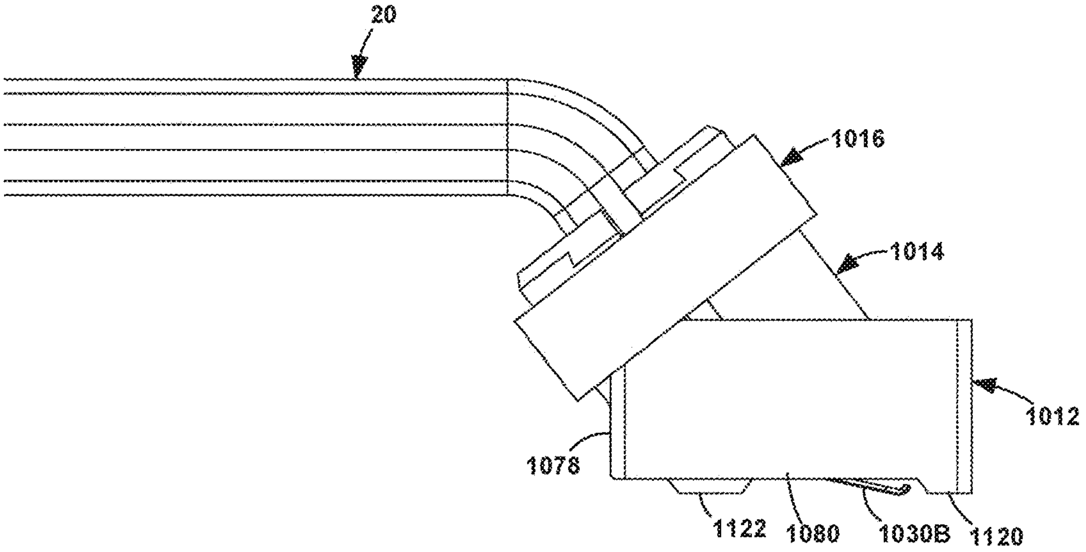
FIG. 54 is a side view of the termination of FIG. 27.
Figure 55:
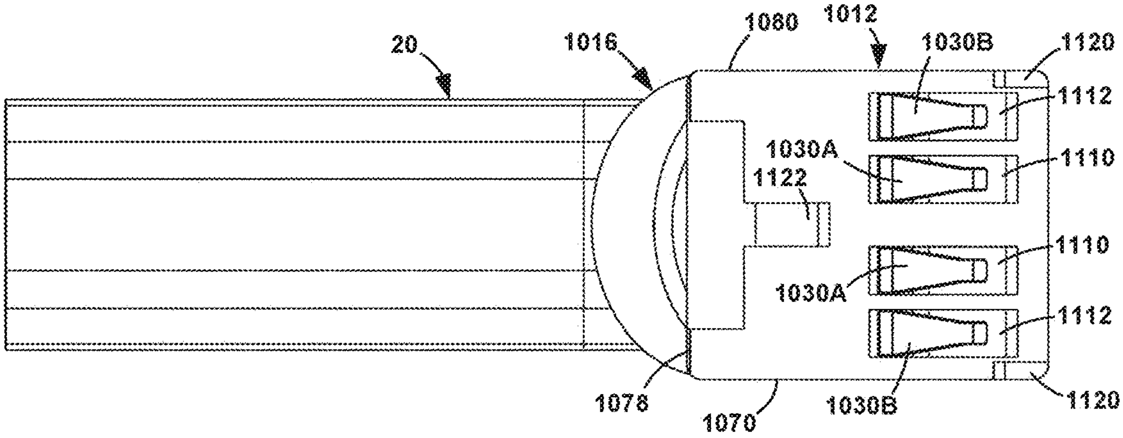
FIG. 55 is a bottom view of the termination of FIG. 27.
Figure 56:
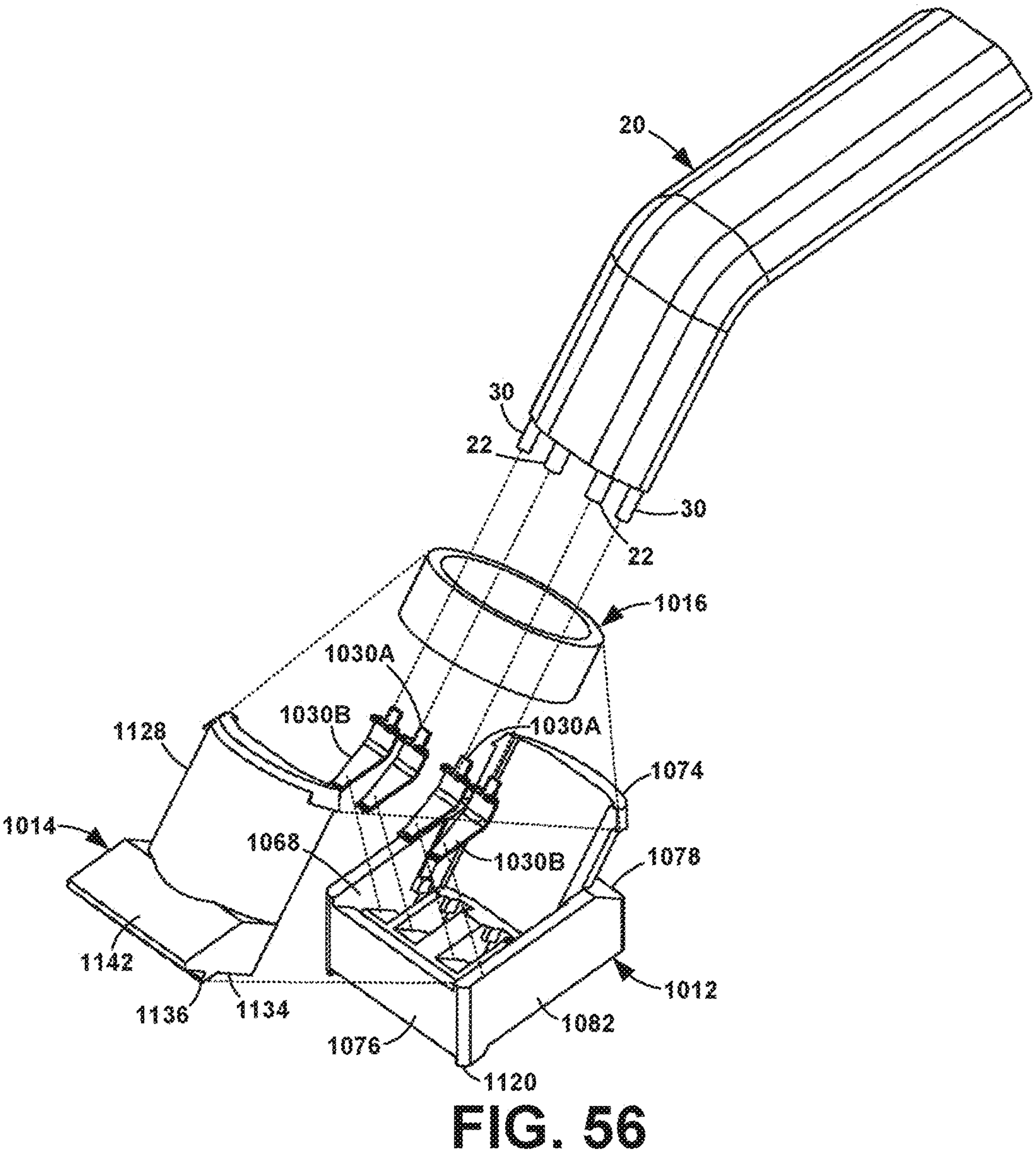
FIG. 56 is an exploded, isometric view of the termination of FIG. 27.
Figure 57:
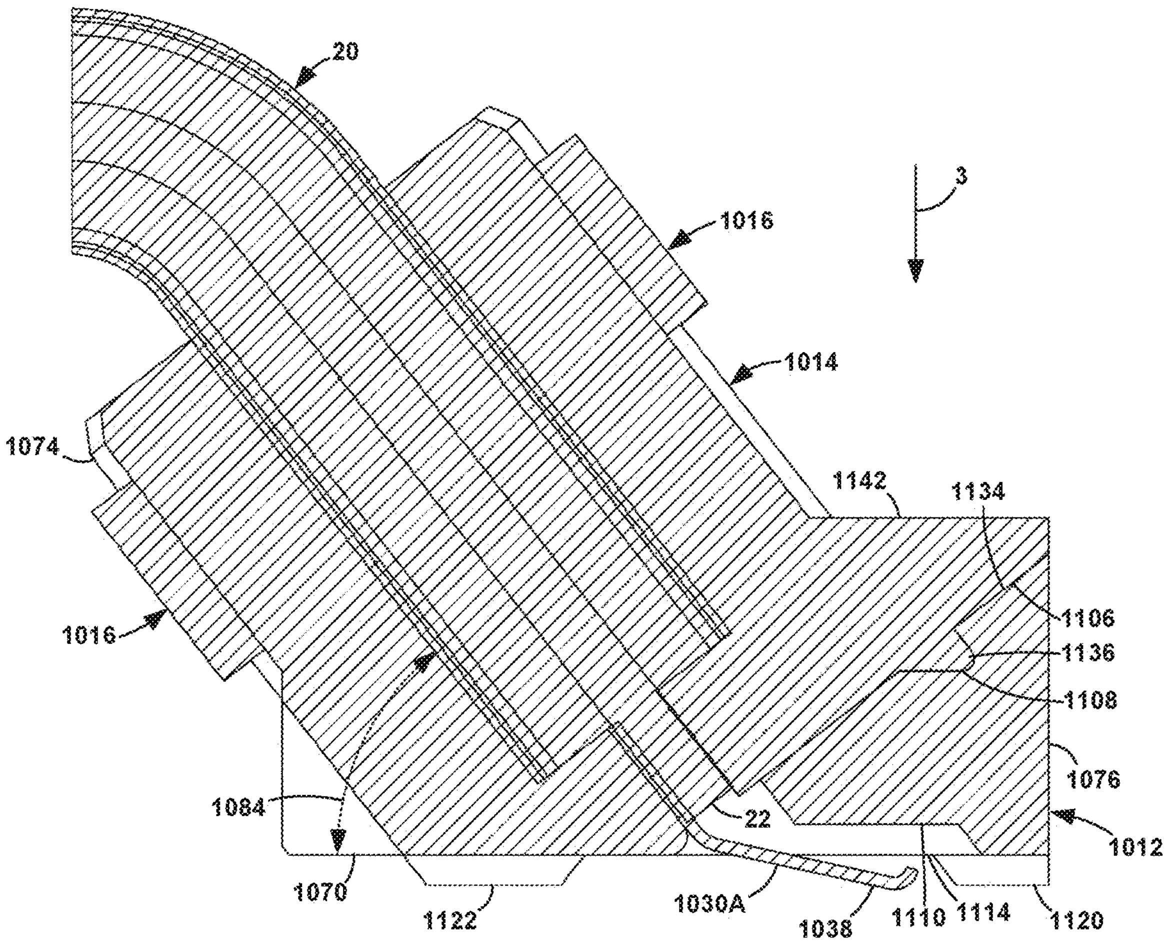
FIG. 57 is a side, cross-sectional view of the termination of FIG. 27.
Figure 58:
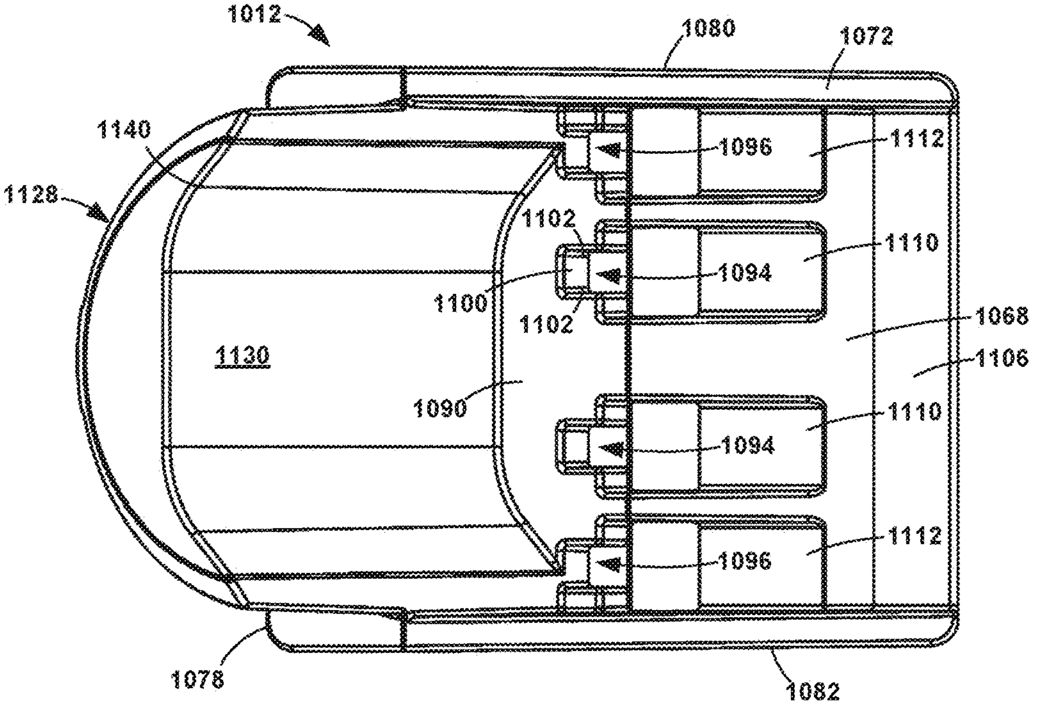
FIG. 58 is a top view of the anchor block for the termination of FIG. 27.

In the design of FIGS. 50-52, the clamp 1280 is covered by a conductive or nonconductive polymer using injection insert molding. The assembly comprised of the cable 20, compliant signal contacts 1030A, and clamp 1280 are clamped by two die halves and molten plastic is injected around the entire assembly. The plastic molding 1308 adds strain relief, but also protects the mechanical joint between the clamp 1280 and shield 26 from external forces and from corrosion. The molding 1308, if conductive, can also strengthen the electrical connection between the clamp and shield 26. In FIGS. 50-52, the molding 1308 is shown with the cable 20 and clamp 1280. The molding 1308 can also be used with the membrane 1304. The molding 1308 can also be used with compliant ground contacts 1030B instead of the clamp 1280.

As described above, the housing 1018 of both configurations of the second embodiment includes an anchor block 1012, a cap 1014, and a collar 1016. The anchor block 1012 is composed of an electrically nonconductive material and, together with the cap 1014 and collar 1016, holds the compliant contacts 1030 and cable 20 in the desired orientation to the device 2. The illustrated anchor blocks 1012 and caps 1014 are designed for the fourth contact configuration 1034, but is well within the ability of a person of skill in the art to adapt them for the various other contact configurations described above.

The anchor block 1012 has a device surface 1070 that abuts the electrical device 2 and a cap side 1072 opposite the device surface 1070. The cap side 1072 has a cable tray 1074 to which the cable 20 is secured by the cap 1014 and collar 1016. The two configurations differ in how the cap 1014 is attached to the anchor block 1012, as described below.

The anchor block 1012 has a front wall 1076 and a back wall 1078. Between the front wall 1076 and back wall 1078 are two sides 1080, 1082 that are designed so that anchor blocks 1012 can be placed next to each other without the need for an inordinate amount of spacing.

A cable tray 1074 extends rearwardly and upwardly at an angle 1084 from a depression 1068 in the anchor block 1012. The angle 1084 of the cable tray 1074 depends on the desired angle of the cable 20 to the device surface 1. In the illustrated design, the angle 1084 is about 52°, but may be more or less depending on the particular application. For a twinax cable, the upper cable surface 1086 is designed to maintain the cable's differential impedance, typically 95±10 ohms. The cable surface 1086 is curved in the lateral direction, as at 1088, such that the cable 20 fits longitudinally into the cable surface 1086.

At the bottom end of the cable surface 1086 within the depression 1068 is a flat cable stop 1090 generally perpendicular to the angle of the cable surface 1086. The free edge 1092 of the stop 1090 has a notch 1094 for each of the signal conductors 22. At each side of the stop 1090 is a notch 1096 for a drain wire 30.

Each notch 1094, 1096 has a floor 1100 at approximately the same angle to the device surface 1070 as the cable surface 1086. Walls 1102 extend perpendicularly from the floor 1100. The width of the notch 1094, 1096, that is, the distance between the notch walls 1102, is the approximately same as the width of the contact 1034 at the tines 1050, as explained below.

Each signal notch 1094 extends downwardly into a signal contact aperture 1110 and each drain wire notch 1096 extends downwardly into a ground contact aperture 1112. The apertures 1110, 1112 are through openings to the device surface 1070. The apertures 1110, 1112 are at approximately the same angle to the device surface 1070 as the cable surface 1086. The spacing between apertures 1110, 1112 depends on the spacing between the corresponding signal conductors 22 and drain wires 30.

Figure 59:
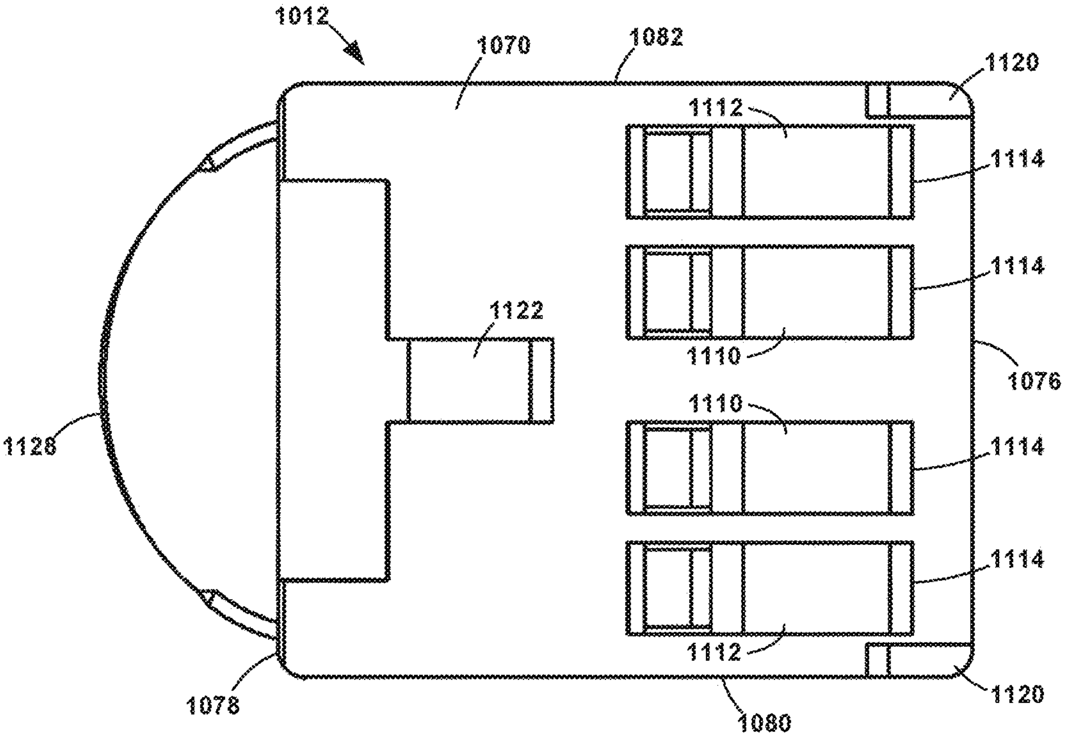
FIG. 59 is a bottom view of the anchor block for the termination of FIG. 27.
Figure 60:
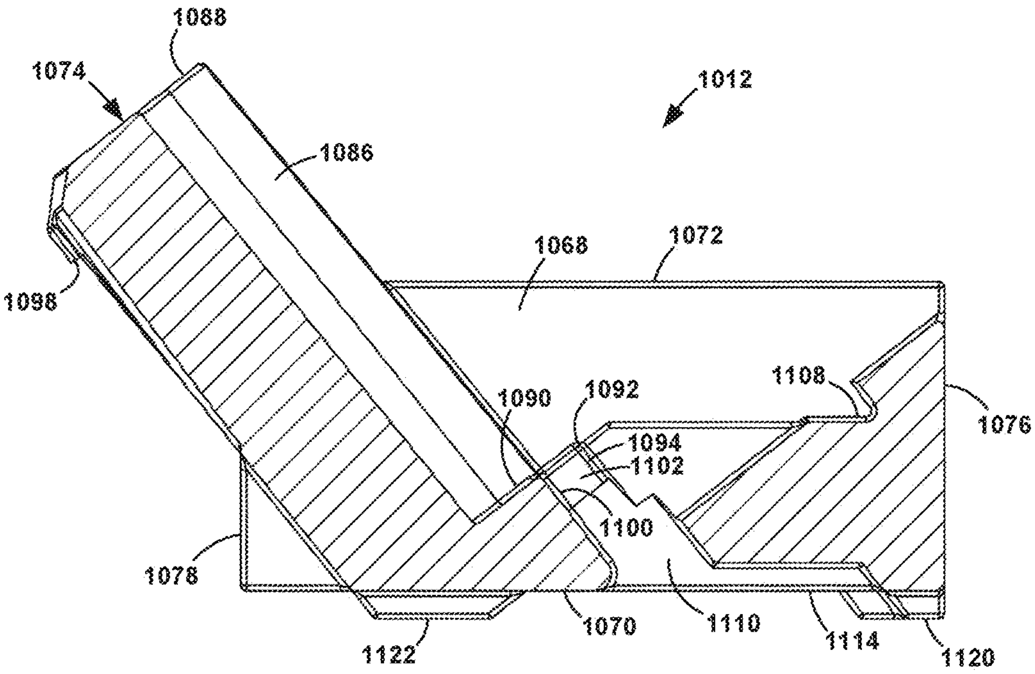
FIG. 60 is a side, cross-sectional view of the anchor block for the termination of FIG. 27.
Figure 61:
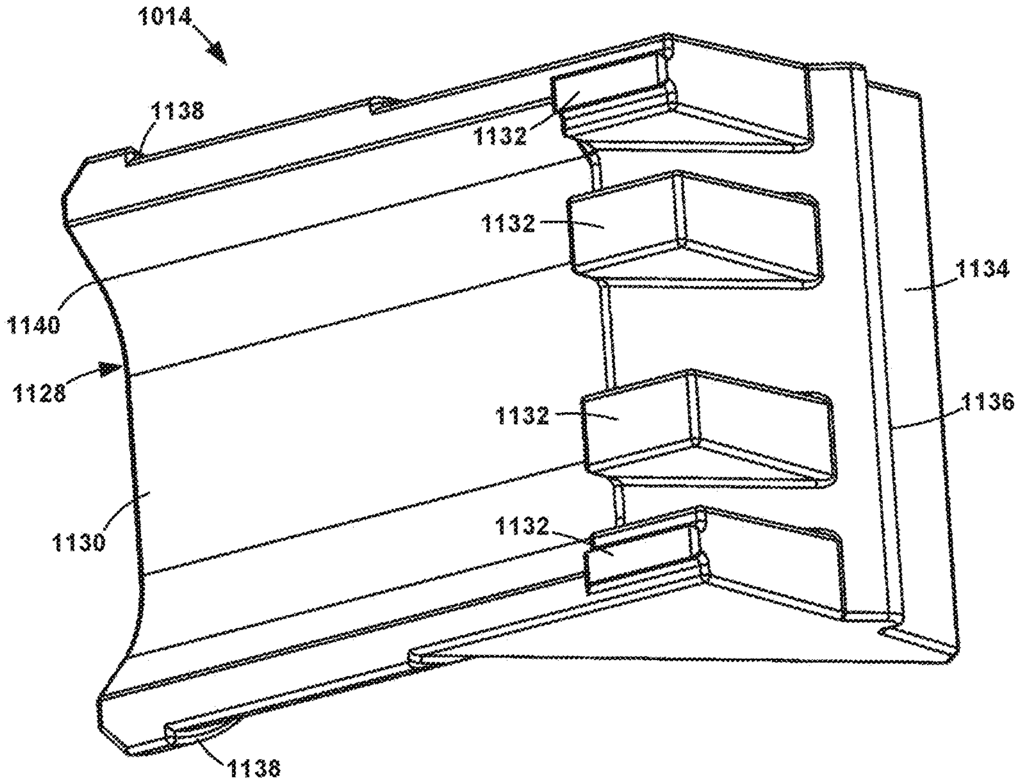
FIG. 61 is a bottom, isometric view of the cap for the termination of FIG. 27.
Figure 62:
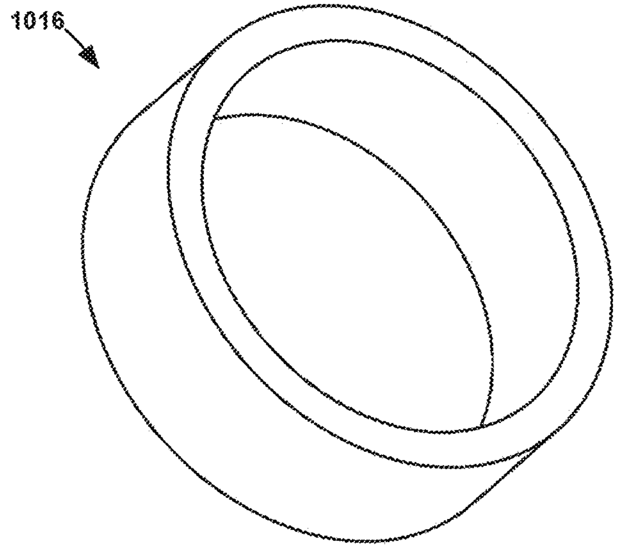
FIG. 62 is an isometric view of the collar for the termination of FIG. 27.
Figure 63:
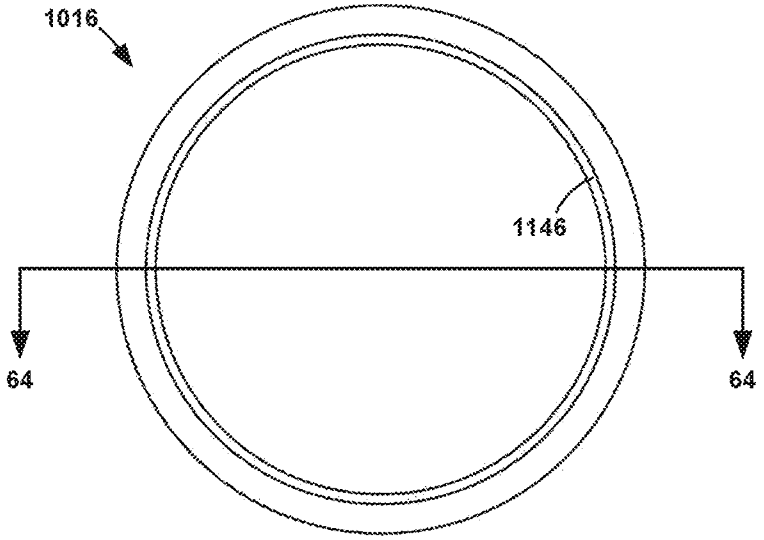
FIG. 63 is a top view of the collar for the termination of FIG. 27.
Figure 64:
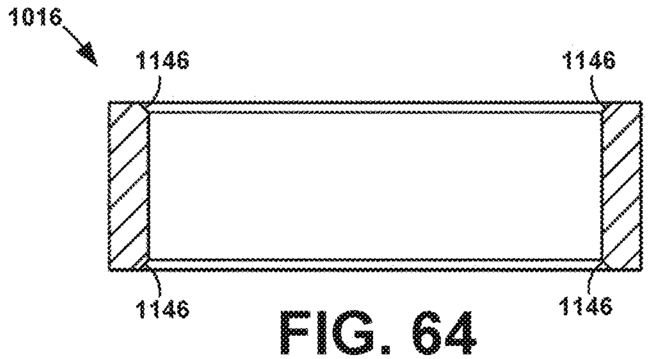
FIG. 64 is a side, cross-sectional view of the collar taken at 64-64 of FIG. 63.

Each aperture 1110, 1112 has an opening 1114 in the device surface 1070. The opening 1114 extends in the direction from the back wall 1078 to front wall 1076, as seen in FIG. 59, and is longer and wider than the spring finger 1038 of the contact 1034.

Extending upwardly and forwardly from the apertures 1110, 1112 to the front wall 1076 is a cap wall 1106, which forms the front of the depression 1068. The cap wall 1106 is at approximately 90° to the cable surface 1086, but this angle is not critical and can be within a wide range.

The device surface 1070 of the anchor block 1012 has spacing feet 1120, 1122 that maintain a spacing between the device surface 1070 and the device. A preferred value is 0.005 inch. In the present design, there are two front feet 1120 in the corners of the device surface 1070 adjacent to the front wall 1076 and a back foot 1122 in the center of the device surface 1070 near the back wall 1078. The present design uses three spacing feet 1120, 1122 because three points define a plane. This ensures the anchor block 1012 will seat appropriately on device 2 regardless of its curvature. A different number of feet may result in rocking.

The cap 1014 clamps the cable/contacts assembly to the anchor block 1012. The cap 1014 fits into the anchor block depression 1068. The cap 1014 has a cable clamp 1128 that complements the cable tray 1074 of the anchor block 1012. The bottom surface of the cable clamp 1128 is the cable clamp surface 1130 and is curved in the lateral direction, as at 1140, in the same manner as the cable tray cable surface curve 1088.

Below the cable clamp surface 1130 is the contact clamp surface 1132, which is a flat surface that is the length of the notches 1094, 1096. When the cap 1014 is installed on the anchor block 1012, the contact clamp surface 1132 encloses the notches 1094, 1096.

Extending upwardly and forwardly from the contact clamp surface 1132 is an anchor block surface 1134 that abuts the cap wall 1106 of the anchor block 1012.

To assemble the termination 10 to a cable 20 to form the termination assembly 1008, the cable 20 is trimmed back. The signal contacts 1030A are attached to the signal conductors 22 and the ground contacts 1030B are attached to the drain wires 30 as described above.

The collar 1016 is slid over the end of the cable 20. The collar 1016, shown in FIGS. 62-64 and FIGS. 76-78, is a circular ring composed of a rigid material, typically a metal. The inside edge 1146 is optionally beveled to facilitate installation.

Figure 65:
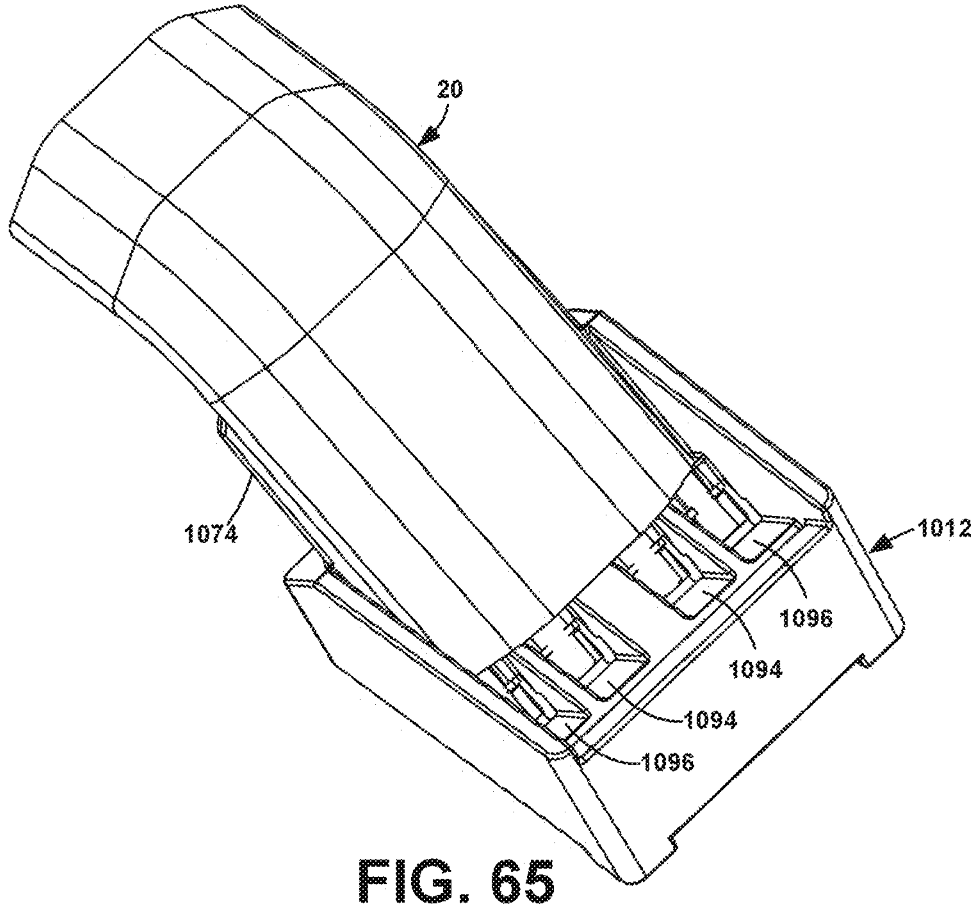
FIG. 65 is an isometric view of the cable installed in the anchor block for the termination of FIG. 27.
Figure 66:
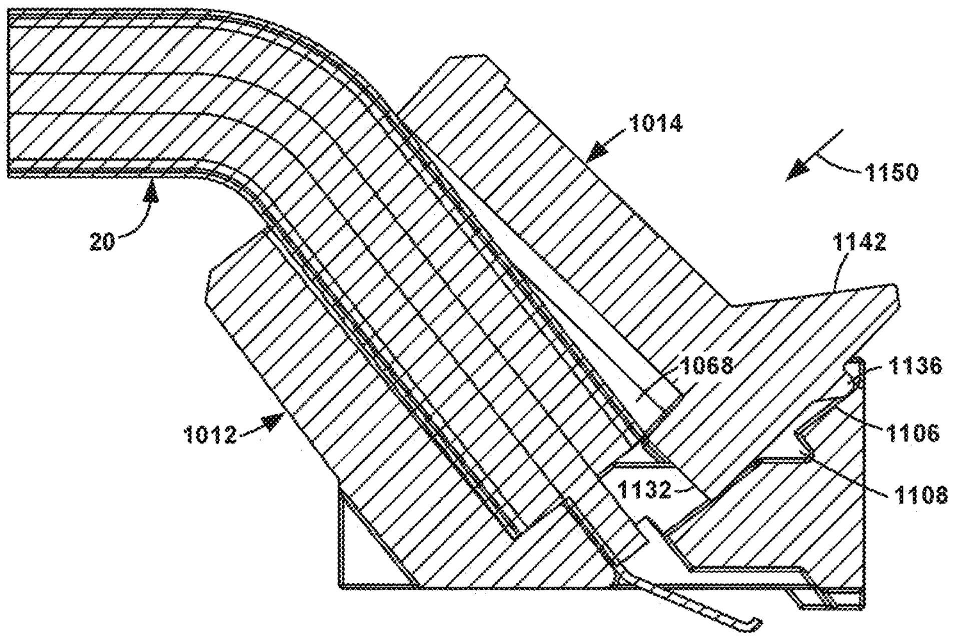
FIG. 66 is a cross-sectional view of the assembly step of installing the cap for the termination of FIG. 27.
Figure 67:
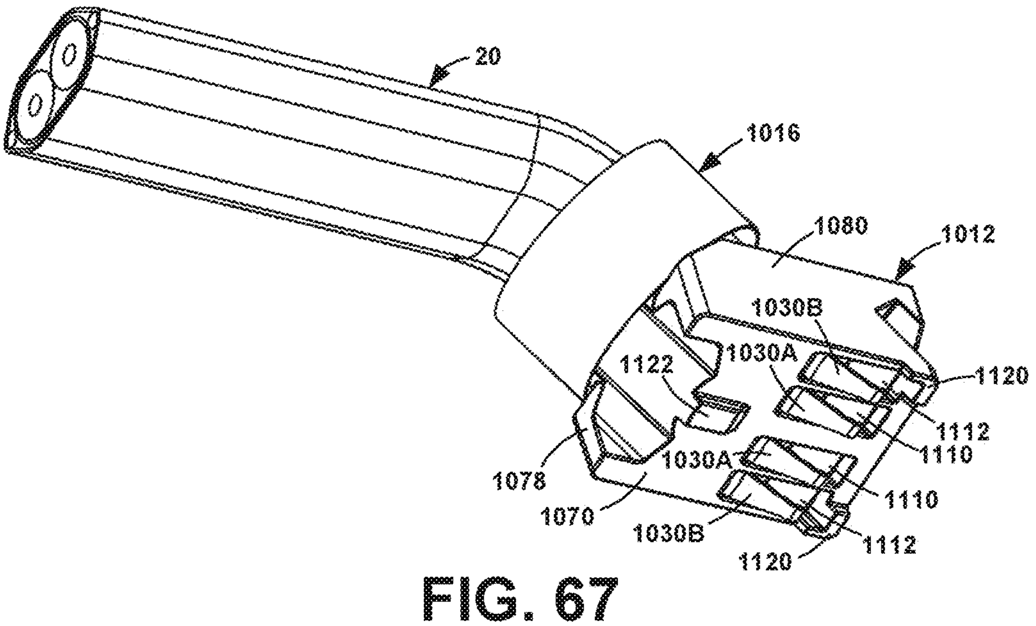
FIG. 67 is a bottom, isometric view of the termination of FIG. 28.
Figure 68:
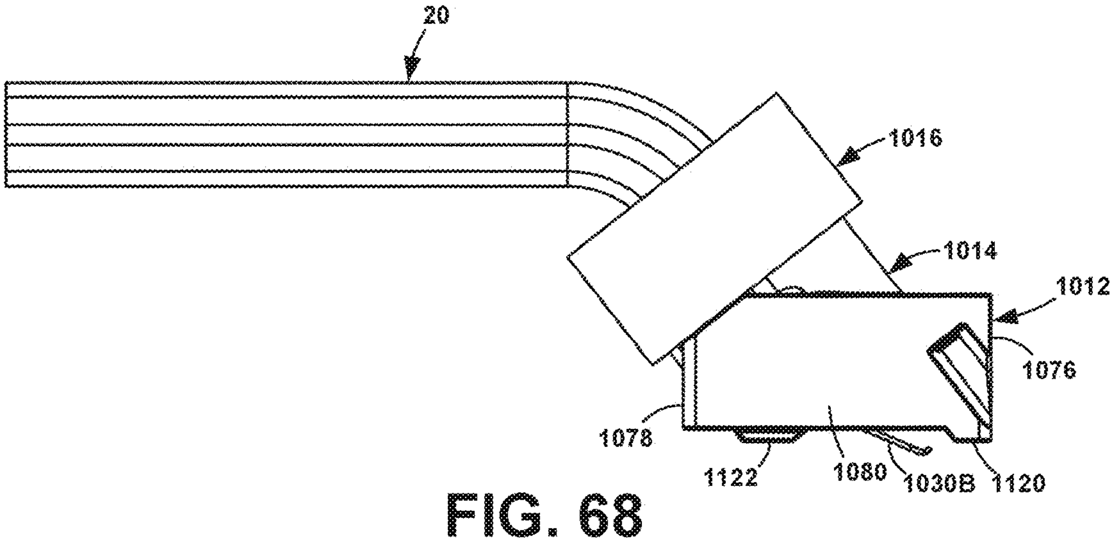
FIG. 68 is a side view of the termination of FIG. 28.
Figure 69:
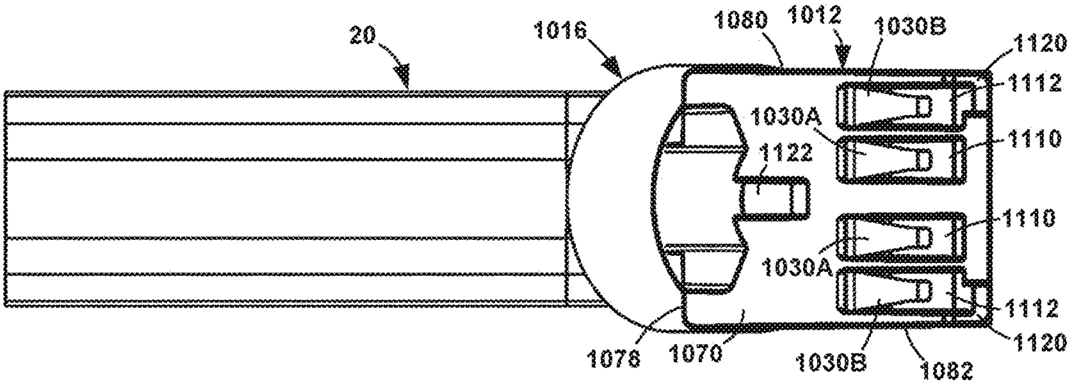
FIG. 69 is a bottom view of the termination of FIG. 28.
Figure 70:
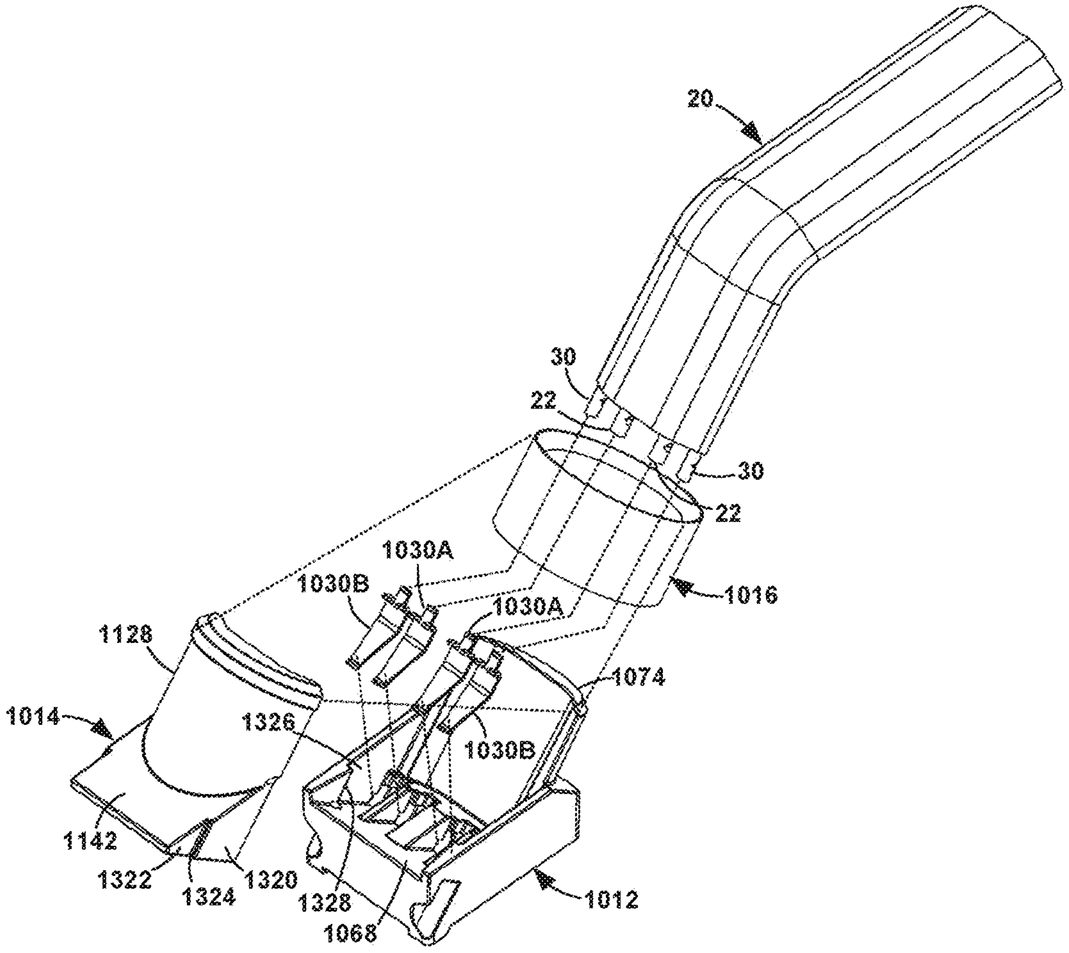
FIG. 70 is an exploded, isometric view of the termination of FIG. 28.
Figure 71:
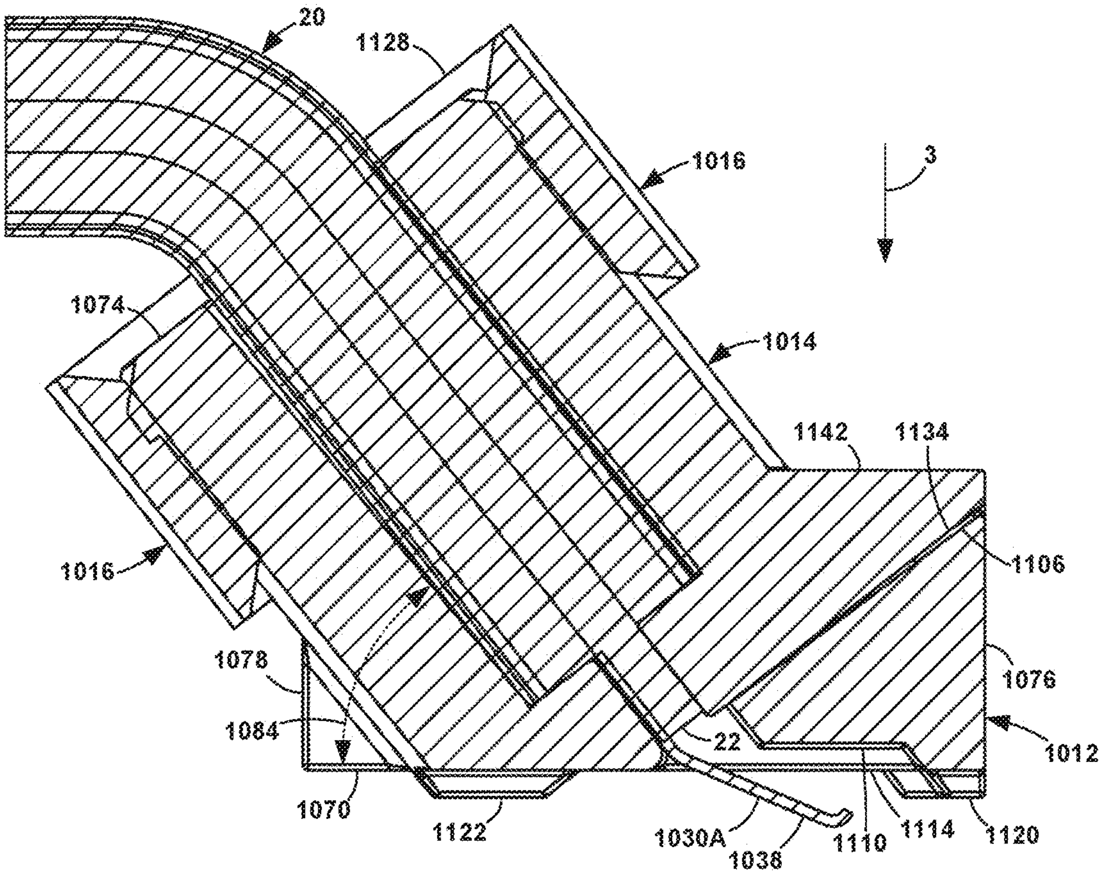
FIG. 71 is a side, cross-sectional view of the termination of FIG. 28.
Figure 72:
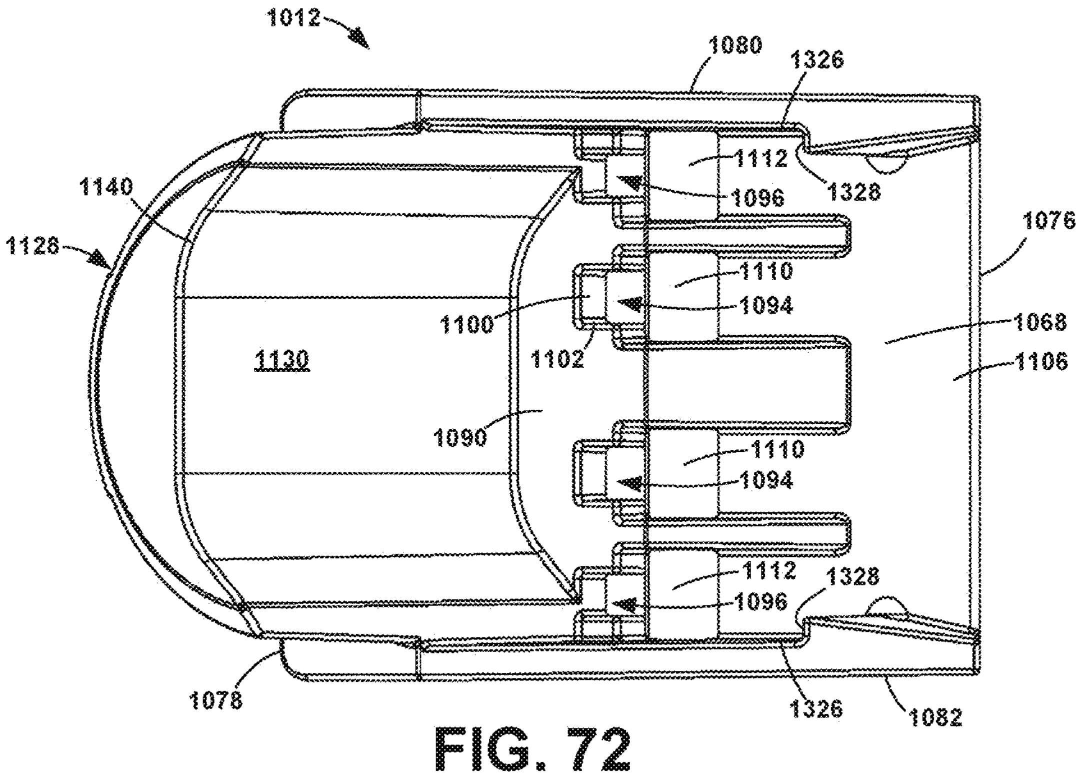
FIG. 72 is a top view of the anchor block for the termination of FIG. 28.
Figure 73:
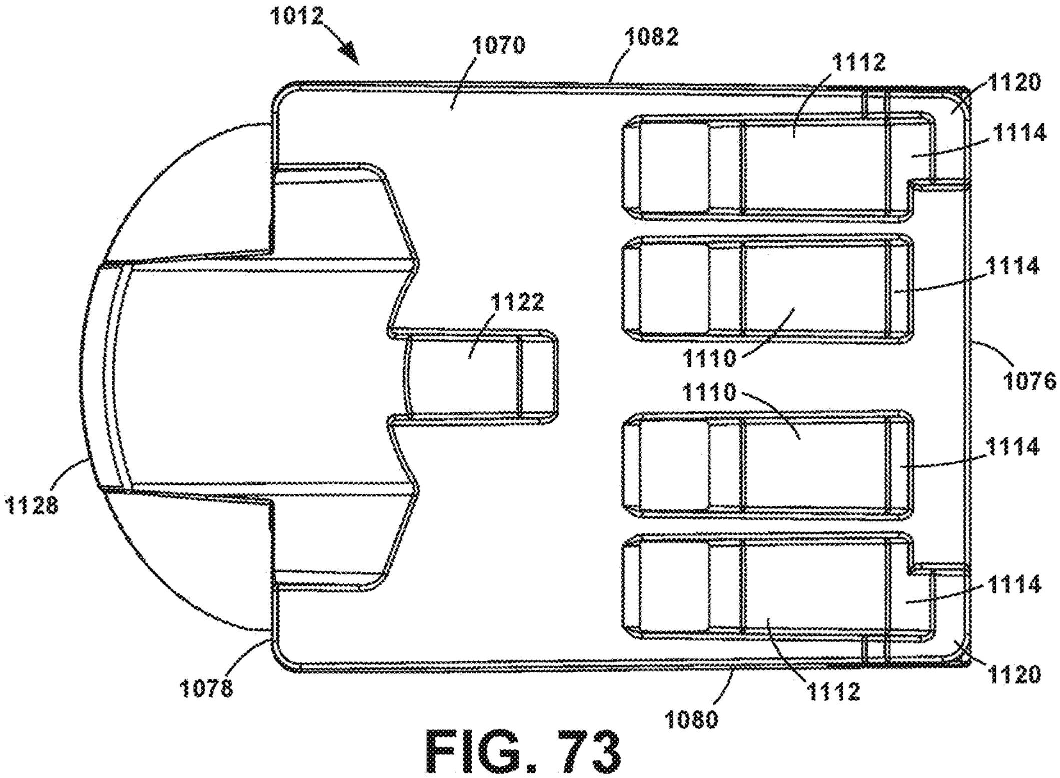
FIG. 73 is a bottom view of the anchor block for the termination of FIG. 28.
Figure 74:
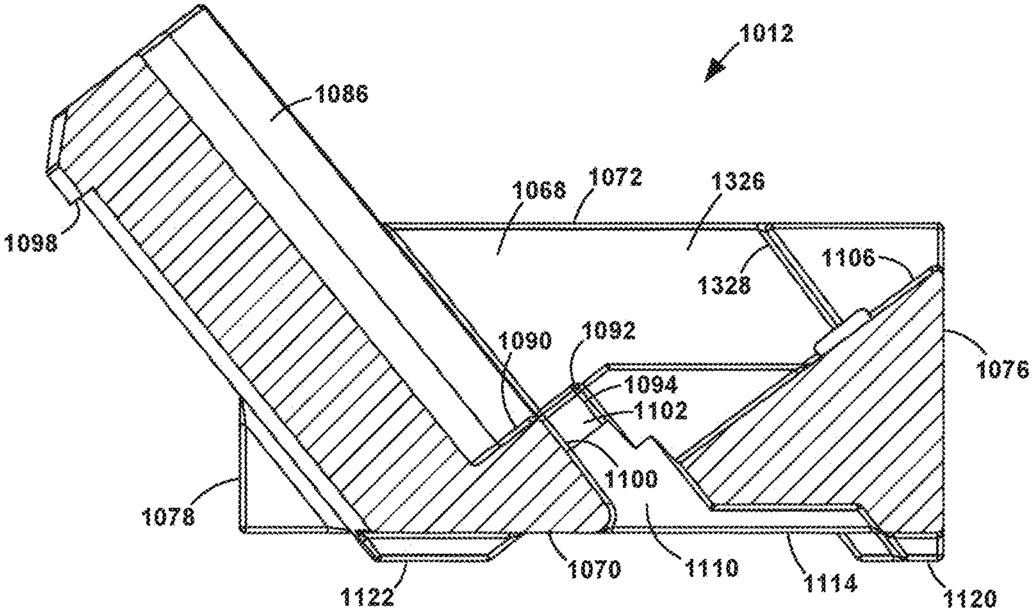
FIG. 74 is a side, cross-sectional view of the anchor block for the termination of FIG. 28.
Figure 75:
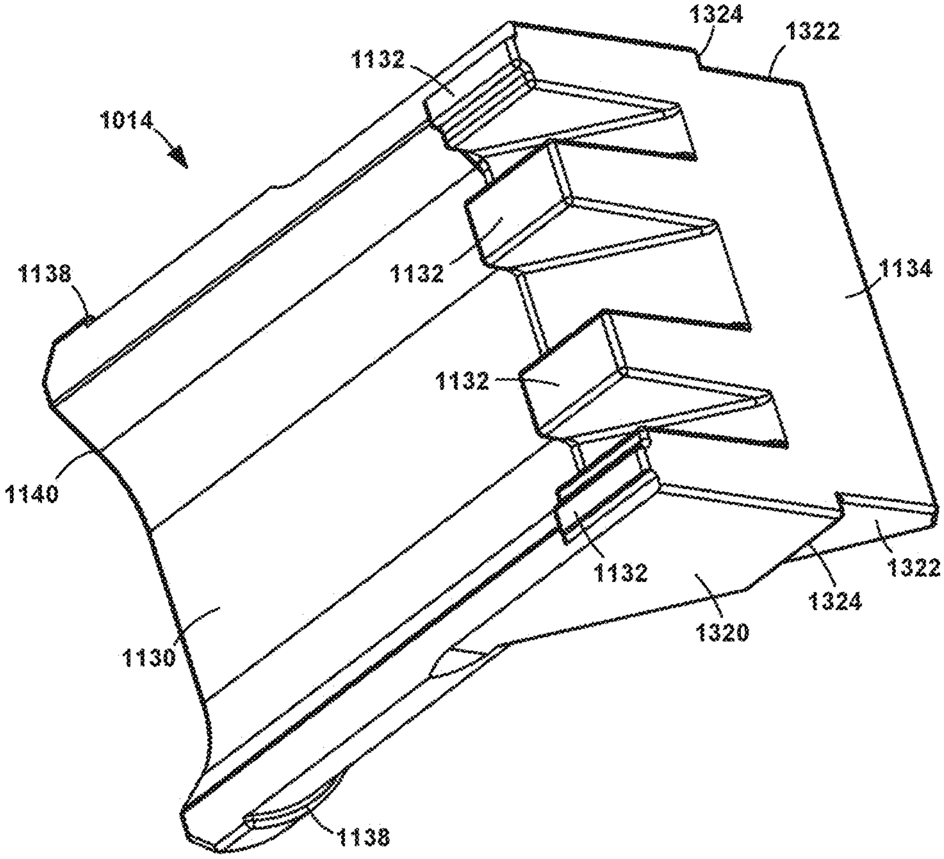
FIG. 75 is a bottom, isometric view of the cap for the termination of FIG. 28.
Figure 76:
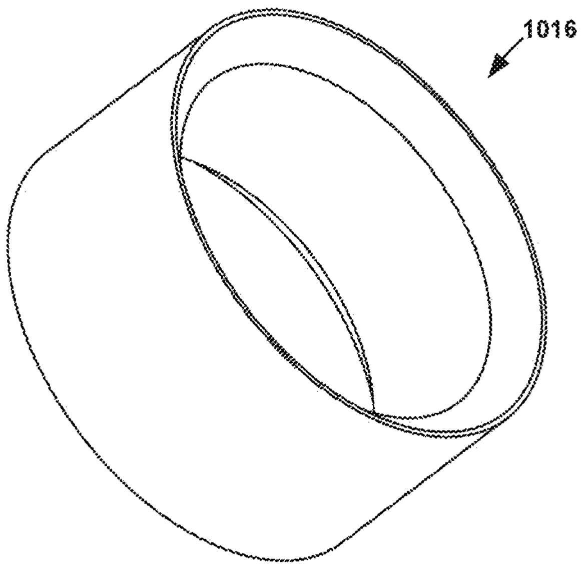
FIG. 76 is an isometric view of the collar for the termination of FIG. 28.
Figure 77:
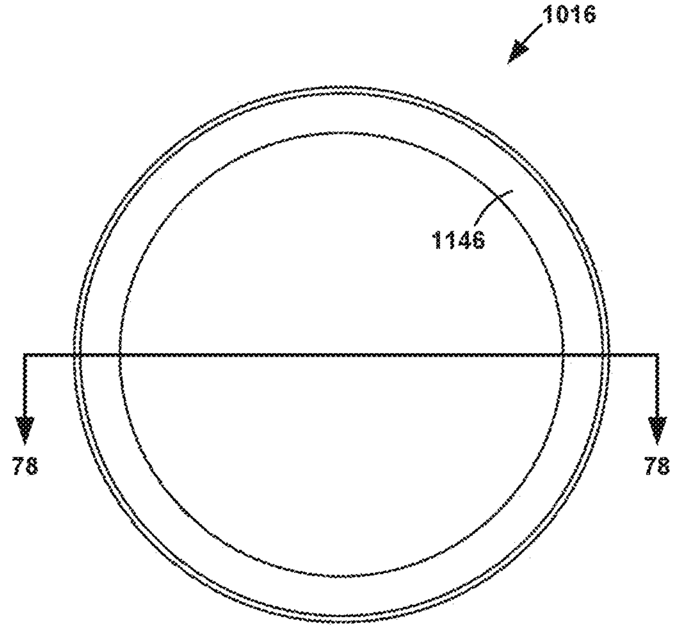
FIG. 77 is a top view of the collar for the termination of FIG. 28.
Figure 78:
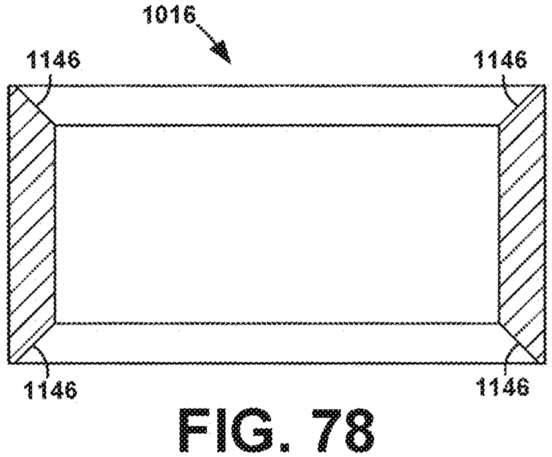
FIG. 78 is a side, cross-sectional view of the collar taken at 78-78 of FIG. 77.
Figure 79:
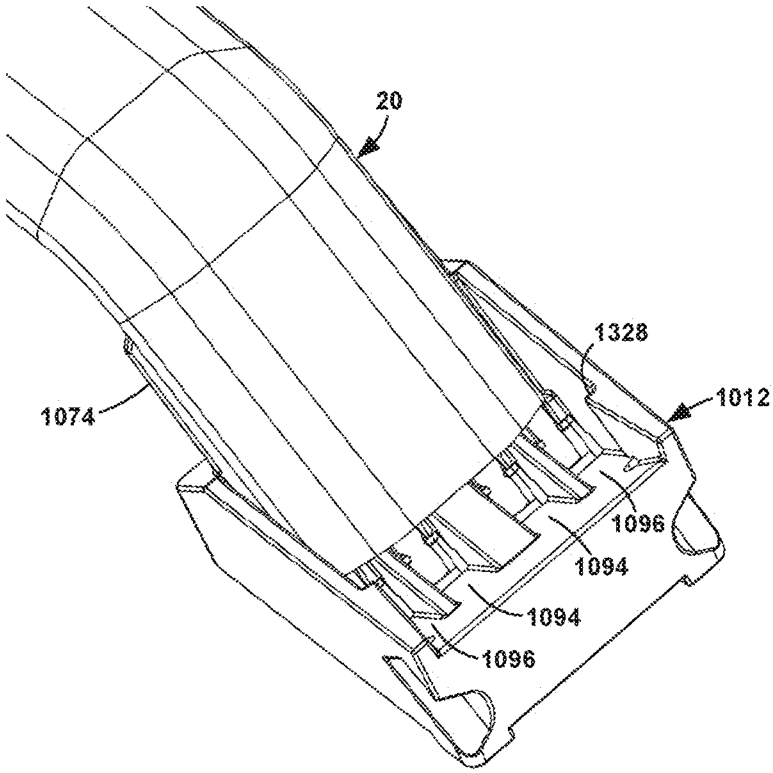
FIG. 79 is an isometric view of the cable installed in the anchor block for the termination of FIG. 28.
Figure 80:
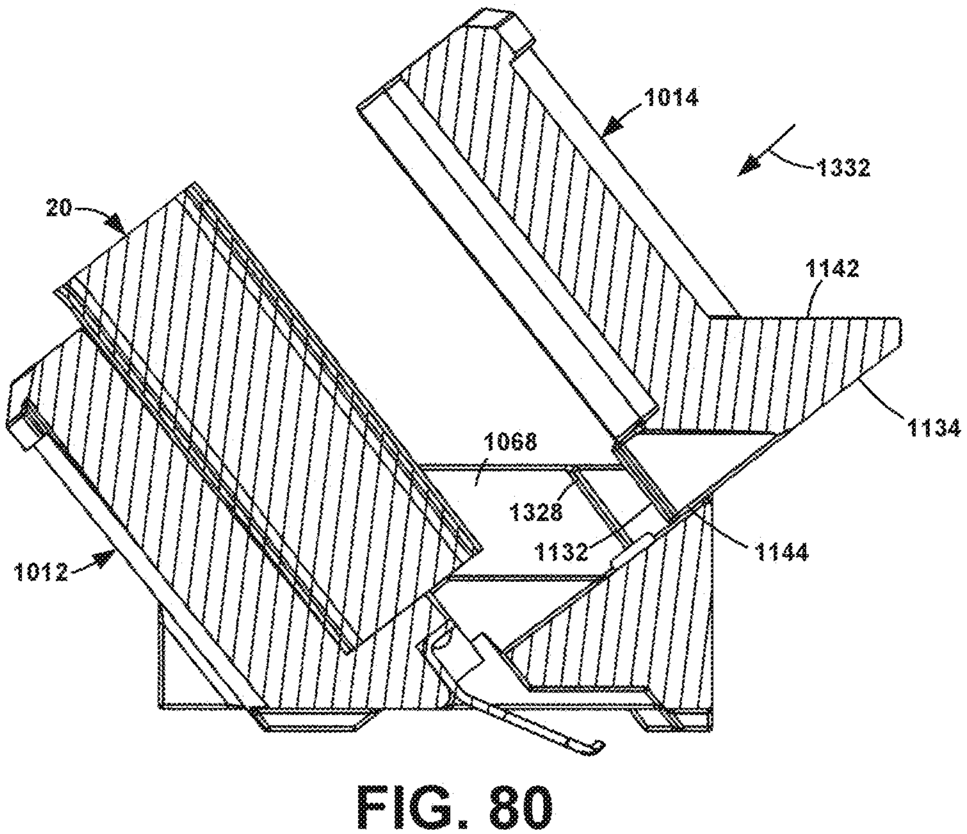
FIG. 80 is a cross-sectional view of the assembly step of installing the cap for the termination of FIG. 28.

The contacts 1034 are inserted into the notches 1094, 1096 and the cable 20 is laid in the curve 1088 of the cable tray cable surface 1086, pushing the cable 20 into the anchor block 1012 until the cable dielectric 24 is against the cable stop 1090, as in FIG. 65. At this point, the contact tines 1050 are wedged into the notch 1094, 1096 between the walls 1102, as well as the contact tines 1050. The resulting assembly adds pull strength to the cable 20. The contact spring fingers 1038 are extending along the aperture openings 1114 and from the device surface 1070, as in FIG. 55.

At this point, the cap 1014 is installed on the anchor block 1012. As mentioned above, this is how the two configurations 1010A, 1010B differ.

In the first configuration 1010A, the anchor block 1012 has a lateral hook groove 1108 in the cap wall 1106 and the cap 1014 has a lateral hook ridge 1136 in the anchor block surface 1134. The cap 1014 is installed by placing the cap 1014 in the anchor block depression 1068 with the hook ridge 1136 against the cap wall 1106, as in FIG. 66. The cap 1014 is pushed downwardly into the depression 1068, as at 1150, until the hook ridge 1136 snaps into the hook groove 1108. At this point, the cable clamp surface 1130 is laying on the cable 20 and the contact clamp surfaces 1132 are covering the notches 1094, 1096, as in FIG. 57.

In the second configuration 1010B, the front of the cap side wall 1320 is notched, as at 1322, and forms a shoulder 1324 that is perpendicular to the anchor block surface 1134. The side wall 1326 of the anchor block depression 1068 has a complementary shoulder 1328. The cap 1014 is installed by placing the heel 1144 of the cap anchor block surface 1134 against the cap wall 1106 of the anchor block depression 1068. The cap 1014 is pushed into the anchor block depression 1068 toward to cable 20, as at 1332 in FIG. 80, until the cap shoulder 1324 snaps into the depression shoulder 1328. At this point, the cable clamp surface 1130 is laying on the cable 20 and the contact clamp surfaces 1132 are covering the notches 1094, 1096, as in FIG. 71.

The collar 1016 is slid down around the cable tray 1086 and cap cable clamp 1128 until the collar 1016 snaps under a lip 1098 at the upper edge of the cable tray 1086 and a corresponding lip 1138 at the upper edge of the cap cable clamp 1128. Because the collar 1016 is rigid, it does not deform to snap under the lips 1098, 1138. The nature of the construction of the controlled-impedance cable 20 causes it to compress slightly as the collar 1016 is sliding over the lips

1098, 1138, thereby providing the deformation need to assemble the termination. Optionally, the cable tray cable surface 1086 and the cap cable clamp surface 1130 are textured to provide friction against the cable sheath 28 to act as a strain relief.

Figure 81:
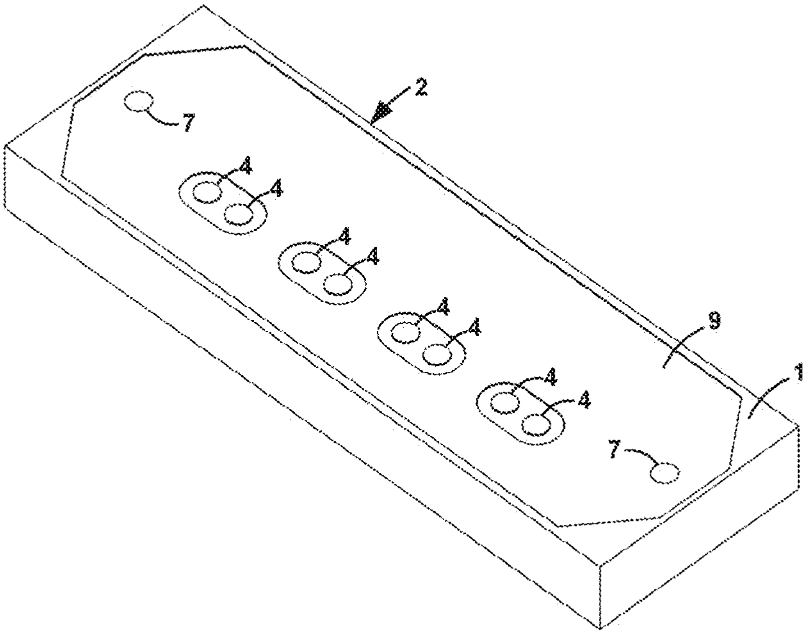
FIG. 81 is an isometric view of a device adapted to receive four terminations of FIGS. 27 and 28.

FIGS. 81-85 show an embodiment of how four termination assemblies 1008 of the second embodiment can be attached to a device 2. FIG. 81 shows a section of the device 2 with signal pads 4 and a ground plane 9 for attachment by four adjacent twinax termination assemblies 1008.

Figure 83:
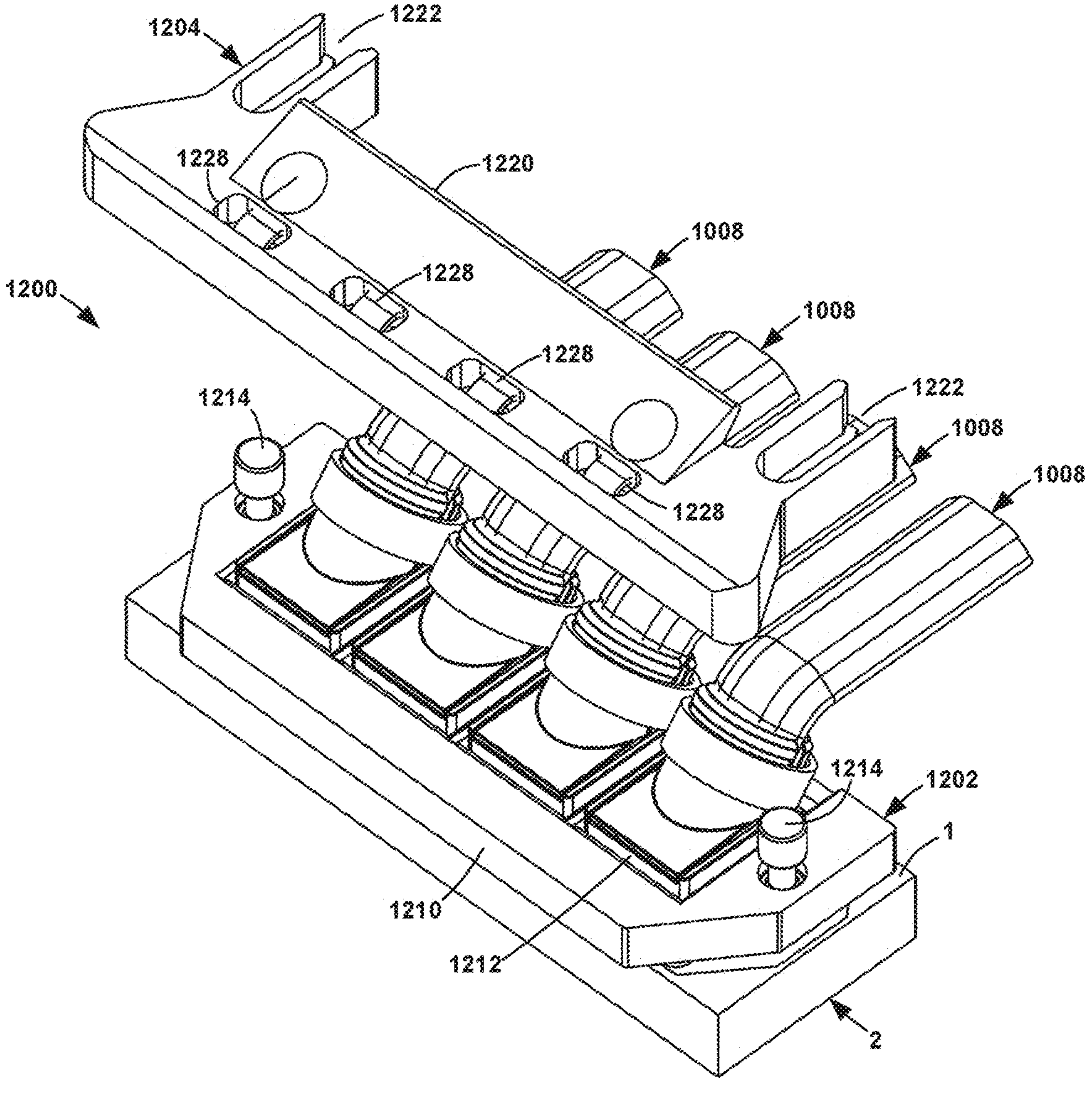
FIG. 83 is a top, isometric view of four terminations of FIGS. 27 and 28 partially attached to the device.
Figure 84:
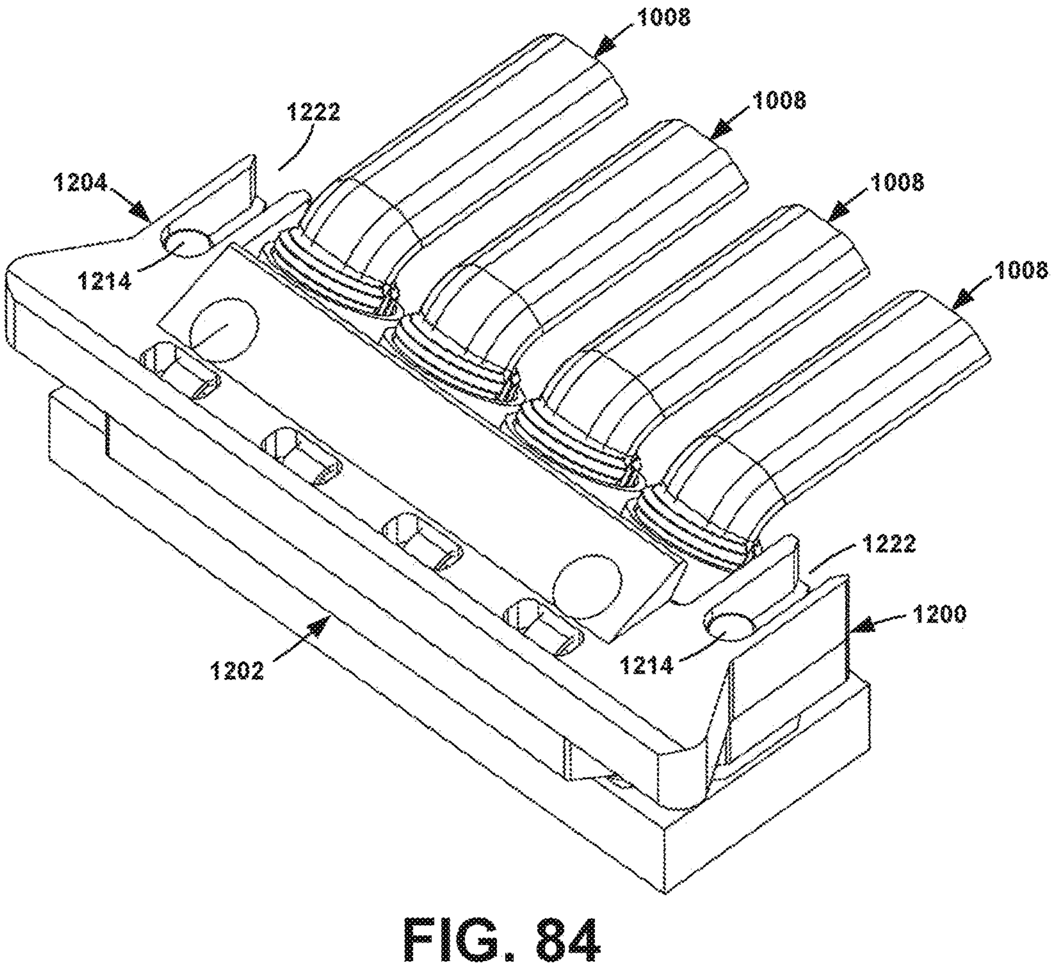
FIG. 84 is a top, isometric view of four terminations of FIGS. 27 and 28 attached to the device.

The termination assemblies 1008 are removably attached to the device 2 by a frame 1200 that is comprised of a lattice 1202 and a cover 1204, as shown in FIG. 83. The lattice 1202 has a generally rectangular body 1210 and pegs 1214. The lattice 1202 attaches to the device 2 via through-hole solder joints between the pegs 1214 and peg holes 7 in the device 2. Alternatively, the pegs 1214 can have an interference fit in corresponding peg holes 7 in the device 2.

The lattice body 1210 has a rectangular cutout 1212 into which the termination assemblies 1008 are inserted. The cutout 1212 is positioned such that the termination assemblies 1008 are in the correct position over the pads 4.

Figure 82:
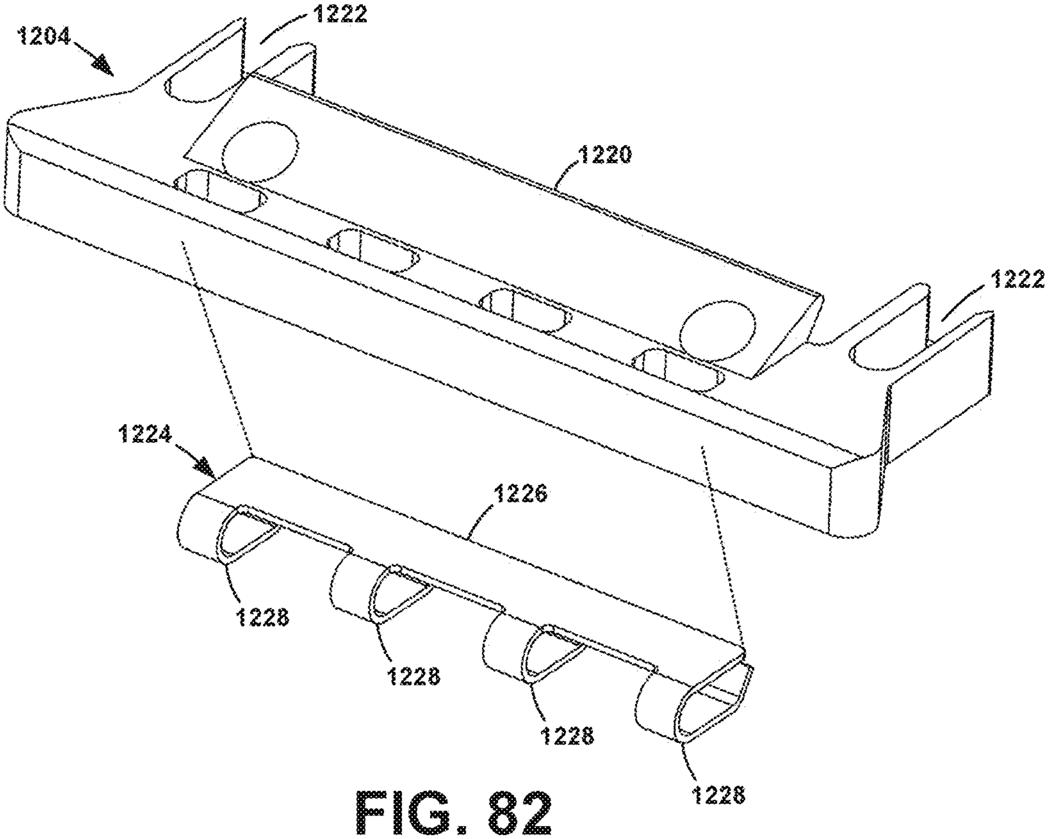
FIG. 82 is an exploded, isometric view of the cover and spring for four termination of FIGS. 27 and 28.

The cover 1204 attaches to the ends of the lattice 1202, as described below, to hold the termination assemblies 1008 against the device 2 in the direction of compression 3. As shown in FIG. 82, the cover 1204 is composed of a body 1220 that spans the termination assemblies 1008 and a spring set 1224. The spring set 1224 has an elongated body 1226 and a cantilever spring 1228 extending from and curled under the body 1226 for each termination 1008. The spring set 1224 can be a stamped metal part. The spring set 1224 can be insert-molded into the body 1220. Alternatively, the cover spring 1224 can be mechanically attached to body 1220 using interference fits.

The ends of the cover 1204 include slots 1222 that slide onto the pegs 1214 extending upwardly from the lattice 1202. The attachment can involve an interference fit between the pegs 1214 and the slots 1222, but can also use other vertical or horizontal joining methods such as snap clips or dovetail joints.

Each spring 1228 pushes its corresponding termination assembly 1008 against the device surface 1 in the direction of compression 3 perpendicular to the device surface 1, as shown in FIG. 85. The spring 1228 pushes down on the spring surface 1142 of the cap 1014.

The through-hole solder joining process can result in uneven seating of the frame 1200 on the device 2. In addition, the device 2 can be warped or thin and not rigid. The stroke of the spring 1228 is designed to be long enough to overcome these imperfections. The compression force provided by the spring 1228 is designed to overcome the combined spring force from all of the contacts 1034 with some margin to account for external forces, moments, vibration, and shock exerted on the cable 20 during normal operation.

The terminations 1008 have independent compliance, meaning they are spring-loaded from above so that a change in relative seating height from termination 1008 to termination 1008 in the device 2 due to device manufacturing imperfections or imperfect seating of the frame 1200 on the device 2 does not impact the differential impedance of the interconnect.

The terminations 1008 are not permanently attached to the frame 1200. They can be attached and detached and moved to different locations. Further, the frame 1200 at one location does not have to be the same shape as the frame 1200 at other locations. This approach makes the design of the present invention more versatile than other commercially available connectors because the frame 1200 can be any shape or size.

Furthermore, final testing of the termination 1008 will always involve only four instrumentation ports because only one differential channel needs to be tested at a time. Other commercially available connectors have a multitude of permanently attached cables, so each unit needs four instrumentation ports per cable for testing.

Figure 86:
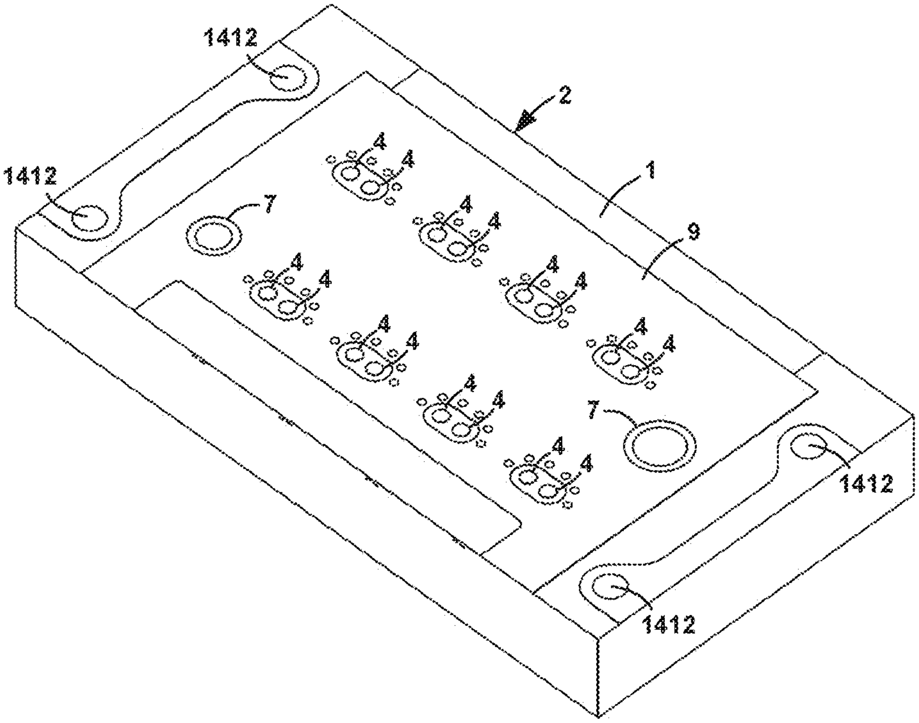
FIG. 86 is an isometric view of a device adapted to receive eight terminations of FIGS. 27 and 28.
Figure 87:
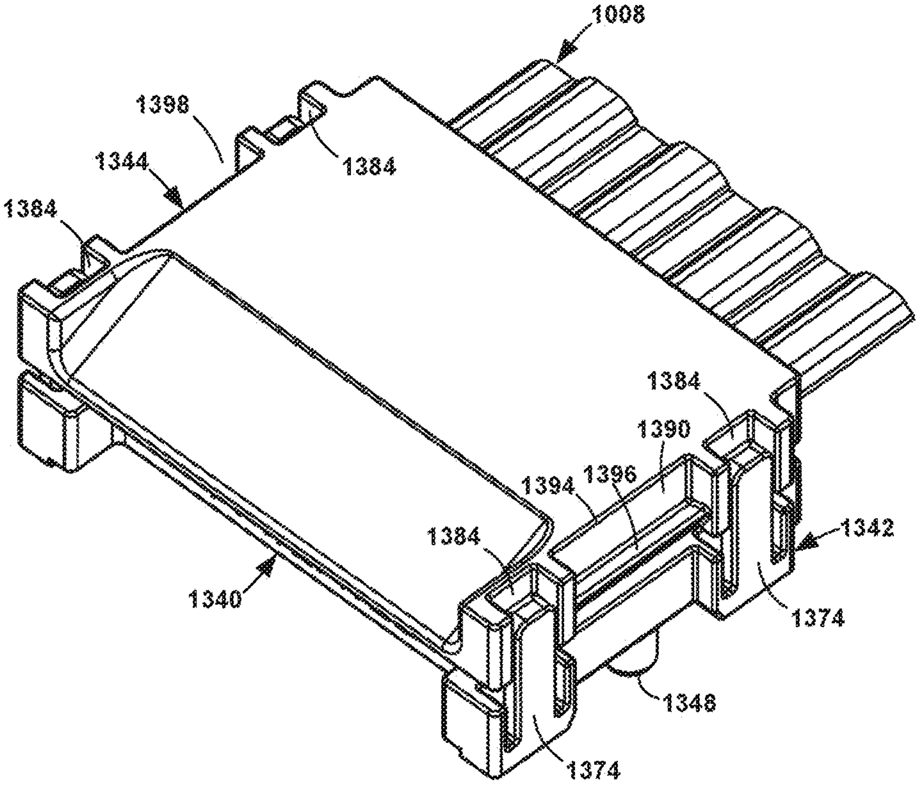
FIG. 87 is a top, isometric view of a frame for eight termination of FIGS. 27 and 28.
Figure 88:
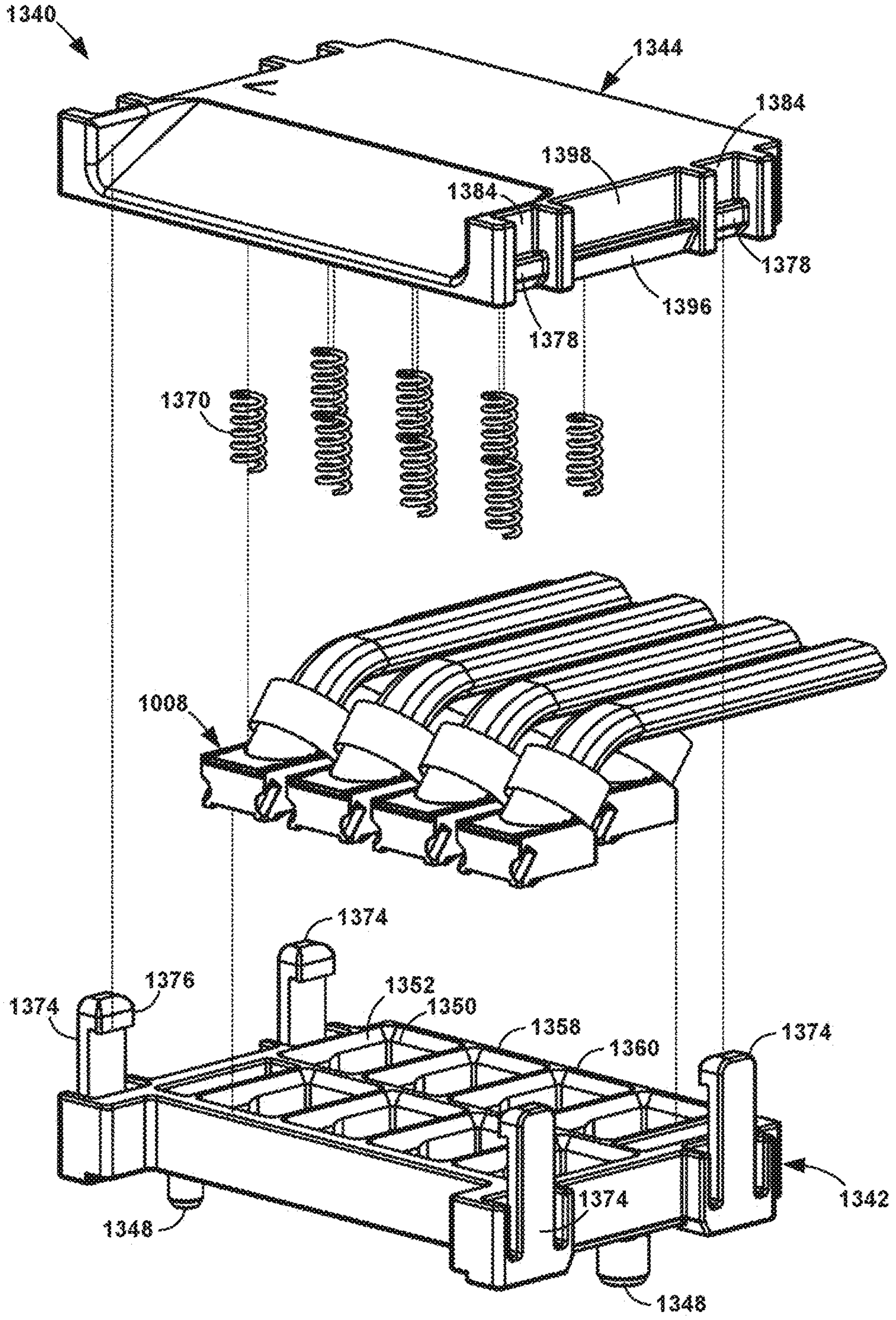
FIG. 88 is a top, exploded, isometric view of the frame of FIG. 87.
Figure 89:
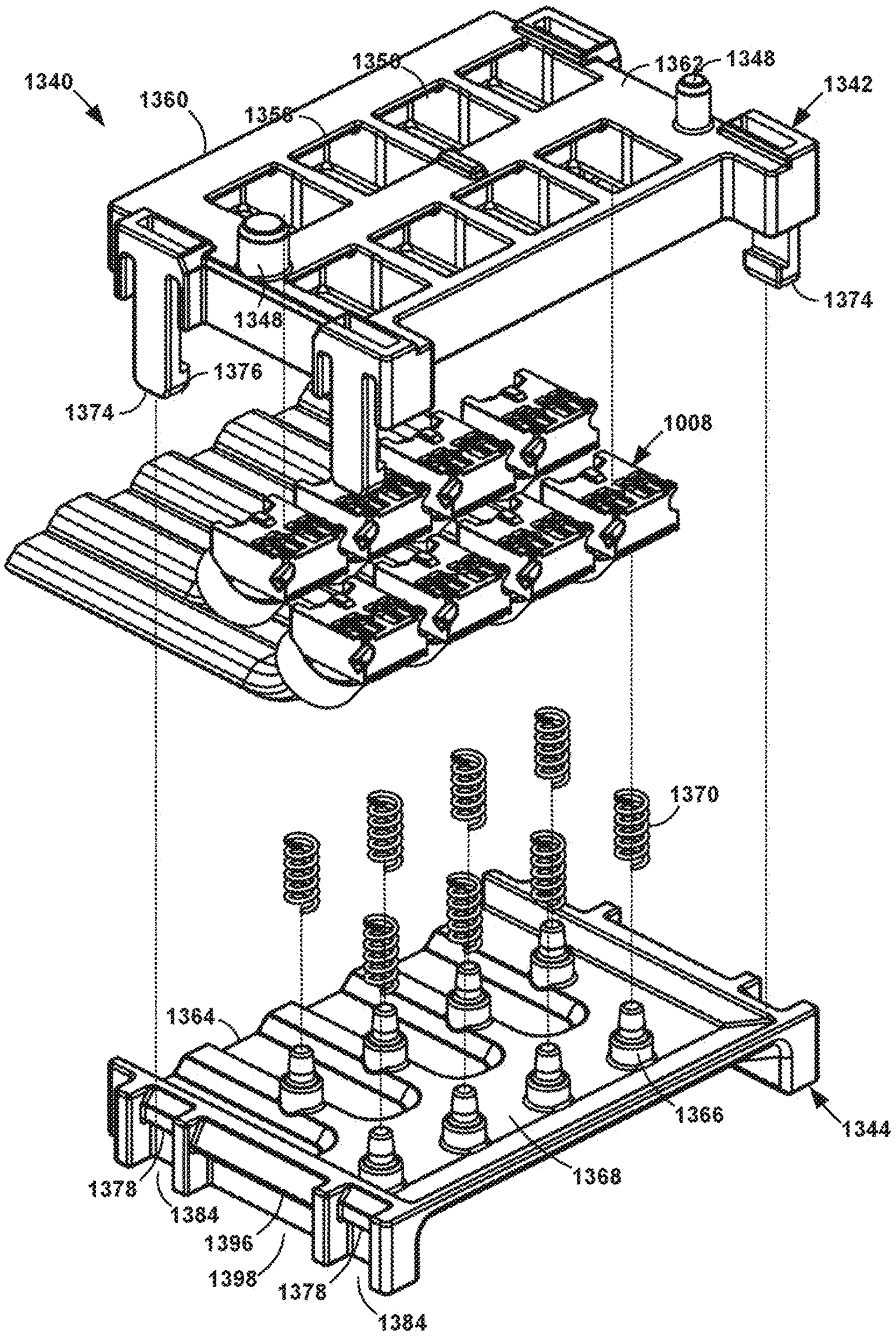
FIG. 89 is a bottom, exploded, isometric view of the frame of FIG. 87.
Figure 90:
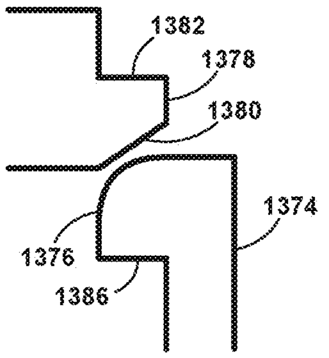
FIG. 90 is a side, cross-sectional, detail view of the cover attachment for the frame of FIG. 87.
Figure 91:
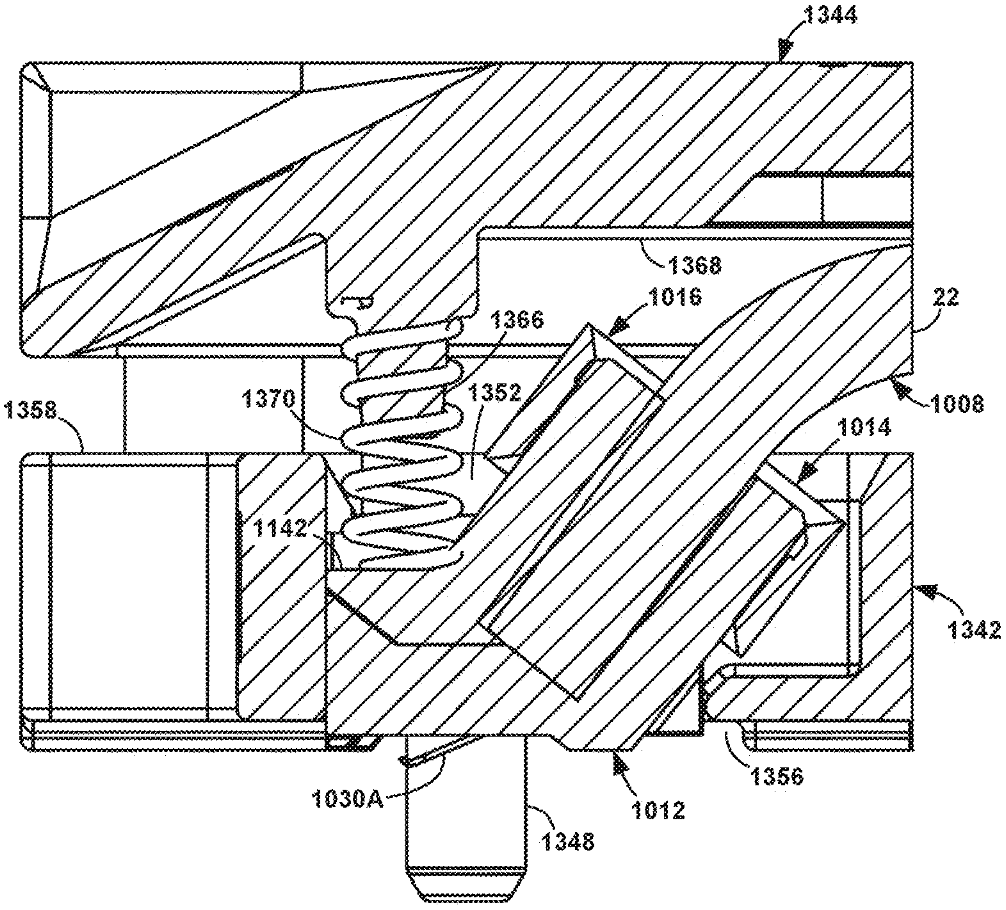
FIG. 91 is a side, cross-sectional view of the assembled frame of FIG. 87.

FIGS. 86-97 show an embodiment of how eight termination assemblies 1008 of the second embodiment can be attached to a device 2. FIG. 86 shows a section of the device 2 with signal pads 4 and a ground plane 9 for attachment by eight twinax termination assemblies 1008 arranged in two offset rows of four termination assemblies 1008. Peg holes 7 provide for alignment, as described below.

The termination assemblies 1008 are removably attached to the device 2 by a frame 1340 that is comprised of a lattice 1342 and a cover 1344. The lattice 1342 is generally rectangular and has cutouts 1350 into which the termination assemblies 1008 are inserted. Each cutout 1350 accepts an assembly 1008 through an opening 1352 in the top and the cutout 1350 is sized such that the assembly 1008 fits snuggly within the cutout 1350. The compliant contacts 1030 extend through an aperture 1356 in the bottom 1362 of the lattice 1342. The cable 20 extends along the top 1358 of and out one side 1360 of the lattice 1342. The cutouts 1350 are arranged such that the compliant contacts 1030 are aligned over the pads 4 and ground plane 9 when the frame 1340 is attached to the device 2.

Alignment pegs 1348 extend from the bottom 1362 of the lattice 1342.

The cover 1344 secures the assemblies 1008 in the lattice 1342. The cover 1344 is generally flat so that it can lay on the assemblies 1008. Optionally, the cover 1344 has channels 1364 for the cables 20.

The cover 1344 has posts 1366 extending from the bottom 1368, each of which is aligned with a cutout 1350. A coil spring 1370 sits on the post 1366 and, when the cover 1344 is installed on the lattice 1342, pushes against the cap spring surface 1142 of the assembly 1008 to bias the assembly 1008 against the cutout floor 1354 so that the compliant contacts 1030 extend from the floor apertures 1356.

The cover 1344 attaches to the lattice 1342 by clips 1374 extending from the corners of the lattice 1342. The clips 1374 are L-shaped digits with a right-angle finger 1376 and that can flex outwardly. The cover 1344 has a flange 1378 within a notch 1384 at each corner. Each flange 1378 has a beveled lower surface 1380 and a flat upper surface 1382.

To install the cover 1344 on the lattice 1342, the cover 1344 is placed on the clips 1374 so that the clips 1374 are aligned with the flange notches 1384. As the cover 1344 is pushed into the clips 1374, the beveled lower surface 1380 of the flanges 1378 force the clips 1374 outwardly. The notches 1384 maintain alignment between the lattice 1342 and the cover 1344. As the flanges 1378 pass the clip fingers 1376, the clips 1374 snap inwardly so that the flat bottom surface 1382 of the fingers 1376 abut the flat upper surface 1382 of the flanges 1378, thereby preventing removal of the cover 1344. The cover 1344 can be removed by manually pulling the clips 1374 away from the flanges 1378.

Figure 92:
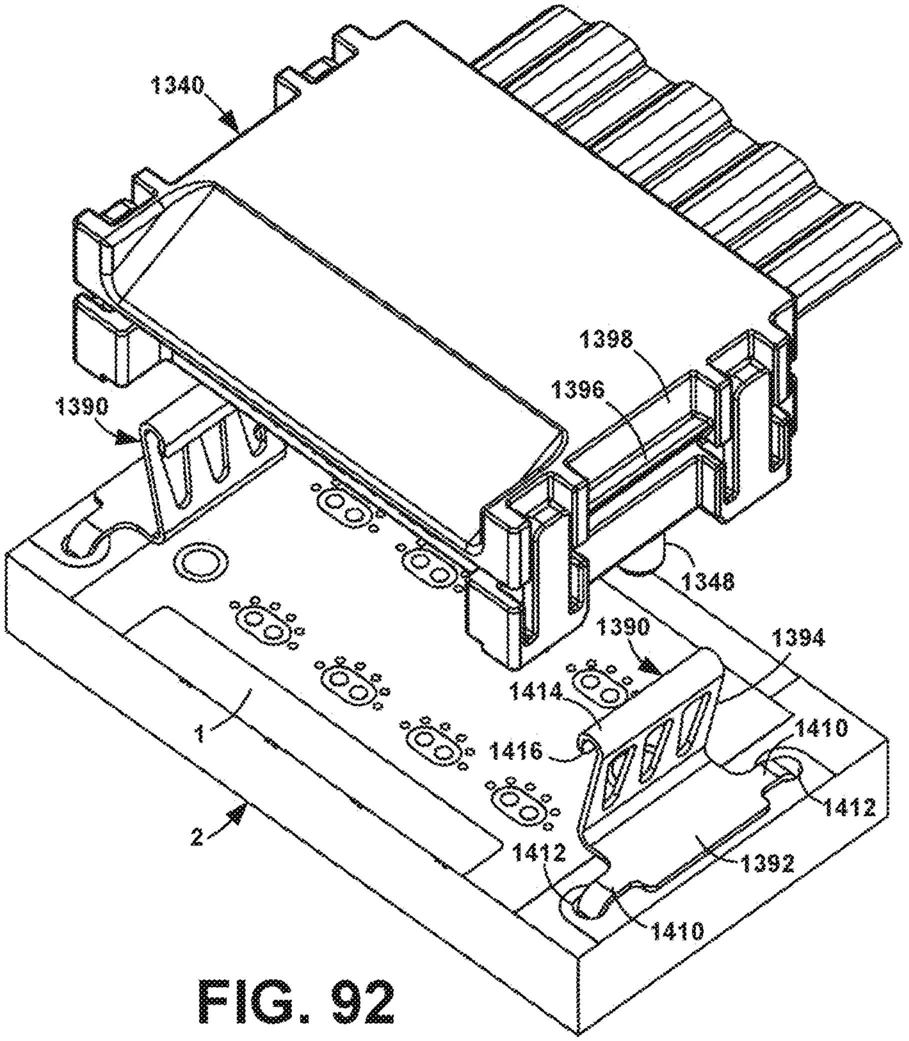
FIG. 92 is a top, isometric view of the frame of FIG. 87 positioned to attach to the device.
Figure 93:
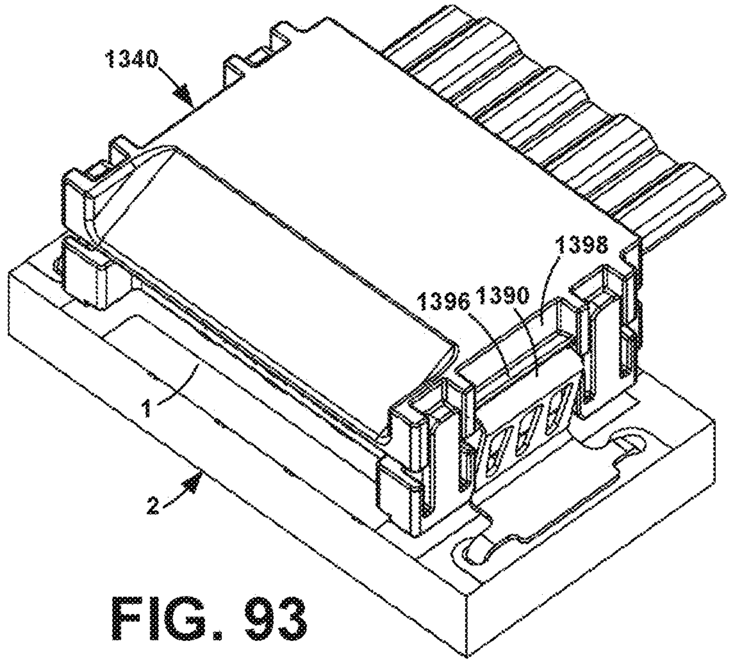
FIG. 93 is a top, isometric view of the frame of FIG. 87 partially attached to the device.
Figure 94:
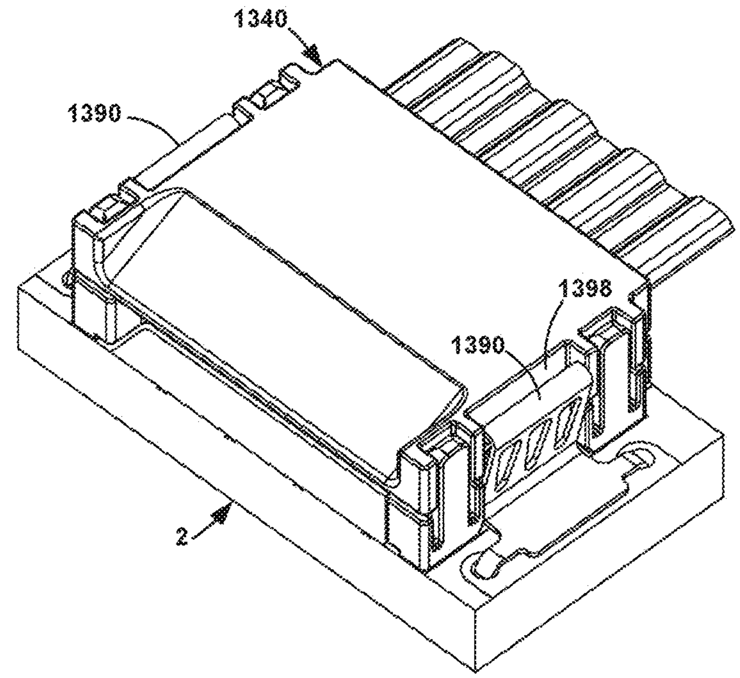
FIG. 94 is a top, isometric view of the frame of FIG. 87 fully attached to the device.
Figure 95:
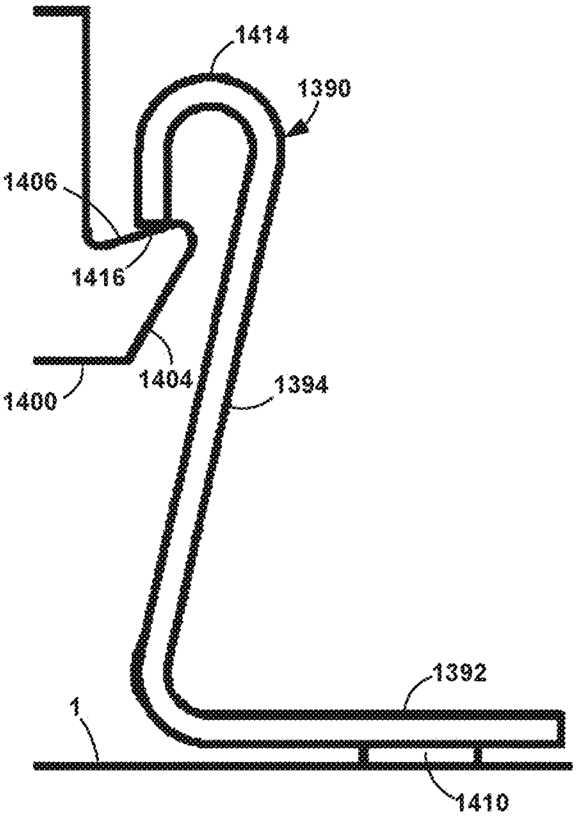
FIG. 95 is a side, cross-sectional, detail view of the frame/device attachment for the frame of FIG. 87.

The frame 1340 is removably attached to the device 2 by clips 1390 mounted to the device 2, as in FIG. 92. The clips 1390, shown in FIG. 95, are generally L-shaped with a base 1392 against the device 2 and an arm 1394 extending approximately perpendicularly away from the base 1392. At end of each arm 1394 is a finger 1414 that curves inwardly and downwardly to a free edge 1416. The clip base 1392 has two or more fingers 1410 bent at right angles to the base 1392. The fingers 1410 go into plated through holes 1412 in the device 2 and are soldered to the plating. The through-hole solder joining process takes advantage of existing pick and place equipment and reflow ovens to easily and quickly install components like these clips 1390 onto the device 2. Since the clips 1390 are not part of the termination 10, they can go through the reflow process without exposing the cables 20 in the termination 10 to excessive temperatures.

The cover 1344 has a rail 1400 within an elongated notch 1402 at each short end 1398. Each rail 1400 has a beveled lower surface 1404 and an upper surface 1406 that is angled slightly upwardly away from the cover 1344.

To install the frame 1340 on the device 2, cover 1344 is placed on the clip arms 1394 so that the clip arms 1394 are aligned with the rail notches 1402 and the alignment pegs 1348 are aligned with the peg holes 7. As the cover 1344 is pushed into the clips 1390, the beveled lower surface 1404 of the rails 1400 force that clip arms 1394 outwardly. The notches 1402 maintain alignment between the frame 1340 and the device 2. As the rails 1400 pass the clip fingers 1414, the clip arms 1394 snap inwardly so that the free end 1416 of the fingers 1414 abut the upper surface 1406 of the rails 1400, thereby preventing removal of the frame 1340 from the device 2. The slight angle of the upper surface 1406 prevents the clip finger 1414 from slipping off of the rail 1400. The frame 1340 can be removed by manually pulling the clip arms 1394 away from the rails 1400.

Thus, it has been shown and described a compliant cable termination. Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An electrical connector for terminating, to a substrate having conductive pads disposed thereon, a plurality of cables each comprising a signal conductor and a ground conductor, the electrical connector comprising:
- a housing configured to hold a plurality of termination assemblies, the plurality of termination assemblies comprising:
  - a first termination assembly, configured to be terminate, to the substrate, a first cable of the plurality of cables; and
  - a second termination assembly configured to terminate, to the substrate, a second cable of the plurality of cables,
- wherein the housing is further configured to hold at least one spring member, the at least one spring member configured to:
  - bias the first termination assembly to the substrate, independently from the second termination assembly.

2. The electrical connector of claim 1, wherein:
- the at least one spring member is further configured to:
  - bias the second termination assembly to the substrate, independently from the first termination assembly.

3. The electrical connector of claim 1, wherein:
- the at least one spring member comprises a first spring member and a second spring member;
- the first spring member is configured to bias the first termination assembly to the substrate, independently from the second termination assembly; and
- the second spring member is configured to bias the second termination assembly to the substrate, independently from the first termination assembly.

4. The electrical connector of claim 1, wherein:
- the first termination assembly is configured to be terminate, to the substrate, four cables of the plurality of cables, the four cables including the first cable;
- the at least one spring member comprises a first spring member; and
- the first spring member is configured to bias the first termination assembly to the substrate such that the four cables are terminated to the substrate.

5. The electrical connector of claim 1, further comprising:
- an engagement feature configured to position the electrical connector relative to the conductive pads of the substrate.

6. The electrical connector of claim 1, wherein:
- the substrate comprises a printed circuit board; and
- the first termination assembly is configured to be terminate directly to the conductive pads of the printed circuit board.

7. The electrical connector of claim 6, wherein:
- the printed circuit board has the conductive pads formed directly thereon.

8. The electrical connector of claim 1, wherein:
- the first termination assembly comprises at least one signal contact member configured to contact the substrate and at least one ground contact member configured to contact the substrate; and
- the at least one signal contact member and the at least one ground contact member are configured to provide a spacing therebetween such that signal paths within the electrical connector have an impedance matching an impedance within the first cable.

9. The electrical connector of claim 8, wherein:
- the at least one signal contact member comprises two signal contact members; and
- the at least one ground contact member comprises two ground contact members.

10. The electrical connector of claim 8, wherein:
- the at least one signal contact member and the at least one ground contact member are configured to provide a spacing therebetween such that signal paths within the electrical connector have an impedance matching an impedance within the first cable within about 5 ohms.

11. The electrical connector of claim 8, wherein:
- the at least one signal contact member and the at least one ground contact member comprise spring fingers configured to bend when the at least one spring member biases the first termination assembly to the substrate.

12. The electrical connector of claim 8, wherein:
- the first cable and the second cable comprise twinaxial cables.

13. An electronic assembly configured to receive an electrical connector terminating a plurality of cables each comprising a signal conductor and a ground conductor, the electronic assembly comprising:
- a substrate;
- an engagement feature on the substrate and configured to hold the electrical connector against the substrate; and
- a plurality of conductive pads disposed on the substrate, the plurality of conductive pads comprising:
  - a first set of one or more conductive pads configured to electrically couple a first termination assembly terminating a first cable of the plurality of cables; and a second set of one or more conductive pads configured to electrically couple a second termination assembly terminating a second cable of the plurality of cables, an alignment feature on the substrate and configured to position the electrical connector with respect to the plurality of conductive pads;

wherein the first set of one or more conductive pads is configured with respect to the alignment feature such that, as the connector is pressed into engagement with the engagement feature, contacts of the first termination assembly and the second termination assembly scrape along pads of the first and second set of one or more conductive pads, respectively.

14. The electronic assembly of claim 13, wherein:

the alignment feature comprises a first hole in the substrate and a second hole in the substrate, the first set of one or more conductive pads and the second set of one or more conductive pads are despised in a line between the first hole and the second hole.

15. The electronic assembly of claim 13, wherein:

the first set of one or more conductive pads is configured to electrically couple the first termination assembly terminating four cables of the plurality of cables, the four cables including the first cable.

16. The electronic assembly of claim 13, wherein:

the substrate comprises a printed circuit board; and the plurality of conductive pads of the printed circuit board are configured to directly terminate the first termination assembly.

17. The electronic assembly of claim 16, wherein:

the plurality of conductive pads are formed directly on the printed circuit board.

18. The electronic assembly of claim 13, wherein:

the first set of one or more conductive pads comprises at least one signal pad configured to contact at least one signal contact member of the first termination assembly and at least one ground pad configured to contact at least one ground contact member of the first termination assembly; and the at least one signal pad and the at least one ground pad are configured to provide a spacing therebetween such that signal paths within the electrical connector have an impedance matching an impedance within the first cable.

19. The electronic assembly of claim 18, wherein:

the at least one signal pad and the at least one ground pad are configured to provide a spacing therebetween such that signal paths within the electrical connector have an impedance matching an impedance within the first cable within about 5 ohms.

20. The electronic assembly of claim 18, wherein:

the at least one signal contact member and the at least one ground contact member comprise spring fingers; and the substrate is configured to bend the spring fingers when the first bias force is applied to the first termination assembly.

* * * * *